United States Patent
Kopitzke et al.

(10) Patent No.: US 11,231,154 B2
(45) Date of Patent: Jan. 25, 2022

(54) BAR HANGER ASSEMBLY WITH MATING TELESCOPING BARS

(71) Applicant: Ver Lighting LLC, Carson, CA (US)

(72) Inventors: Frederick William Kopitzke, Long Beach, CA (US); Amir Lotfi, Redondo Beach, CA (US); Mohammed Aslam Khazi, Troy, MI (US)

(73) Assignee: Ver Lighting LLC, Carson, CA (US)

( * ) Notice: Subject to any disclaimer, the term of this patent is extended or adjusted under 35 U.S.C. 154(b) by 0 days.

(21) Appl. No.: 17/220,779

(22) Filed: Apr. 1, 2021

(65) Prior Publication Data

US 2021/0222845 A1    Jul. 22, 2021

Related U.S. Application Data

(63) Continuation of application No. PCT/US2019/054220, filed on Oct. 2, 2019.

(60) Provisional application No. 62/811,157, filed on Feb. 27, 2019, provisional application No. 62/740,385, filed on Oct. 2, 2018.

(51) Int. Cl.
| | |
|---|---|
| *F16M 11/00* | (2006.01) |
| *F21S 8/02* | (2006.01) |
| *F21V 21/04* | (2006.01) |

(52) U.S. Cl.
CPC ............ *F21S 8/026* (2013.01); *F21V 21/048* (2013.01)

(58) Field of Classification Search
CPC ....................................................... F21S 8/026
See application file for complete search history.

(56) References Cited

U.S. PATENT DOCUMENTS

| | | | |
|---|---|---|---|
| 1,133,535 | A | 3/1915 | Cain et al. |
| 1,471,340 | A | 10/1923 | Knight |
| 1,856,356 | A | 5/1932 | Owen |
| 2,038,784 | A | 4/1936 | Ghadiali |
| (Continued) | | | |

FOREIGN PATENT DOCUMENTS

| | | |
|---|---|---|
| CA | 2243934 C | 6/2002 |
| CA | 2502637 A1 | 9/2005 |
| (Continued) | | |

OTHER PUBLICATIONS

U.S. Appl. No. 17/318,193, filed May 12, 2021, Danesh et al.
(Continued)

*Primary Examiner* — Amy J. Sterling
(74) *Attorney, Agent, or Firm* — Smith Baluch LLP

(57) ABSTRACT

A bar hanger assembly is used to couple a housing to a support structure. The bar hanger assembly may include a bar hanger holder to mechanically couple the bar hanger assembly to the housing, such as a junction box, a can housing, or a frame. The bar hanger holder may define a channel to mechanically guide and support a pair of bar hangers. The bar hangers may be mechanically coupled together in a telescoping manner such that the first bar hanger is slidably adjustable with respect to the second bar hanger. The bar hanger holder and each bar hanger may physically contact one another and, in some instances, generate a compressive force to substantially reduce unwanted play. Each bar hanger may include a bar hanger head to couple the bar hanger assembly to various types of support structures, such as a T-bar, a stud, a joist, or a frame.

30 Claims, 77 Drawing Sheets

(56) References Cited

U.S. PATENT DOCUMENTS

| | | |
|---|---|---|
| 2,179,161 A | 11/1939 | Rambusch |
| 2,197,737 A | 4/1940 | Appleton |
| 2,352,913 A | 7/1944 | Morrill |
| 2,528,989 A | 11/1950 | Ammells |
| 2,597,595 A | 5/1952 | Ordas |
| 2,642,246 A | 6/1953 | Larry |
| 2,670,919 A | 3/1954 | Vincent |
| 2,697,535 A | 12/1954 | Olson |
| 2,758,810 A | 8/1956 | Good |
| D180,844 S | 8/1957 | Poliakoff |
| 2,802,933 A | 8/1957 | Broadwin |
| 2,998,512 A | 8/1961 | Duchene et al. |
| 3,023,920 A | 3/1962 | Cook et al. |
| 3,057,993 A | 10/1962 | Gellert |
| 3,104,087 A | 9/1963 | Joseph et al. |
| 3,214,126 A | 10/1965 | Roos |
| 3,422,261 A | 1/1969 | McGinty |
| 3,460,299 A | 8/1969 | Wilson |
| 3,650,046 A | 3/1972 | Skinner |
| 3,675,807 A | 7/1972 | Lund et al. |
| 3,700,885 A | 10/1972 | Bobrick |
| 3,711,053 A | 1/1973 | Drake |
| D227,989 S | 7/1973 | Geisel |
| 3,773,968 A | 11/1973 | Copp |
| 3,812,342 A | 5/1974 | Mcnamara |
| 3,836,766 A | 9/1974 | Auerbach |
| 3,874,035 A | 4/1975 | Schuplin |
| 3,913,773 A | 10/1975 | Copp et al. |
| D245,905 S | 9/1977 | Taylor |
| 4,088,827 A | 5/1978 | Kohaut |
| 4,154,218 A | 5/1979 | Hulet |
| 4,154,219 A | 5/1979 | Gupta et al. |
| 4,176,758 A | 12/1979 | Glick |
| 4,280,169 A | 7/1981 | Allen |
| 4,399,497 A | 8/1983 | Druffel |
| 4,450,512 A | 5/1984 | Kristofek |
| 4,460,948 A | 7/1984 | Malola |
| 4,520,435 A | 5/1985 | Baldwin |
| 4,539,629 A | 9/1985 | Poppenheimer |
| 4,601,145 A | 7/1986 | Wilcox |
| 4,667,840 A | 5/1987 | Lindsey |
| 4,723,747 A | 2/1988 | Karp et al. |
| 4,729,080 A | 3/1988 | Fremont et al. |
| 4,754,377 A | 6/1988 | Wenman |
| 4,770,311 A | 9/1988 | Wang |
| 4,880,128 A | 11/1989 | Jorgensen |
| 4,910,651 A | 3/1990 | Montanez |
| 4,919,292 A | 4/1990 | Hsu |
| 4,929,187 A | 5/1990 | Hudson et al. |
| 4,930,054 A | 5/1990 | Krebs |
| 5,044,582 A | 9/1991 | Walters |
| D326,537 S | 5/1992 | Gattari |
| 5,216,203 A | 6/1993 | Gower |
| 5,222,800 A | 6/1993 | Chan et al. |
| 5,239,132 A | 8/1993 | Bartow |
| 5,250,269 A | 10/1993 | Langer et al. |
| 5,266,050 A | 11/1993 | O'Neil et al. |
| 5,303,894 A | 4/1994 | Deschamps et al. |
| 5,382,752 A | 1/1995 | Reyhan et al. |
| 5,420,376 A | 5/1995 | Rajecki et al. |
| 5,444,606 A | 8/1995 | Barnes et al. |
| 5,465,199 A | 11/1995 | Bray et al. |
| 5,505,419 A | 4/1996 | Gabrius |
| 5,544,870 A | 8/1996 | Kelly et al. |
| 5,562,343 A | 10/1996 | Chan et al. |
| 5,571,993 A | 11/1996 | Jones et al. |
| 5,580,158 A | 12/1996 | Aubrey et al. |
| 5,588,737 A | 12/1996 | Kusmer |
| 5,603,424 A | 2/1997 | Bordwell et al. |
| 5,609,408 A | 3/1997 | Targetti |
| 5,613,338 A | 3/1997 | Esposito |
| D381,111 S | 7/1997 | Lecluze |
| 5,662,413 A | 9/1997 | Akiyama et al. |
| D386,277 S | 11/1997 | Lecluze |
| 5,690,423 A | 11/1997 | Hentz et al. |
| D387,466 S | 12/1997 | Lecluze |
| 5,738,436 A | 4/1998 | Cummings et al. |
| 5,836,678 A | 11/1998 | Wright et al. |
| 5,942,726 A | 8/1999 | Reiker |
| 5,944,412 A | 8/1999 | Janos et al. |
| 5,957,573 A | 9/1999 | Wedekind et al. |
| 5,975,323 A | 11/1999 | Turan |
| 6,030,102 A * | 2/2000 | Gromotka ............... F21S 8/02 362/364 |
| 6,082,878 A | 7/2000 | Doubek et al. |
| 6,095,669 A | 8/2000 | Cho |
| 6,098,945 A | 8/2000 | Korcz |
| 6,105,334 A | 8/2000 | Monson et al. |
| 6,161,910 A | 12/2000 | Reisenauer et al. |
| 6,170,685 B1 | 1/2001 | Currier |
| 6,170,965 B1 | 1/2001 | Kotovsky |
| 6,174,076 B1 | 1/2001 | Petrakis et al. |
| 6,176,599 B1 | 1/2001 | Farzen |
| 6,267,491 B1 | 7/2001 | Parrigin |
| 6,332,597 B1 | 12/2001 | Korcz et al. |
| 6,350,043 B1 | 2/2002 | Gloisten |
| 6,350,046 B1 | 2/2002 | Lau |
| 6,364,511 B1 | 4/2002 | Cohen |
| 6,375,338 B1 | 4/2002 | Cummings et al. |
| 6,402,112 B1 | 6/2002 | Thomas et al. |
| D461,455 S | 8/2002 | Forbes |
| 6,461,016 B1 | 10/2002 | Jamison et al. |
| 6,474,846 B1 | 11/2002 | Kelmelis et al. |
| 6,491,413 B1 | 12/2002 | Benesohn |
| D468,697 S | 1/2003 | Straub, Jr. |
| 6,515,313 B1 | 2/2003 | Ibbetson et al. |
| 6,521,833 B1 | 2/2003 | DeFreitas |
| 6,583,573 B2 | 6/2003 | Bierman |
| 6,585,389 B2 | 7/2003 | Bonazzi |
| 6,600,175 B1 | 7/2003 | Baretz et al. |
| D478,872 S | 8/2003 | Heggem |
| 6,632,006 B1 | 10/2003 | Rippel et al. |
| 6,657,236 B1 | 12/2003 | Thibeault et al. |
| 6,666,419 B1 | 12/2003 | Vrame |
| D487,600 S | 3/2004 | Fickas |
| D488,583 S | 4/2004 | Benghozi |
| 6,719,438 B2 | 4/2004 | Sevack et al. |
| 6,758,578 B1 | 7/2004 | Chou |
| 6,777,615 B1 | 8/2004 | Gretz |
| 6,779,908 B1 | 8/2004 | Ng |
| 6,827,229 B2 | 12/2004 | Dinh et al. |
| 6,838,618 B2 | 1/2005 | Newbold et al. |
| 6,906,352 B2 | 6/2005 | Edmond et al. |
| D509,314 S | 9/2005 | Rashidi |
| 6,948,829 B2 | 9/2005 | Verdes et al. |
| 6,958,497 B2 | 10/2005 | Emerson et al. |
| 6,964,501 B2 | 11/2005 | Ryan |
| 6,967,284 B1 | 11/2005 | Gretz |
| D516,235 S | 2/2006 | Rashidi |
| 7,025,476 B2 | 4/2006 | Leadford |
| 7,025,477 B2 | 4/2006 | Blessing |
| 7,064,269 B2 | 6/2006 | Smith |
| D528,673 S | 9/2006 | Maxik et al. |
| 7,102,172 B2 | 9/2006 | Lynch |
| D531,740 S | 11/2006 | Maxik |
| D532,532 S | 11/2006 | Maxik |
| 7,148,420 B1 | 12/2006 | Johnson et al. |
| 7,152,985 B2 | 12/2006 | Benitez et al. |
| 7,154,040 B1 | 12/2006 | Tompkins |
| 7,170,015 B1 | 1/2007 | Roesch et al. |
| D536,349 S | 2/2007 | Humber et al. |
| D537,039 S | 2/2007 | Pincek |
| 7,181,378 B2 | 2/2007 | Benitez et al. |
| D539,229 S | 3/2007 | Murphey |
| 7,186,008 B2 | 3/2007 | Patti |
| 7,190,126 B1 | 3/2007 | Paton |
| 7,211,833 B2 | 5/2007 | Slater, Jr. et al. |
| 7,213,940 B1 | 5/2007 | Van De Ven et al. |
| 7,234,674 B2 | 6/2007 | Rippel et al. |
| D547,889 S | 7/2007 | Huang |
| D552,969 S | 10/2007 | Bobrowski et al. |
| D553,267 S | 10/2007 | Yuen |
| D555,106 S | 11/2007 | Pape et al. |
| D556,144 S | 11/2007 | Dinh |

(56) References Cited

U.S. PATENT DOCUMENTS

| | | |
|---|---|---|
| 7,297,870 B1 | 11/2007 | Sartini |
| 7,312,474 B2 | 12/2007 | Emerson et al. |
| 7,320,536 B2 | 1/2008 | Petrakis et al. |
| D561,372 S | 2/2008 | Yan |
| D561,373 S | 2/2008 | Yan |
| 7,335,920 B2 | 2/2008 | Denbaars et al. |
| D563,896 S | 3/2008 | Greenslate |
| 7,347,580 B2 | 3/2008 | Blackman et al. |
| D570,012 S | 5/2008 | Huang |
| 7,374,308 B2 | 5/2008 | Sevack et al. |
| D570,504 S | 6/2008 | Maxik et al. |
| D570,505 S | 6/2008 | Maxik et al. |
| 7,399,104 B2 | 7/2008 | Rappaport |
| 7,429,025 B1 | 9/2008 | Gretz |
| D578,677 S | 10/2008 | Huang |
| 7,431,482 B1 | 10/2008 | Morgan et al. |
| 7,432,440 B2 | 10/2008 | Hull et al. |
| 7,442,883 B2 | 10/2008 | Jolly et al. |
| 7,446,345 B2 | 11/2008 | Emerson et al. |
| 7,470,048 B2 | 12/2008 | Wu |
| 7,473,005 B2 | 1/2009 | O'Brien |
| 7,488,097 B2 | 2/2009 | Reisenauer et al. |
| 7,494,258 B2 | 2/2009 | McNaught |
| 7,503,145 B2 | 3/2009 | Newbold et al. |
| 7,524,089 B2 | 4/2009 | Park |
| D591,894 S | 5/2009 | Flank |
| 7,534,989 B2 | 5/2009 | Suehara et al. |
| D596,154 S | 7/2009 | Rivkin |
| 7,566,154 B2 | 7/2009 | Gloisten et al. |
| D599,040 S | 8/2009 | Alexander et al. |
| D600,836 S | 9/2009 | Hanley et al. |
| 7,588,359 B2 | 9/2009 | Coushaine et al. |
| 7,592,583 B2 | 9/2009 | Page et al. |
| D606,696 S | 12/2009 | Chen et al. |
| 7,625,105 B1 | 12/2009 | Johnson |
| 7,628,513 B2 | 12/2009 | Chiu |
| 7,651,238 B2 | 1/2010 | O'Brien |
| 7,654,705 B2 | 2/2010 | Czech et al. |
| D611,650 S | 3/2010 | Broekhoff |
| 7,670,021 B2 | 3/2010 | Chou |
| 7,673,841 B2 | 3/2010 | Wronski |
| 7,677,766 B2 | 3/2010 | Boyer |
| 7,692,182 B2 | 4/2010 | Bergmann et al. |
| 7,704,763 B2 | 4/2010 | Fujii et al. |
| D616,118 S | 5/2010 | Thomas et al. |
| 7,712,922 B2 | 5/2010 | Hacker et al. |
| 7,722,208 B1 | 5/2010 | Dupre et al. |
| 7,722,227 B2 | 5/2010 | Zhang et al. |
| 7,735,795 B2 | 6/2010 | Wronski |
| 7,735,798 B2 | 6/2010 | Kojima |
| 7,748,887 B2 | 7/2010 | Zampini, II et al. |
| 7,766,518 B2 | 8/2010 | Piepgras et al. |
| 7,769,192 B2 | 8/2010 | Takagi et al. |
| 7,771,082 B2 | 8/2010 | Peng |
| 7,771,094 B2 | 8/2010 | Goode |
| 7,784,754 B2 | 8/2010 | Nevers et al. |
| D624,692 S | 9/2010 | Mackin et al. |
| D625,847 S | 10/2010 | Maglica |
| D625,876 S | 10/2010 | Chen et al. |
| D627,507 S | 11/2010 | Lai et al. |
| D627,727 S | 11/2010 | Alexander et al. |
| 7,828,465 B2 | 11/2010 | Roberge et al. |
| D629,366 S | 12/2010 | Ericson et al. |
| 7,845,393 B2 | 12/2010 | Kao et al. |
| 7,857,275 B2 | 12/2010 | de la Borbolla |
| 7,871,184 B2 | 1/2011 | Peng |
| 7,874,539 B2 | 1/2011 | Wright et al. |
| 7,874,703 B2 | 1/2011 | Shastry et al. |
| 7,874,709 B1 | 1/2011 | Beadle |
| D633,224 S | 2/2011 | Lee |
| 7,909,487 B1 | 3/2011 | Venetucci et al. |
| D636,903 S | 4/2011 | Torenbeek |
| D637,339 S | 5/2011 | Hasan et al. |
| D637,340 S | 5/2011 | Hasan et al. |
| 7,950,832 B2 | 5/2011 | Tanaka et al. |
| D639,499 S | 6/2011 | Choi et al. |
| D640,819 S | 6/2011 | Pan |
| 7,956,546 B2 | 6/2011 | Hasnain |
| 7,959,332 B2 | 6/2011 | Tickner et al. |
| 7,967,480 B2 | 6/2011 | Pickard et al. |
| D642,317 S | 7/2011 | Rashidi |
| 7,972,035 B2 | 7/2011 | Boyer |
| 7,972,043 B2 | 7/2011 | Schutte |
| D642,536 S | 8/2011 | Robinson |
| D643,970 S | 8/2011 | Kim et al. |
| 8,002,425 B2 | 8/2011 | Russo et al. |
| D646,011 S | 9/2011 | Rashidi |
| 8,013,243 B2 | 9/2011 | Korcz et al. |
| 8,038,113 B2 * | 10/2011 | Fryzek ............ F21S 8/026 248/343 |
| D648,476 S | 11/2011 | Choi et al. |
| D648,477 S | 11/2011 | Kim et al. |
| D650,115 S | 12/2011 | Kim et al. |
| 8,070,328 B1 | 12/2011 | Knoble et al. |
| 8,096,670 B2 | 1/2012 | Trott |
| D654,205 S | 2/2012 | Rashidi |
| D656,262 S | 3/2012 | Yoshinobu et al. |
| D656,263 S | 3/2012 | Ogawa et al. |
| 8,142,057 B2 | 3/2012 | Roos et al. |
| 8,152,334 B2 | 4/2012 | Krogman |
| D658,788 S | 5/2012 | Dudik et al. |
| D658,802 S | 5/2012 | Chen |
| D659,862 S | 5/2012 | Tsai |
| D659,879 S | 5/2012 | Rashidi |
| D660,814 S | 5/2012 | Wilson |
| 8,182,116 B2 | 5/2012 | Zhang et al. |
| 8,201,968 B2 | 6/2012 | Maxik et al. |
| D663,058 S | 7/2012 | Pan |
| D663,466 S | 7/2012 | Rashidi |
| D664,274 S | 7/2012 | de Visser et al. |
| D664,705 S | 7/2012 | Kong et al. |
| 8,215,805 B2 | 7/2012 | Cogliano et al. |
| 8,220,970 B1 | 7/2012 | Khazi et al. |
| 8,226,270 B2 | 7/2012 | Yamamoto et al. |
| 8,235,549 B2 | 8/2012 | Gingrich, III et al. |
| 8,238,050 B2 | 8/2012 | Minano et al. |
| 8,240,630 B2 | 8/2012 | Wronski |
| D667,155 S | 9/2012 | Rashidi |
| 8,262,255 B1 | 9/2012 | Rashidi |
| D668,372 S | 10/2012 | Renshaw et al. |
| D668,809 S | 10/2012 | Rashidi |
| D669,198 S | 10/2012 | Qiu |
| D669,199 S | 10/2012 | Chuang |
| D669,620 S | 10/2012 | Rashidi |
| 8,277,090 B2 | 10/2012 | Fryzek et al. |
| 8,308,322 B2 | 11/2012 | Santiago et al. |
| D673,869 S | 1/2013 | Yu |
| D676,263 S | 2/2013 | Birke |
| D676,814 S | 2/2013 | Paul |
| 8,376,593 B2 | 2/2013 | Bazydola et al. |
| D677,417 S | 3/2013 | Rashidi |
| D677,634 S | 3/2013 | Korcz et al. |
| D679,047 S | 3/2013 | Tickner et al. |
| 8,403,533 B1 | 3/2013 | Paulsel |
| 8,403,541 B1 | 3/2013 | Rashidi |
| 8,405,947 B1 | 3/2013 | Green et al. |
| D681,259 S | 4/2013 | Kong |
| 8,408,759 B1 | 4/2013 | Rashidi |
| D682,459 S | 5/2013 | Gordin et al. |
| D683,063 S | 5/2013 | Lopez et al. |
| D683,890 S | 6/2013 | Lopez et al. |
| D684,269 S | 6/2013 | Wang et al. |
| D684,719 S | 6/2013 | Rashidi |
| D685,118 S | 6/2013 | Rashidi |
| D685,120 S | 6/2013 | Rashidi |
| 8,454,204 B1 | 6/2013 | Chang et al. |
| D685,507 S | 7/2013 | Sun |
| D687,586 S | 8/2013 | Rashidi |
| D687,587 S | 8/2013 | Rashidi |
| D687,588 S | 8/2013 | Rashidi |
| D687,980 S | 8/2013 | Gravely et al. |
| D688,405 S | 8/2013 | Kim et al. |
| 8,506,127 B2 | 8/2013 | Russello et al. |
| 8,506,134 B2 | 8/2013 | Wilson et al. |

(56) References Cited

U.S. PATENT DOCUMENTS

| | | |
|---|---|---|
| D690,049 S | 9/2013 | Rashidi |
| D690,864 S | 10/2013 | Rashidi |
| D690,865 S | 10/2013 | Rashidi |
| D690,866 S | 10/2013 | Rashidi |
| D691,314 S | 10/2013 | Rashidi |
| D691,315 S | 10/2013 | Samson |
| D691,763 S | 10/2013 | Hand et al. |
| 8,550,669 B2 | 10/2013 | Macwan et al. |
| D693,043 S | 11/2013 | Schmalfuss et al. |
| D693,517 S | 11/2013 | Davis |
| D694,456 S | 11/2013 | Rowlette, Jr. et al. |
| 8,573,816 B2 | 11/2013 | Negley et al. |
| D695,441 S | 12/2013 | Lui et al. |
| D696,446 S | 12/2013 | Huh |
| D696,447 S | 12/2013 | Huh |
| D696,448 S | 12/2013 | Huh |
| 8,602,601 B2 | 12/2013 | Khazi et al. |
| D698,067 S | 1/2014 | Rashidi |
| D698,068 S | 1/2014 | Rashidi |
| 8,622,361 B2 | 1/2014 | Wronski |
| 8,632,040 B2 | 1/2014 | Mass et al. |
| D698,985 S | 2/2014 | Lopez et al. |
| D699,384 S | 2/2014 | Rashidi |
| D699,687 S | 2/2014 | Baldwin et al. |
| D700,387 S | 2/2014 | Snell |
| 8,641,243 B1 | 2/2014 | Rashidi |
| 8,659,034 B2 | 2/2014 | Baretz et al. |
| D700,991 S | 3/2014 | Johnson et al. |
| D701,175 S | 3/2014 | Baldwin et al. |
| D701,466 S | 3/2014 | Clifford et al. |
| 8,672,518 B2 | 3/2014 | Boomgaarden et al. |
| D702,867 S | 4/2014 | Kim et al. |
| D703,843 S | 4/2014 | Cheng |
| 8,684,569 B2 | 4/2014 | Pickard et al. |
| 8,696,158 B2 | 4/2014 | Santiago et al. |
| D705,472 S | 5/2014 | Huh |
| D705,481 S | 5/2014 | Zhang et al. |
| 8,727,582 B2 | 5/2014 | Brown et al. |
| D708,381 S | 7/2014 | Rashidi |
| 8,777,449 B2 | 7/2014 | Ven et al. |
| D710,529 S | 8/2014 | Lopez et al. |
| 8,801,217 B2 | 8/2014 | Oehle et al. |
| 8,820,985 B1 | 9/2014 | Tam et al. |
| 8,833,013 B2 | 9/2014 | Harman |
| 8,845,144 B1 | 9/2014 | Davies et al. |
| D714,989 S | 10/2014 | Rowlette, Jr. et al. |
| 8,870,426 B2 | 10/2014 | Biebl et al. |
| 8,888,332 B2 | 11/2014 | Martis et al. |
| 8,890,414 B2 | 11/2014 | Rowlette, Jr. et al. |
| D721,845 S | 1/2015 | Lui et al. |
| 8,926,133 B2 | 1/2015 | Booth |
| 8,939,418 B2 | 1/2015 | Green et al. |
| D722,296 S | 2/2015 | Taylor |
| D722,977 S | 2/2015 | Hagarty |
| D722,978 S | 2/2015 | Hagarty |
| 8,950,898 B2 | 2/2015 | Catalano |
| 8,967,575 B1 | 3/2015 | Gretz |
| D726,363 S | 4/2015 | Danesh |
| D726,949 S | 4/2015 | Redfern |
| 9,004,435 B2 | 4/2015 | Wronski |
| 9,039,254 B2 | 5/2015 | Danesh |
| D731,689 S | 6/2015 | Bernard et al. |
| 9,062,866 B1 | 6/2015 | Christ et al. |
| 9,065,264 B2 | 6/2015 | Cooper et al. |
| 9,068,719 B2 | 6/2015 | Van De Ven et al. |
| 9,068,722 B2 | 6/2015 | Wronski et al. |
| D734,525 S | 7/2015 | Gordin et al. |
| D735,012 S | 7/2015 | Cowie |
| D735,142 S | 7/2015 | Hagarty |
| 9,078,299 B2 | 7/2015 | Ashdown |
| 9,109,760 B2 | 8/2015 | Shum et al. |
| D739,355 S | 9/2015 | D'Aubeterre |
| D739,590 S | 9/2015 | Redfern |
| 9,140,441 B2 | 9/2015 | Goelz et al. |
| D741,538 S | 10/2015 | Ghasabi |
| D742,325 S | 10/2015 | Leung |
| 9,151,457 B2 | 10/2015 | Pickard et al. |
| 9,151,477 B2 | 10/2015 | Pickard et al. |
| D743,079 S | 11/2015 | Adair |
| 9,217,560 B2 | 12/2015 | Harbers et al. |
| 9,222,661 B2 | 12/2015 | Kim et al. |
| 9,239,131 B1 | 1/2016 | Wronski et al. |
| D750,317 S | 2/2016 | Lui et al. |
| 9,285,103 B2 | 3/2016 | Van De Ven et al. |
| 9,291,319 B2 | 3/2016 | Kathawate et al. |
| 9,301,362 B2 | 3/2016 | Dohn et al. |
| D754,078 S | 4/2016 | Baldwin et al. |
| D754,079 S | 4/2016 | Baldwin et al. |
| D754,605 S | 4/2016 | McMillan |
| 9,303,812 B2 * | 4/2016 | Green ................... F21V 21/22 |
| 9,310,038 B2 | 4/2016 | Athalye |
| 9,310,052 B1 | 4/2016 | Shum |
| 9,322,543 B2 | 4/2016 | Hussell et al. |
| D756,025 S | 5/2016 | Wronski et al. |
| 9,347,655 B2 | 5/2016 | Boomgaarden et al. |
| 9,366,418 B2 | 6/2016 | Gifford |
| 9,371,966 B2 | 6/2016 | Rowlette, Jr. et al. |
| D762,181 S | 7/2016 | Lin |
| 9,395,051 B2 | 7/2016 | Hussell et al. |
| D762,906 S | 8/2016 | Jeswani et al. |
| D764,079 S | 8/2016 | Wu |
| 9,417,506 B1 | 8/2016 | Tirosh |
| 9,423,110 B1 | 8/2016 | Newton et al. |
| D766,185 S | 9/2016 | Hagarty |
| D767,199 S | 9/2016 | Wronski et al. |
| 9,447,917 B1 | 9/2016 | Wronski et al. |
| 9,447,953 B2 | 9/2016 | Lawlor |
| D768,325 S | 10/2016 | Xu |
| D768,326 S | 10/2016 | Guzzini |
| D769,501 S | 10/2016 | Jeswani et al. |
| D770,065 S | 10/2016 | Tittle |
| D770,076 S | 10/2016 | Li et al. |
| 9,476,552 B2 | 10/2016 | Myers et al. |
| 9,488,324 B2 | 11/2016 | Shum et al. |
| D774,676 S | 12/2016 | Ng |
| D776,324 S | 1/2017 | Gierl et al. |
| D777,967 S | 1/2017 | Redfern |
| 9,534,751 B2 | 1/2017 | Maglica et al. |
| D778,241 S | 2/2017 | Holbrook et al. |
| D778,484 S | 2/2017 | Guzzini |
| D779,100 S | 2/2017 | Redfern |
| 9,581,302 B2 | 2/2017 | Danesh |
| 9,599,315 B1 | 3/2017 | Harpenau et al. |
| 9,605,842 B1 | 3/2017 | Davis |
| 9,605,910 B2 | 3/2017 | Swedberg et al. |
| D785,228 S | 4/2017 | Guzzini |
| D786,472 S | 5/2017 | Redfern |
| D786,473 S | 5/2017 | Dean |
| D786,474 S | 5/2017 | Fujisawa |
| D788,330 S | 5/2017 | Johnson et al. |
| D790,102 S | 6/2017 | Guzzini |
| 9,673,597 B2 | 6/2017 | Lee |
| 9,689,541 B2 | 6/2017 | Wronski |
| D791,709 S | 7/2017 | Holton |
| D791,711 S | 7/2017 | Holton |
| D791,712 S | 7/2017 | Holton |
| 9,696,021 B2 * | 7/2017 | Wronski ................. F21V 21/34 |
| 9,702,516 B1 | 7/2017 | Vasquez et al. |
| D795,820 S | 8/2017 | Wengreen |
| 9,732,904 B1 | 8/2017 | Wronski |
| 9,732,947 B1 | 8/2017 | Christ et al. |
| 9,739,464 B2 | 8/2017 | Wronski |
| 9,791,111 B1 | 10/2017 | Huang et al. |
| 9,797,562 B2 | 10/2017 | Dabiet et al. |
| 9,803,839 B2 | 10/2017 | Visser et al. |
| D805,660 S | 12/2017 | Creasman et al. |
| D809,176 S | 1/2018 | Partington |
| 9,863,619 B2 | 1/2018 | Mak |
| D809,465 S | 2/2018 | Keirstead |
| 9,903,569 B2 | 2/2018 | O'Brien et al. |
| 9,964,266 B2 | 5/2018 | Danesh |
| D820,494 S | 6/2018 | Cohen |
| 9,995,441 B2 | 6/2018 | Power et al. |
| D824,494 S | 7/2018 | Martins et al. |

(56) References Cited

U.S. PATENT DOCUMENTS

| | | |
|---|---|---|
| 10,041,638 B2 | 8/2018 | Vasquez et al. |
| 10,054,274 B2 | 8/2018 | Athalye et al. |
| D827,903 S | 9/2018 | Wu |
| D832,218 S | 10/2018 | Wronski et al. |
| D833,977 S | 11/2018 | Danesh et al. |
| 10,125,959 B2 | 11/2018 | Cohen |
| 10,139,059 B2 | 11/2018 | Danesh |
| D836,976 S | 1/2019 | Reese et al. |
| 10,247,390 B1 | 4/2019 | Kopitzke et al. |
| D848,375 S | 5/2019 | Danesh et al. |
| 10,281,131 B2 | 5/2019 | Cohen |
| 10,295,163 B1 | 5/2019 | Cohen |
| D850,695 S | 6/2019 | Dabiet et al. |
| D851,046 S | 6/2019 | Peng et al. |
| 10,408,395 B2 | 9/2019 | Danesh |
| 10,408,396 B2 | 9/2019 | Wronski et al. |
| 10,408,436 B2 | 9/2019 | Wronski et al. |
| D863,661 S | 10/2019 | Tian et al. |
| D864,877 S | 10/2019 | Danesh |
| D867,653 S | 11/2019 | Gorman |
| 10,488,000 B2 | 11/2019 | Danesh et al. |
| 10,551,044 B2 | 2/2020 | Peng et al. |
| 10,563,850 B2 | 2/2020 | Danesh |
| 10,591,120 B2 | 3/2020 | Bailey et al. |
| D880,733 S | 4/2020 | Lo et al. |
| D883,562 S | 5/2020 | Hu |
| D885,648 S | 5/2020 | Zeng |
| D885,649 S | 5/2020 | McLaughlin, III et al. |
| 10,663,127 B2 | 5/2020 | Danesh et al. |
| 10,663,153 B2 | 5/2020 | Nikooyan et al. |
| D888,313 S | 6/2020 | Xie et al. |
| 10,683,994 B2 | 6/2020 | Wronski et al. |
| 10,684,003 B2 | 6/2020 | Wronski et al. |
| D890,410 S | 7/2020 | Stanford et al. |
| 10,704,745 B2 | 7/2020 | Sherry et al. |
| 10,753,558 B2 | 8/2020 | Danesh |
| 10,816,148 B2 | 10/2020 | Danesh |
| D901,398 S | 11/2020 | Danesh et al. |
| D901,745 S | 11/2020 | Yang |
| D902,871 S | 11/2020 | Danesh et al. |
| D903,605 S | 12/2020 | Danesh et al. |
| D905,327 S | 12/2020 | Williams et al. |
| D907,284 S | 1/2021 | Danesh et al. |
| 10,975,570 B2 | 4/2021 | Shen |
| 10,982,829 B2 | 4/2021 | Danesh |
| 11,022,259 B2 | 6/2021 | Bailey et al. |
| 11,028,982 B2 | 6/2021 | Danesh |
| 11,047,538 B2 | 6/2021 | Danesh et al. |
| D924,467 S | 7/2021 | Danesh et al. |
| D925,109 S | 7/2021 | Danesh et al. |
| 11,060,705 B1 | 7/2021 | Danesh et al. |
| 11,067,231 B2 | 7/2021 | Lotfi et al. |
| 11,085,597 B2 | 8/2021 | Danesh |
| 2002/0172047 A1 | 11/2002 | Ashley |
| 2003/0006353 A1 | 1/2003 | Dinh et al. |
| 2003/0016532 A1 | 1/2003 | Reed |
| 2003/0021104 A1 | 1/2003 | Tsao |
| 2003/0161153 A1 | 8/2003 | Patti |
| 2004/0001337 A1 | 1/2004 | Defouw et al. |
| 2004/0120141 A1 | 6/2004 | Beadle |
| 2004/0156199 A1 | 8/2004 | Rivas et al. |
| 2005/0078474 A1 | 4/2005 | Whitfield |
| 2005/0225966 A1 | 10/2005 | Hartmann et al. |
| 2005/0227536 A1 | 10/2005 | Gamache et al. |
| 2005/0231962 A1 | 10/2005 | Koba et al. |
| 2005/0237746 A1 | 10/2005 | Yiu |
| 2006/0005988 A1 | 1/2006 | Jorgensen |
| 2006/0158873 A1 | 7/2006 | Newbold et al. |
| 2006/0198126 A1 | 9/2006 | Jones |
| 2006/0215408 A1 | 9/2006 | Lee |
| 2006/0221620 A1 | 10/2006 | Thomas |
| 2006/0237601 A1 | 10/2006 | Rinderer |
| 2006/0243877 A1 | 11/2006 | Rippel |
| 2006/0250788 A1 | 11/2006 | Hodge et al. |
| 2006/0262536 A1 | 11/2006 | Nevers |
| 2006/0262545 A1 | 11/2006 | Piepgras et al. |
| 2007/0012847 A1 | 1/2007 | Tai |
| 2007/0035951 A1 | 2/2007 | Tseng |
| 2007/0121328 A1 | 5/2007 | Mondloch et al. |
| 2007/0131827 A1 | 6/2007 | Nevers et al. |
| 2007/0185675 A1 | 8/2007 | Papamichael et al. |
| 2007/0200039 A1 | 8/2007 | Petak |
| 2007/0206374 A1 | 9/2007 | Petrakis et al. |
| 2008/0002414 A1 | 1/2008 | Miletich et al. |
| 2008/0019138 A1 | 1/2008 | Otte et al. |
| 2008/0112168 A1 | 5/2008 | Pickard et al. |
| 2008/0112170 A1 | 5/2008 | Trott |
| 2008/0112171 A1 | 5/2008 | Patti et al. |
| 2008/0137347 A1 | 6/2008 | Trott et al. |
| 2008/0165545 A1 | 7/2008 | O'Brien |
| 2008/0170404 A1 | 7/2008 | Steer et al. |
| 2008/0224008 A1 | 9/2008 | Dal Ponte et al. |
| 2008/0232116 A1 | 9/2008 | Kim |
| 2008/0247181 A1 | 10/2008 | Dixon |
| 2008/0285271 A1 | 11/2008 | Roberge et al. |
| 2009/0003009 A1 | 1/2009 | Tessnow et al. |
| 2009/0034261 A1 | 2/2009 | Grove |
| 2009/0080189 A1 | 3/2009 | Wegner |
| 2009/0086484 A1 | 4/2009 | Johnson |
| 2009/0097262 A1 | 4/2009 | Zhang et al. |
| 2009/0135613 A1 | 5/2009 | Peng |
| 2009/0141500 A1 | 6/2009 | Peng |
| 2009/0141506 A1 | 6/2009 | Lan et al. |
| 2009/0141508 A1 | 6/2009 | Peng |
| 2009/0147517 A1 | 6/2009 | Li |
| 2009/0161356 A1 | 6/2009 | Negley et al. |
| 2009/0237924 A1 | 9/2009 | Ladewig |
| 2009/0280695 A1 | 11/2009 | Sekela et al. |
| 2009/0283292 A1 | 11/2009 | Lehr |
| 2009/0290343 A1 | 11/2009 | Brown et al. |
| 2010/0002320 A1 | 1/2010 | Minano et al. |
| 2010/0014282 A1 | 1/2010 | Danesh |
| 2010/0033095 A1 | 2/2010 | Sadwick |
| 2010/0061108 A1 | 3/2010 | Zhang et al. |
| 2010/0110690 A1 | 5/2010 | Hsu et al. |
| 2010/0110698 A1 | 5/2010 | Harwood et al. |
| 2010/0110699 A1 | 5/2010 | Chou |
| 2010/0148673 A1 | 6/2010 | Stewart et al. |
| 2010/0149822 A1 | 6/2010 | Cogliano et al. |
| 2010/0165643 A1 | 7/2010 | Russo et al. |
| 2010/0244709 A1 | 9/2010 | Steiner et al. |
| 2010/0246172 A1 | 9/2010 | Liu |
| 2010/0259919 A1 | 10/2010 | Khazi et al. |
| 2010/0270903 A1 | 10/2010 | Jao et al. |
| 2010/0277905 A1 | 11/2010 | Janik et al. |
| 2010/0284185 A1 | 11/2010 | Ngai |
| 2010/0302778 A1 | 12/2010 | Dabiet et al. |
| 2010/0328956 A1 | 12/2010 | Zhang |
| 2011/0043040 A1 | 2/2011 | Porter et al. |
| 2011/0063831 A1 | 3/2011 | Cook |
| 2011/0068687 A1 | 3/2011 | Takahasi et al. |
| 2011/0069499 A1 | 3/2011 | Trott et al. |
| 2011/0080750 A1 | 4/2011 | Jones et al. |
| 2011/0116276 A1 | 5/2011 | Okamura et al. |
| 2011/0121756 A1 | 5/2011 | Thomas et al. |
| 2011/0134634 A1 | 6/2011 | Gingrich, III et al. |
| 2011/0134651 A1 | 6/2011 | Berman |
| 2011/0140633 A1 | 6/2011 | Archenhold |
| 2011/0170294 A1 | 7/2011 | Mier-Langner et al. |
| 2011/0194299 A1 | 8/2011 | Crooks et al. |
| 2011/0216534 A1 | 9/2011 | Tickner et al. |
| 2011/0226919 A1 | 9/2011 | Fryzek et al. |
| 2011/0255292 A1 | 10/2011 | Shen |
| 2011/0267828 A1 | 11/2011 | Bazydola et al. |
| 2011/0285314 A1 | 11/2011 | Carney et al. |
| 2012/0020104 A1 | 1/2012 | Biebl et al. |
| 2012/0074852 A1 | 3/2012 | Delnoij |
| 2012/0106176 A1 | 5/2012 | Lopez et al. |
| 2012/0113642 A1 | 5/2012 | Catalano |
| 2012/0140442 A1 | 6/2012 | Woo et al. |
| 2012/0140465 A1 | 6/2012 | Rowlette, Jr. et al. |
| 2012/0162994 A1 | 6/2012 | Wasniewski et al. |
| 2012/0182744 A1 | 7/2012 | Santiago et al. |
| 2012/0188762 A1 | 7/2012 | Joung et al. |

(56) References Cited

U.S. PATENT DOCUMENTS

| | | |
|---|---|---|
| 2012/0243237 A1 | 9/2012 | Toda et al. |
| 2012/0250321 A1 | 10/2012 | Blincoe et al. |
| 2012/0266449 A1 | 10/2012 | Krupa |
| 2012/0268688 A1 | 10/2012 | Sato et al. |
| 2012/0287625 A1 | 11/2012 | Macwan et al. |
| 2012/0305868 A1 | 12/2012 | Callahan et al. |
| 2012/0314429 A1 | 12/2012 | Plunk |
| 2013/0009552 A1 | 1/2013 | Page |
| 2013/0010476 A1 | 1/2013 | Pickard et al. |
| 2013/0016864 A1 | 1/2013 | Ivey et al. |
| 2013/0033872 A1 | 2/2013 | Randolph et al. |
| 2013/0051012 A1 | 2/2013 | Oehle et al. |
| 2013/0077307 A1 | 3/2013 | Yamamoto |
| 2013/0083529 A1 | 4/2013 | Gifford |
| 2013/0141913 A1 | 6/2013 | Sachsenweger |
| 2013/0155681 A1 | 6/2013 | Nall et al. |
| 2013/0163254 A1 | 6/2013 | Chang et al. |
| 2013/0170232 A1 | 7/2013 | Park et al. |
| 2013/0170233 A1 | 7/2013 | Nezu et al. |
| 2013/0227908 A1 | 9/2013 | Gulbrandsen et al. |
| 2013/0258677 A1 | 10/2013 | Fryzek et al. |
| 2013/0265750 A1 | 10/2013 | Pickard et al. |
| 2013/0271989 A1 | 10/2013 | Hussell et al. |
| 2013/0294084 A1 | 11/2013 | Kathawate et al. |
| 2013/0301252 A1 | 11/2013 | Hussell et al. |
| 2013/0322062 A1 | 12/2013 | Danesh |
| 2013/0322084 A1 | 12/2013 | Ebisawa |
| 2013/0335980 A1 | 12/2013 | Nakasuji et al. |
| 2014/0029262 A1 | 1/2014 | Maxik et al. |
| 2014/0036497 A1 | 2/2014 | Hussell et al. |
| 2014/0049957 A1 | 2/2014 | Goelz et al. |
| 2014/0063776 A1 | 3/2014 | Clark et al. |
| 2014/0071679 A1 | 3/2014 | Booth |
| 2014/0071687 A1 | 3/2014 | Tickner et al. |
| 2014/0140490 A1 | 5/2014 | Roberts et al. |
| 2014/0063818 A1 | 6/2014 | Randolph et al. |
| 2014/0233246 A1 | 8/2014 | Lafreniere et al. |
| 2014/0254177 A1 | 9/2014 | Danesh |
| 2014/0268836 A1 | 9/2014 | Thompson |
| 2014/0268869 A1 | 9/2014 | Blessitt et al. |
| 2014/0299730 A1 | 10/2014 | Green et al. |
| 2014/0313775 A1 | 10/2014 | Myers et al. |
| 2014/0321122 A1 | 10/2014 | Domagala et al. |
| 2014/0347848 A1 | 11/2014 | Pisavadia et al. |
| 2015/0009676 A1 | 1/2015 | Danesh |
| 2015/0029732 A1 | 1/2015 | Hatch |
| 2015/0078008 A1 | 3/2015 | He |
| 2015/0085500 A1 | 3/2015 | Cooper et al. |
| 2015/0138779 A1 | 5/2015 | Livesay et al. |
| 2015/0184837 A1 | 7/2015 | Zhang et al. |
| 2015/0198324 A1 | 7/2015 | O'Brien et al. |
| 2015/0219317 A1 | 8/2015 | Gatof et al. |
| 2015/0233556 A1 | 8/2015 | Danesh |
| 2015/0241039 A1 | 8/2015 | Fryzek |
| 2015/0263497 A1 | 9/2015 | Korcz et al. |
| 2015/0276185 A1 | 10/2015 | Bailey et al. |
| 2015/0308662 A1 | 10/2015 | Vice et al. |
| 2015/0345761 A1 | 12/2015 | Lawlor |
| 2015/0362159 A1 | 12/2015 | Ludyjan |
| 2016/0084488 A1 | 3/2016 | Wu et al. |
| 2016/0209007 A1 | 7/2016 | Belmonte et al. |
| 2016/0238225 A1 | 8/2016 | Doust |
| 2016/0308342 A1 | 10/2016 | Witherbee et al. |
| 2016/0312987 A1 | 10/2016 | Danesh |
| 2016/0348860 A1 | 12/2016 | Danesh |
| 2016/0348861 A1 | 12/2016 | Bailey et al. |
| 2016/0366738 A1 | 12/2016 | Boulanger et al. |
| 2017/0003007 A1 | 1/2017 | Wronski |
| 2017/0045213 A1 | 2/2017 | Williams et al. |
| 2017/0059135 A1 | 3/2017 | Jones |
| 2017/0138576 A1 | 5/2017 | Peng et al. |
| 2017/0138581 A1 | 5/2017 | Doust |
| 2017/0167672 A1 | 6/2017 | Stauner et al. |
| 2017/0167699 A1 | 6/2017 | Schubert et al. |
| 2017/0198896 A1 | 7/2017 | May |
| 2017/0284616 A1 | 10/2017 | Coakley et al. |
| 2017/0307188 A1 | 10/2017 | Oudina et al. |
| 2018/0112857 A1 | 4/2018 | Wronski et al. |
| 2018/0142871 A1 | 5/2018 | Morales |
| 2018/0216809 A1 | 8/2018 | Cohen |
| 2018/0224095 A1 | 8/2018 | Cohen |
| 2018/0283677 A1 | 10/2018 | Cohen |
| 2019/0032874 A1 | 1/2019 | Bonnetto et al. |
| 2019/0041050 A1 | 2/2019 | Cairns et al. |
| 2019/0049080 A1 | 2/2019 | Danesh |
| 2019/0063701 A1 | 2/2019 | Lotfi et al. |
| 2019/0093836 A1 | 3/2019 | Danesh |
| 2020/0182420 A1 | 6/2020 | Cohen et al. |
| 2020/0291652 A1 | 9/2020 | Shen |
| 2020/0355334 A1 | 11/2020 | Shen et al. |
| 2020/0393118 A1 | 12/2020 | Danesh et al. |
| 2021/0010647 A1 | 1/2021 | Danesh et al. |
| 2021/0010663 A1 | 1/2021 | Nikooyan et al. |
| 2021/0033268 A1 | 2/2021 | Danesh |
| 2021/0080084 A1 | 3/2021 | Danesh et al. |

FOREIGN PATENT DOCUMENTS

| | | |
|---|---|---|
| CA | 2691480 C | 4/2012 |
| CA | 2734369 A1 | 10/2013 |
| CA | 2561459 A1 | 11/2013 |
| CA | 2815067 | 11/2013 |
| CA | 2848289 A1 | 10/2014 |
| CA | 2998173 | 7/2018 |
| CN | 2182475 Y | 11/1994 |
| CN | 2406574 Y | 11/2000 |
| CN | 201059503 Y | 5/2008 |
| CN | 201259125 Y | 6/2009 |
| CN | 101608781 A | 12/2009 |
| CN | 101859057 A | 10/2010 |
| CN | 201636626 U | 11/2010 |
| CN | 102062373 A | 5/2011 |
| CN | 202014067 U | 10/2011 |
| CN | 202392473 U | 8/2012 |
| CN | 202733693 U | 2/2013 |
| CN | 302544307 S | 8/2013 |
| CN | 103307518 A | 9/2013 |
| CN | 103322476 A | 9/2013 |
| CN | 203202661 U | 9/2013 |
| CN | 203215483 U | 9/2013 |
| CN | 302580902 S | 9/2013 |
| CN | 101498411 B | 11/2013 |
| CN | 203273663 U | 11/2013 |
| CN | 203297980 U | 11/2013 |
| CN | 203628464 U | 12/2013 |
| CN | 203641919 U | 6/2014 |
| CN | 204120631 U | 1/2015 |
| CN | 303103186 S | 2/2015 |
| CN | 204300818 U | 4/2015 |
| CN | 104654142 A | 5/2015 |
| CN | 204513161 U | 7/2015 |
| CN | 204611541 U | 9/2015 |
| CN | 204786225 U | 11/2015 |
| CN | 204829578 U | 12/2015 |
| CN | 103712135 B | 4/2016 |
| CN | 205606362 U | 9/2016 |
| CN | 206130742 U | 4/2017 |
| CN | 103154606 B | 5/2017 |
| CN | 206222112 U | 6/2017 |
| CN | 107013845 A | 8/2017 |
| CN | 107084343 A | 8/2017 |
| DE | 9109828 U1 | 2/1992 |
| DE | 199 47 208 | 5/2001 |
| EP | 1 589 289 | 10/2005 |
| EP | 1 672 155 A1 | 6/2006 |
| EP | 1688663 | 8/2006 |
| EP | 2 095 938 A1 | 2/2008 |
| EP | 2 306 072 A1 | 4/2011 |
| EP | 2 453 169 A2 | 5/2012 |
| EP | 2 193 309 B1 | 7/2012 |
| EP | 2 735 787 A1 | 5/2014 |
| EP | 3 104 024 A1 | 12/2016 |
| GB | 2325728 | 12/1998 |
| GB | 2427020 A | 12/2006 |

(56) References Cited

FOREIGN PATENT DOCUMENTS

| | | | |
|---|---|---|---|
| GB | 2466875 | | 7/2010 |
| GB | 2471929 | | 1/2014 |
| GB | 2509772 | A | 7/2014 |
| JP | H02113002 | U | 9/1990 |
| JP | 2007091052 | A | 4/2007 |
| JP | 2007265961 | A | 10/2007 |
| JP | 2011060450 | A2 | 3/2011 |
| JP | 2012064551 | A2 | 3/2012 |
| JP | 2015002027 | A2 | 1/2015 |
| JP | 2015002028 | A2 | 1/2015 |
| JP | 2016219335 | A | 12/2016 |
| JP | 2017107699 | A2 | 6/2017 |
| KR | 1020110008796 | A | 1/2011 |
| KR | 1020120061625 | A | 6/2012 |
| MX | 2011002947 | A | 9/2011 |
| TW | 474382 | U | 1/2002 |
| WO | WO 2013/128896 | A1 | 9/2013 |
| WO | WO 2014/015656 | | 1/2014 |
| WO | WO 2015/000212 | A1 | 1/2015 |
| WO | WO 2016152166 | A2 | 9/2016 |

OTHER PUBLICATIONS

U.S. Appl. No. 17/080,080, filed Oct. 26, 2020, Danesh.
U.S. Appl. No. 17/395,522, filed Aug. 6, 2021, Danesh.
U.S. Appl. No. 17/385,766, filed Jul. 26, 2021, Kopitzke.
U.S. Appl. No. 17/384,564, filed Jul. 23, 2021, Kopitzke et al.
U.S. Appl. No. 17/381,147, filed Jul. 20, 2021, Lofti et al.
U.S. Appl. No. 17/379,748, filed Jul. 19, 2021, Young et al.
U.S. Appl. No. 17/379,489, filed Jul. 19, 2021, Vinh et al.
U.S. Appl. No. 17/378,214, filed Jul. 16, 2021, Kopitzke et al.
U.S. Appl. No. 17/374,674, filed Jul. 13, 2021, Danesh.
U.S. Appl. No. 17/234,421, filed Apr. 19, 2021, Danesh.
U.S. Appl. No. 29/764,875, filed Jan. 4, 2021, Danesh et al.
U.S. Appl. No. 29/759,492, filed Nov. 23, 2020, Danesh et al.
U.S. Appl. No. 17/099,650, filed Nov. 16, 2020, Danesh et al.
U.S. Appl. No. 29/757,754, filed Nov. 9, 2020, Danesh et al.
2006 International Building Code, Section 712 Penetrations, Jan. 2006, 4 pages.
Acrich COB Zhaga Module, Product Description, Seoul Semiconductor, Nov. 11, 2016, 39 pages.
<https://www.zhagastandard.org/books/book18/>, Mar. 2017, 5 pages. Accessed on May 14, 2018.
Bortz, J. C. et al., "Optimal design of a nonimaging TIR doublet lens for an illumination system using an LED source", Proc. SPIE 5529, Nonimaging Optics and Efficient Illumination Systems, (Sep. 29, 2004); doi: 10.1117/12.562598; https://doi.org/10.1117/12.562598, 10 pages.
BXUV.GuideInfo, Fire Resistance Ratings—ANSI/UL 263, UL Online Certifications Directory, last updated Nov. 3, 2016, 27 pages.
CEYY.GuideInfo, Outlet Boxes and Fittings Certified for Fire Resistance, UL Online Certifications Directory, last updated May 16, 2013, 2 pages.
Canadian Office Action dated Dec. 23, 2013 from Canadian Application No. 2,778,581, 3 pages.
Canadian Office Action dated Mar. 22, 2016 from Canadian Application No. 2,879,629, 4 pages.
Canadian Office Action dated Dec. 6, 2016 from Canadian Application No. 2,879,629, 3 pages.
Canadian Office Action dated Mar. 9, 2017 from Canadian Application No. 2,931,588, 5 pages.
Canadian Office Action dated Feb. 1, 2016 from Canadian Application No. 2,879,486, 5 pages.
Canadian Office Action dated Jun. 12, 2017 from Canadian Application No. 2,927,601, 4 pages.
Canadian Office Action dated Aug. 11, 2017 from Canadian Application No. 2,941,051, 4 pages.
Carlon® Zip Box® Blue™ Switch and Outlet Boxes, Product Brochure, http://www.carlonsales.com/brochures.php, Jun. 20, 2006, 22 pages.
Cree LED Lamp Family Sales Sheet—Better light is beautiful light, Apr. 24, 2017, 2 pages.
DME Series Installation Instructions, Oct. 18, 2011, 2 pages.
DMF, Inc., "dmfLIGHTING: LED Recessed Lighting Solutions," Info sheets, Mar. 15, 2012, 4 pages.
DMF, Inc., "dmfLIGHTING: LED Recessed Downlighting," DRD2 Product Brochure, Oct. 23, 2014, 50 pages.
DMF, Inc., "dmfLIGHTING: LED Recessed Downlighting," Product Catalog, Aug. 2012, 68 pages.
Dross, O. et al., "Review of SMS design methods and real-world applications", Proc. SPIE 5529, Nonimaging Optics and Efficient Illumination Systems, (Sep. 29, 2004); doi: 10.1117/12.561336; https://doi.org/10.1117/12.561336, 14 pages.
Final Office Action dated Apr. 27, 2016 from U.S. Appl. No. 14/184,601, 19 pages.
Final Office Action dated Jul. 26, 2017 from U.S. Appl. No. 14/184,601, 18 pages.
Final Office Action dated Jan. 29, 2016 from U.S. Appl. No. 14/183,424, 21 pages.
Final Office Action dated Jun. 23, 2016 from U.S. Appl. No. 13/484,901, 18 pages.
Final Office Action dated Apr. 2, 2015 from U.S. Appl. No. 13/484,901, 13 pages.
Halo, Halo LED H4 H7 Collection, SustainabLEDesign, Cooper Lighting, (emphasis on p. 18 "H7 Collection LED Modules—Halo LED H7 Module Features,") Mar. 28, 2012, 52 pages.
Halo, H7 LED Downlight Trims 49x Series, 6-inch LED Trims for Use with MI7x LED Modules, Cooper Lighting, ADV110422, rev. Aug. 12, 2011, 15 pages.
Halo, LED Module ML706x, Cooper Lighting, General Installation for All Modules/p. 1; Tether Installation/pp. 2-3; Installation into Halo H750x Series LED—only (Non-Screw Based), Recessed Fixture, p. 4, Oct. 20, 2009, 4 pages.
Medvedev, V. et al., "Uniform LED illuminator for miniature displays," Proc. SPIE 3428, Illumination and Source Engineering, (Oct. 20, 1998); doi: 10.1117/12.327957;https://doi.org/10.1117/12.327957, 13 pages.
"Membrane Penetrations in Fire-Resistance Rated Walls," https://www.ul.com/wp-content/uploads/2014/04/ul_MembranePenetrations.pdf, Issue 1, 2009, published Feb. 26, 2010, 2 pages.
"Metallic Outlet Boxes," UL 514A, Underwriters Laboratories, Inc., Feb. 16, 2004 (Title Page Reprinted Aug. 10, 2007), 106 pages.
"Metallic and Non-metallic Outlet Boxes Used in Fire-rated Assembly," https://iaeimagazine.org/magazine/2000/09/16/metallic-and-non-metallic-outlet-boxes-used-in-fire-rated-assembly/, Sep. 16, 2000, 5 pages.
Notice of Allowance dated Mar. 26, 2018 for U.S. Appl. No. 14/184,601, 10 pages.
Non-Final Office Action dated Mar. 15, 2010 from U.S. Appl. No. 12/100,148, 8 pages.
Non-Final Office Action dated Apr. 30, 2010 from U.S. Appl. No. 12/173,232, 13 pages.
Non-Final Office Action dated Sep. 5, 2014 from U.S. Appl. No. 13/791,087, 8 pages.
Non-Final Office Action dated Jul. 20, 2015 from U.S. Appl. No. 14/184,601, 16 pages.
Non-Final Office Action dated Dec. 15, 2016 from U.S. Appl. No. 14/184,601, 18 pages.
Non-Final Office Action dated Feb. 6, 2018 from U.S. Appl. No. 15/167,682, 9 pages.
Non-Final Office Action dated Sep. 15, 2015 from U.S. Appl. No. 13/484,901, 16 pages.
Non-Final Office Action dated Oct. 16, 2014 from U.S. Appl. No. 13/484,901, 11 pages.
Non-Final Office Action dated Sep. 6, 2017 from U.S. Appl. No. 14/726,064, 8 pages.
Non-Final Office Action dated May 17, 2017 from U.S. Appl. No. 14/183,424, 20 pages.
Non-Final Office Action dated Jun. 2, 2015 from U.S. Appl. No. 14/183,424, 20 pages.
Non-Final Office Action dated Apr. 12, 2018 for U.S. Appl. No. 29/638,259, 5 pages.

(56) References Cited

OTHER PUBLICATIONS

Non-Final Office Action dated May 16, 2018 for U.S. Appl. No. 15/132,875, 18 pages.
Notice of Allowance dated Jan. 30, 2015 from U.S. Appl. No. 13/791,087, 9 pages.
Notice of Allowance dated Jan. 16, 2015 from U.S. Appl. No. 29/467,026, 9 pages.
Notice of Allowance dated Oct. 21, 2016 from U.S. Appl. No. 13/484,901, 7 pages.
Notice of Allowance dated Mar. 24, 2016 from U.S. Appl. No. 14/247,149, 8 pages.
Notice of Allowance dated May 22, 2018 from U.S. Appl. No. 14/183,424, 9 pages.
Notice of Allowance dated May 10, 2018 from U.S. Appl. No. 14/726,064, 7 pages.
Notice of Allowance dated Aug. 23, 2017 from Canadian Application No. 2,879,629, 1 page.
"Outlet Boxes for Use in Fire Rated Assemblies," https://www.ul.com/wp-content/uploads/2014/04/UI_outletboxes.pdf, Apr. 2007, 2 pages.
Parkyn, W. A. et al., "New TIR lens applications for light-emitting diodes", Proc. SPIE 3139, Nonimaging Optics: Maximum Efficiency Light Transfer IV, (Oct. 3, 1997); doi: 10.1117/12.290217, 7 pages.
Schreiber, P. et al., "Microoptics for homogeneous LED-illumination", Proc. SPIE 6196, Photonics in Multimedia, 61960P (Apr. 21, 2006); doi: 10.1117/12.663084; https://doi.org/10.1117/12.663084, 11 pages.
Van Giel, B. V. et al., "Design of axisymmetrical tailored concentrators for LED light source applications", Proc. SPIE 6196, Photonics in Multimedia, 619603 (Apr. 21, 2006); doi: 10.1117/12.660115; https://doi.org/10.1117/12.660115, 11 pages.
Zhen, Y. et al., "The optimal design of TIR lens for improving LED illumination uniformity and efficiency", Proc. SPIE 6834, Optical Design and Testing III, 68342K (Nov. 28, 2007); doi: 10.1117/12.756101, 9 pages.
Zou, H. et al., "58.1: Single-Panel LCOS Color Projector with LED Light Sources", SID Symposium, vol. 36, Issue 1, 4 pages (May 2005).
Notice of Allowance dated Sep. 21, 2018 from U.S. Appl. No. 29/645,941, 5 pages.
"Advanced LED Solutions," Imtra Marine Lighting. Jun. 17, 2011. 39 pages.
"Portland Bi-Color, Warm White/Red," item:ILIM30941.Imtra Marine Products. 2012. 3 pages. Accessed at http://www.imtra.com:80/0ade25fb-3218-4cae-a926-6abe64ffd93a/lighting-light-fixtures-downlights-3-to-4-inches-detail.htm on Jan. 25, 2013.
"Cree LMH2 LED Modules," Mouser Electronics. Accesssed at www.mouser.com/new/cree/creelmh2 on Sep. 9, 2012. 2 pages.
"Cree LMH2 LED Module with TrueWhite Technology," Cree Product Family Data Sheet. Dec. 21, 2011. 3 pages.
"Cree LMH2 LED Modules Design Guide," Cree Product Design Guide. 2011. 20 pages.
"Undercabinet Pucks, Xyris Mini LED Puck Light," ELCO Lighting. Sep. 2018. 1 page.
"LED Undercabinet Pocket Guide," ELCO Lighting. Nov. 2, 2016. 12 pages.
"VERSI LED Mini Flush," Lithonia Lghting. Sep. 2013. 6 pages.
Notice of Allowance dated Oct. 4, 2018 from U.S. Appl. No. 15/947,065, 9 pages.
Notice of Allowance dated Sep. 19, 2018 from U.S. Appl. No. 15/167,682, 7 pages.
Non-Final Office Action dated Jun. 25, 2018 for U.S. Appl. No. 29/541,565, 10 pages.
Non-Final Office Action dated Oct. 24, 2018 for U.S. Appl. No. 15/688,266, 14 pages.
OneFrame Recessed LED Downlight. Dmflighting.com. Published Jun. 6, 2018. Retrieved at https://www.dmflighting.com/product/oneframe on Jun. 6, 2018. 11 pages.
Notice of Allowance dated Oct. 9, 2018 from U.S. Appl. No. 29/653,142, 7 pages.
International Search Report and Written Opinion in PCT/US2018/048357 dated Nov. 14, 2018, 13 pages.
Notice of Allowance dated Nov. 27, 2018 from U.S. Appl. No. 15/167,682, 11 pages.
Non-Final Office Action dated Dec. 5, 2018 from U.S. Appl. No. 14/942,937, 13 pages.
International Search Report and Written Opinion in International Patent Application No. PCT/US18/39048 dated Dec. 14, 2018. 24 pages.
Notice of Allowance dated Jan. 2, 2019 from U.S. Appl. No. 29/541,565, 6 pages.
RACO 4 i+A882:C958n. Octagon Welded Concrete Ring, 3-1/2 in. Deep with 1/2 and 3/4 in. Knockouts and ilcludes 890 cover (20-Pack). Model # 280. Accessed at https://www.homedepot.com/p/RACO-4-in-Octagon-Welded-Concrete-Ring-3-1-2-in-Deep-with-1-2-and-3-4-in-Knockouts-and-ilcludes-890-cover-20-Pack-280/203638679 on Jan. 18, 2019. 3 pages.
RACO 4 in. Octagon Welded Concrete Ring, 6 in. Deep with 1/2 and 3/4 in. Knockouts (10-Pack). Model # 276. Accessed at https://www.homedepot.com/p/RACO-4-in-Octagon-Welded-Concrete-Ring-6-in-Deep-with-1-2-and-3-4-in-Knockouts-10-Pack-276/203638675 on Jan. 16, 2019. 4 pages.
Notice of Allowance dated Feb. 8, 2019 from U.S. Appl. No. 29/541,565, 5 pages.
Non-Final Office Action dated Feb. 7, 2019 from U.S. Appl. No. 16/200,393, 32 pages.
Notice of Allowance dated Jan. 28, 2019 from U.S. Appl. No. 29/664,471, 8 pages.
Non-Final Office Action dated Jul. 24, 2018 from U.S. Appl. No. 29/638,259, 5 pages.
Final Office Action dated Mar. 15, 2019 from U.S. Appl. No. 15/132,875, 15 pages.
International Search Report and Written Opinion in International Patent Application No. PCT/US18/62868 dated Mar. 14, 2019, 13 pages.
CS&E PCT Collaborative Search and Examination Pilot Upload Peer Contribution in International Patent Application No. PCT/US18/62868 dated Mar. 14, 2019, 61 pages.
Notice of Allowance dated Apr. 1, 2019 from U.S. Appl. No. 15/167,682, 7 pages.
Non-Final Office Action dated Apr. 4, 2019 from U.S. Appl. No. 29/678,482, 8 pages.
Notice of Allowance dated Apr. 8, 2019 from U.S. Appl. No. 29/653,142, 8 pages.
Notice of Allowance dated Apr. 17, 2019 from U.S. Appl. No. 29/678,478, 7 pages.
International Search Report and Written Opinion in International Patent Application No. PCT/US18/67614 dated Apr. 25, 2019, 20 pages.
CS&E PCT Collaborative Search and Examination Pilot Upload Peer Contribution in International Patent Application No. PCT/US18/67614 dated Apr. 24, 2019, 53 pages.
Specification & Features 4" Octagonal Concrete Box Covers. Orbit Industries, Inc. Accessed at https://www.orbitelectric.com on May 6, 2019. 1 page.
4" Octagon Concrete Boxes and Back Plates. Appleton. Accessed at www.appletonelec.com on May 6, 2019. 1 page.
RACO Commercial, Industrial and Residential Electrical Products. Hubbell. Accessed at www.Hubbell-RTB.com on May 6, 2019. 356 pages.
Imtra Marine Lighting 2008 Catalog. 40 pages.
Imtra Marine Lighting 2009 Catalog. 32 pages.
Imtra Marine Lighting Spring 2007 Catalog. 36 pages.
Final Office Action dated Jun. 6, 2019 from U.S. Appl. No. 15/688,266, 7 pages.
Non-Final Office Action dated Jun. 11, 2019 from U.S. Appl. No. 15/901,738, 6 pages.
Notice of Allowance dated Jun. 12, 2019 from U.S. Appl. No. 16/016,040, 8 pages.

(56) References Cited

OTHER PUBLICATIONS

Cooper Lighting HALO ML56 LED System Product Sheet. Mar. 2, 2015. Accessed at http://www.cooperindustries.com/content/dam/public/lighting/products/documents/halo/spec_sheets/halo-ml56600-80cri-141689-sss.pdf. 8 pages.
KWIKBRACE® New Construction Braces for Lighting Fixtures or Ceiling Fans 1-1/2 in. Depth. Hubbel. Accessed at https://hubbellcdn.com/specsheet/926.pdf on Jun. 27, 2019. 1 page.
IC1JB Housing 4" IC-Rated New Construction Junction Box Housing. AcuityBrands. Accessed at https://www.acuitybrands.com/en/products/detail/845886/juno/ic1jb-housing/4-ic-rated-new-construction-junction-box-housing on Jun. 27, 2019.
Ex-Parte Quayle Action mailed Jun. 27, 2019 from U.S. Appl. No. 29/683,730, 5 pages.
Notice of Allowance dated Jul. 31, 2019 from U.S. Appl. No. 15/167,682, 7 pages.
Supplemental Notice of Allowance dated Aug. 5, 2019 from U.S. Appl. No. 15/947,065, 2 pages.
International Search Report and Written Opinion in International Patent Application No. PCT/US19/32281 dated Aug. 2, 2019, 18 pages.
Notice of Allowance dated Sep. 11, 2019 from U.S. Appl. No. 29/653,142, 6 pages.
Notice of Allowance dated Sep. 19, 2019 from U.S. Appl. No. 16/016,040, 7 pages.
Corrected Notice of Allowance dated Sep. 27, 2019 from U.S. Appl. No. 15/167,682, 2 pages.
Final Office Action dated Sep. 27, 2019 from U.S. Appl. No. 16/200,393, 34 pages.
Notice of Allowance dated Feb. 15, 2019 from U.S. Appl. No. 15/947,065, 9 pages.
Notice of Allowance dated Oct. 1, 2019 from U.S. Appl. No. 14/942,937, 7 pages.
Final Office Action dated Oct. 3, 2019 from U.S. Appl. No. 29/678,482, 6 pages.
Delhi Rehab & Nursing Facility ELM16-70884. Vertex Innovative Solutions Feb. 25, 2016. 89 pages.
SlimSurface surface mount downlighting. Philips Lightolier 2018. 8 pages.
Be seen in the best light. Lightolier by signify. Comprehensive 2019 Lighting Catalog. 114 pages.
Corrected Notice of Allowance dated Oct. 10, 2019 from U.S. Appl. No. 16/016,040, 2 pages.
Cree® LMR2 LED Module. Product Family Data Sheet Cree 2011. 3 pages.
Notice of Allowance dated Oct. 16, 2019 from U.S. Appl. No. 15/132,875, 12 pages.
International Search Report and Written Opinion in International Patent Application No. PCT/US2019/036477 dated Oct. 17, 2019, 15 pages.
ML56 LED Lighting System 600 / 900 / 1200 Series Halo. Cooper Lighting Brochure 2015. Accessed at https://images.homedepot-static.com/catalog/pdfImages/06/06d28f93-4bf6-45be-a35a-a0239606f227.pdf. 41 pages.
Switch and Outlet Boxes and Covers Brochure. Appelton 2010. 77 pages.
Non-Final Office Action dated Dec. 30, 2019 from U.S. Appl. No. 16/653,497, 8 pages.
Notice of Allowance dated Feb. 5, 2020 from U.S. Appl. No. 15/901,738, 8 pages.
Notice of Allowance dated Feb. 5, 2020 from U.S. Appl. No. 29/678,482, 13 pages.
Maxim Lighting Wafer Trifold Brochure LMXBRO1711 2017. Accessed at https://www.maximlighting.com/Upload/download/brochure/pdf/LMXBRO1711.pdf on Feb. 13, 2020. 2 pages.
Maxim Convert Fixture. LMXCAT1805 Maxim Main Catalog 2018 p. 639.
Maxim Wafer. LMXCAT1805 Maxim Main Catalog 2018 pp. 636-638.
Maxim Lighting Trim Trifold LMXBRO1905 2019. Accessed at https://www.maximlighting.com/Upload/download/brochure/pdf/LMXBRO1905.pdf on Feb. 13, 2020. 2 pages.
International Search Report and Written Opinion in International Patent Application No. PCT/US2019/054220 dated Feb. 24, 2020, 23 pages.
Final Office Action dated Mar. 17, 2020 for U.S. Appl. No. 29/653,142, 13 pages.
LED Book Price Guide 2012. DMF Light. Issued Jun. 26, 2013. 3 pages.
DLER411 4" Recessed LED Retrofit Module. DMF Light. Issued Jun. 15, 2011. 1 page.
DLEI411 4" Recessed LED New Construction, IC. DMF Light. Issued Nov. 30, 2011. 1 page.
DLEIR411 4" Recessed LED Remodel, IC. DMF Light. Issued Jun. 15, 2011. 1 page.
3 & 4" DLE Series LED Sample Case Now Available. DMF Light. Issued Jan. 6, 2012. 1 page.
DLEI3 3" Recessed LED New Construction, IC. DMF Light. Issued Nov. 30, 2011. 2 pages.
Ridgway-Barnes, SlimSurface LED Downlight: One of the thinnest LED surface mount downlights in the market. Philips Lighting Blog. Oct. 28, 2014. Accessed at http://applications.nam.lighting.philips.com/blog/index.php/2014/10/28/slimsurface-led-downlight-one-of-the-thinnest-led-surface-mount-downlights-in-the-market/. 3 pages.
SlimSurface LED S5R, S7R & S10R Round 5", 7" and 10" Apertures. Lightolier by Signify. Nov. 2018. 9 pages.
Non-Final Office Action dated Apr. 2, 2020 for U.S. Appl. No. 16/522,275, 21 pages.
Notice of Allowance dated May 18, 2020 from U.S. Appl. No. 15/901,738, 7 pages.
Non-Final Office Action dated May 20, 2020 for U.S. Appl. No. 15/688,266, 6 pages.
Non-Final Office Action dated May 26, 2020 for U.S. Appl. No. 16/719,361, 10 pages.
Maxim Lighting International, "Wafer LED 7" RD 3000K Wall/Flush Mount", undated.
Maxim Lighting International, "Convert LED Flush Mount", undated.
Maxim Lighting International, "Views of the Wafer Flush Mount", undated.
Maxim Lighting International, "Product/Drawing Specification Sheet", undated.
International Search Report and Written Opinion in PCT/US2020/017331 dated Jun. 22, 2020, 16 pages.
Taiwan Office Action and translation thereof dated Jun. 12, 2020 from Taiwan Application No. 108116564, 8 pages.
Access Lighting Installation Instructions. No. 20870LEDD/20871LEDD/20872LEDD. Dec. 16, 2019. 2 pages.
Model No. 20870LEDD-WH/ACR Infinite Specification Sheet. Access Lighting. Apr. 9, 2020. 1 page.
Notice of Allowance dated Apr. 9, 2020 from U.S. Appl. No. 16/653,497, 7 pages.
Notice of Allowance dated Jul. 10, 2020 from U.S. Appl. No. 29/694,475, 6 pages.
Notice of Allowance dated Jul. 20, 2020 from U.S. Appl. No. 29/648,046, 5 pages.
Octagon Concrete Box Cover with (3) 1/2 in. & (2) 3/4 in. Conduit Knockouts. Garvin. Accessed at https://www.garvinindustries.com/covers-and-device-rings/concrete-slab-box-covers-adaptor-rings/flat-covers-all-styles/cbp?gclid=Cj0KCQjw9b_4BRCMARIsADMUIypJc0K80UHdDTI9C5m4BDzR3U87PRYV1NdQIBFxEWQ2I_3otTCTqEkaAi_DEALw_wcB on Jul. 20, 2020. 1 page.
Notice of Allowance dated Jul. 28, 2020 from U.S. Appl. No. 16/719,361, 8 pages.
Notice of Allowance dated Jul. 29, 2020 from U.S. Appl. No. 16/522,275, 8 pages.
Non-Final Office Action dated Aug. 19, 2020 for U.S. Appl. No. 16/886,365, 16 pages.
Notice of Allowance dated Sep. 8, 2020 from U.S. Appl. No. 29/678,482, 5 pages.
Corrected Notice of Allowance dated Sep. 11, 2020 from U.S. Appl. No. 16/719,361, 2 pages.

(56) References Cited

OTHER PUBLICATIONS

Canadian Office Action in Application No. 2931588 dated Aug. 13, 2020, 5 pages.
Corrected Notice of Allowance dated Sep. 14, 2020 from U.S. Appl. No. 16/522,275, 2 pages.
Notice of Allowance dated Sep. 22, 2020 from U.S. Appl. No. 29/683,730, 6 pages.
Notice of Allowance dated Sep. 22, 2020 from U.S. Appl. No. 29/653,142, 6 pages.
Notice of Allowance dated Oct. 27, 2020 from U.S. Appl. No. 29/648,046, 5 pages.
Notice of Allowance dated Oct. 27, 2020 from U.S. Appl. No. 29/694,475, 5 pages.
Notice of Allowance dated Nov. 10, 2020 from U.S. Appl. No. 29/688,143, 6 pages.
Notice of Allowance dated Nov. 10, 2020 from U.S. Appl. No. 29/688,172, 6 pages.
Non-Final Office Action dated Nov. 30, 2020 from U.S. Appl. No. 17/000,702, 7 pages.
Notice of Allowance dated Dec. 2, 2020 from U.S. Appl. No. 29/746,262, 6 pages.
International Search Report and Written Opinion in PCT/US2020/050767 dated Dec. 9, 2020, 25 pages.
Non-Final Office Action dated Dec. 16, 2020 from U.S. Appl. No. 17/080,080, 28 pages.
Canadian Office Action in Application No. 2941051 dated Dec. 8, 2020, 5 pages.
Final Office Action dated Jan. 11, 2021 from U.S. Appl. No. 15/688,266, 7 pages.
Non-Final Office Action dated Jan. 11, 2021 from U.S. Appl. No. 16/725,606, 7 pages.
Non-Final Office Action dated Jan. 13, 2021 from U.S. Appl. No. 17/085,636, 14 pages.
Notice of Allowance dated Jan. 15, 2021 from U.S. Appl. No. 17/000,702, 7 pages.
Notice of Allowance dated Jan. 22, 2021 from U.S. Appl. No. 17/080,080, 14 pages.
Notice of Allowance dated Jan. 22, 2021 from U.S. Appl. No. 16/886,365, 7 pages.
Final Office Action dated Feb. 5, 2021 from U.S. Appl. No. 16/200,393, 7 pages.
"Electrical Boxes" accessed at http://electrical-inspector.blogspot.com/2013/06/electrical-boxes.html Jun. 22, 2013 retrieved from Wayback Machine Archinve.org on Jan. 25, 2021. 12 pages.
"Electrical Boxes Volume and Fill Calculations" accessed at http://electrical-inspector.blogspot.com/2013/06/electrical-boxes-Volume-and-Fill-Calculations.html Jun. 22, 2013 retrieved from Wayback Machine Archinve.org on Jan. 25, 2021. 8 pages.
U.S. Appl. No. 61/881,162, filed Sep. 23, 2013. Prioirty application to US Publication No. 2015/0085500 to Cooper et al. 31 pages.
Non-Final Office Action dated Jan. 19, 2021 from U.S. Appl. No. 17/099,650, 15 pages.
Supplemental Notice of Allowance dated Mar. 10, 2021 from U.S. Appl. No. 16/886,365, 2 pages.
Notice of Allowance dated Apr. 6, 2021 from U.S. Appl. No. 16/200,393, 11 pages.
Non-Final Office Action dated Apr. 12, 2021 from U.S. Appl. No. 29/694,475, 11 pages.
Notice of Allowance dated Apr. 13, 2021 from U.S. Appl. No. 16/725,606, 7 pages.
Notice of Allowance dated Apr. 26, 2021 from U.S. Appl. No. 17/080,080, 11 pages.
Corrected Notice of Allowance dated Apr. 28, 2021 from U.S. Appl. No. 16/725,606, 2 pages.
Notice of Allowance dated May 5, 2021 from U.S. Appl. No. 17/085,636, 8 pages.
Notice of Allowance dated May 14, 2021 from U.S. Appl. No. 16/881,686, 8 pages.
Notice of Allowance dated May 17, 2021 from U.S. Appl. No. 15/688,266, 9 pages.
Notice of Allowance dated May 24, 2021 from U.S. Appl. No. 29/688,143, 6 pages.
Notice of Allowance dated May 24, 2021 from U.S. Appl. No. 29/688,172, 6 pages.
Notice of Allowance dated May 27, 2021 from U.S. Appl. No. 16/779,865, 9 pages.
Notice of Allowance dated May 28, 2021 from U.S. Appl. No. 16/779,824, 11 pages.
Notice of Allowance dated Jun. 1, 2021 from U.S. Appl. No. 16/719,361, 7 pages.
Corrected Notice of Allowance dated Jun. 21, 2021 from U.S. Appl. No. 16/779,865, 3 pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, IPR2019-01094 filed May 17, 2019. 108 pages.
IPR2019-01094 Exhibit 1001. U.S. Pat. No. 9,964,266 ("the '266 Patent"). 14 pages.
IPR2019-01094 Exhibit 1002. Declaration of Eric Bretschneider, Ph.D. ("Bretschneider"). 107 pages.
IPR2019-01094 Exhibit 1003. Curriculum Vitae of Dr. Bretschneider. 11 pages.
IPR2019-01094 Exhibit 1004. Excerpts from the File History of U.S. Pat. No. 9,964,266. 105 pages.
IPR2019-01094 Exhibit 1005. Imtra 2011 Marine Lighting Catalog—Advanced LED Solutions ("Imtra 2011"). 40 pages.
IPR2019-01094 Exhibit 1006. Imtra 2007 Marine Lighting Catalog ("Imtra 2007"). 36 pages.
IPR2019-01094 Exhibit 1007. U.S. Pat. No. 9,366,418 ("Gifford"). 9 pages.
IPR2019-01094 Exhibit 1008. Declaration of Colby Chevalier ("Chevalier"). 89 pages.
IPR2019-01094 Exhibit 1009. U.S. Pat. No. 7,102,172 ("Lynch"). 41 pages.
IPR2019-01094 Exhibit 1010. Illuminating Engineering Society, ANSI RP-16-10, Nomenclature and Definitions for Illuminating Engineering (approved as an American National Standard Jul. 15, 2005, approved by the IES Board of Directors Oct. 15, 2005). 4 pages.
IPR2019-01094 Exhibit 1011. Underwriters Laboratories Inc. Standard for Safety, Standard UL-8750, entitled Light Emitting Diode (LED) Equipment for Use in Lighting (1st ed. 2009). 5 pages.
IPR2019-01094 Exhibit 1012. Celanese CoolPoly® D5502 Thermally Conductive Liquid Crystalline Polymer Specification ("CoolPoly"). 1 page.
IPR2019-01094 Exhibit 1013. Illuminating Engineering Society of North America, IES Lighting Handbook (John E. Kaufman and Howard Haynes eds., Application vol. 1981) ("Lighting Handbook"). 5 pages.
IPR2019-01094 Exhibit 1014. California Energy Commission, PIER Lighting Research Program: Project 2.3 Low-profile LED Luminaires Final Report (Prepared by Lighting Research Center, Jan. 2005) ("PIER LRP"). 70 pages.
IPR2019-01094 Exhibit 1015. Jim Sinopoli, Using DC Power to Save Energy and End the War on Currents, GreenBiz (Nov. 15, 2012), https://www.greenbiz.com/news/2012/11/15/using-dc-power-save-energy-end-war-currents ("Sinopoli"). 6 pages.
IPR2019-01094 Exhibit 1016. Robert W. Johnson, "Thought Leadership White Paper: AC Versus DC Power Distribution" (Nov. 2012) ("Johnson"). 10 pages.
IPR2019-01094 Exhibit 1017. Lumileds, LUXEON Rebel General Purpose Product Datasheet, Specification DS64 (2016) ("Luxeon Rebel"). 26 pages.
IPR2019-01094 Exhibit 1018. U.S. Pat. No. 8,454,204 ("Chang"). 11 pages.
IPR2019-01094 Exhibit 1019. U.S. Department of Energy, CALiPER Benchmark Report: Performance of Incandescent A-Type and Decorative Lamps and LED Replacements (prepared by Pacific National Laboratory, Nov. 2008) ("CALiPER 2008"). 25 pages.
IPR2019-01094 Exhibit 1020. U.S. Pat. No. 3,836,766 ("Auerbach"). 13 pages.

(56) References Cited

OTHER PUBLICATIONS

IPR2019-01094 Exhibit 1021. U.S. Department of Energy, CALiPER Application Summary Report 16: LED BR30 and R30 Lamps (prepared by Pacific Northwest National Laboratory, Jul. 2012) ("CALiPER 2012"). 26 pages.
IPR2019-01094 Exhibit 1022. Sandia National Laboratories, Sandia Report: "The Case for a National Research Program on Semiconductor Lighting" (Jul. 2000) ("Haitz"). 24 pages.
IPR2019-01094 Exhibit 1023. Sylvania, Post Top Street Light LED Retrofit Kit Specification, LED40POST (2009) ("Sylvania"). 4 pages.
IPR2019-01094 Exhibit 1024. Webster's New Collegiate Dictionary (1973) ("Webster's"). 2 pages.
IPR2019-01094 Exhibit 1025. 3M Wire Connectors and Tools Catalog 2013 ("3M Catalog"). 22 pages.
IPR2019-01094 Exhibit 1026. Wakefield Semiconductor Heat Sinks and Thermal Products 1974 Catalog ("Wakefield"). 3 pages.
IPR2019-01094 Exhibit 1027. U.S. Department of Energy, Solid-State Lighting Research and Development Portfolio: Multi-Year Program Plan FY'07-FY'12 (prepared by Navigant Consulting, Inc., Mar. 2006) ("DOE 2006"). 129 pages.
IPR2019-01094 Exhibit 1028. U.S. Department of Energy, Solid-State Lighting ResearA1023:C1043elopment: Multi-Year Program Plan (Apr. 2013) ("DOE 2013"). 89 pages.
Declaration of Colby Chevalier from Central District of California Civil Docket for Case #: 2:18-cv-07090-CAS-GJS filed Jun. 3, 2019, signed Jun. 3, 2019. 2 pages.
Docket Listing in Inter Partes Review of U.S. Pat. No. 9,964,266. Docket Navegator *AMP Plus, Inc. d/b/a Elco Lighting et al.* v. *DMF, Inc.* PTAB-IPR2019-01094. Downloaded Mar. 25, 2020. 4 pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, PTAB-IPR2019-01500 filed Aug. 14, 2019. 99 pages.
Docket Listing in Inter Partes Review of U.S. Pat. No. 9,964,266. *AMP Plus, Inc. d/b/a ELCO Lighting et al.* v. *DMF, Inc.* PTAB-IPR2019-01500. Downloaded Mar. 25, 2020. 3 pages.
Civil Action No. 2:18-cv-07090. Complaint for Infringement and Unfair Competition. *DMF, Inc.* v. *AMP Plus, Inc. d/b/a ELCO Lighting.* 52 pages. Dated Aug. 15, 2018.
Docket Listing in Civil Action No. 2:18-cv-07090. *DMF, Inc.* v. *AMP Plus, Inc. d/b/a ELCO Lighting et al* CDCA-2-18-CV-07090. Downloaded on Mar. 25, 2020. 39 pages.
Civil Action No. 2:19-cv-4519. Complaint for Patent Infringement. *DMF, Inc.* v. *AMP Plus, Inc. d/b/a ELCO Lighting.* 52 pages dated May 22, 2019. 23 pages.
Docket Listing in Civil Action No. 2:19-cv-4519. *DMF Inc* v. *AMP Plus, Inc. d/b/a ELCO Lighting et al.* CDCA-2-19-cv-04519. Downloaded on Mar. 25, 2020. 3 pages.
Decision Denying Institution of Inter Partes Review of U.S. Pat. No. 9,964,266 in IPR2019-01500 dated Mar. 17, 2020. 21 pages.
Defendants' Notice of Prior Art Pursuant to 35 U.S.C. § 282 in Civil Action No. 2:18-cv-07090-CAS-GJS dated Feb. 28, 2020. 7 pages.
Defendant AMP Plus, Inc.'s Opposition to DMF's Motion for Summary Judgement in Civil Action No. 2:18-cv-07090-CAS-GJS filed Feb. 10, 2020. 32 pages.
Declaration of Eric Bretschneider, Ph.D In Support of Amp Plus, Inc.'s Opposition to Dmf, Inc.'s Motion for Partial Summary Judgment in Civil Action No. 2:18-cv-07090-CAS-GJS filed Feb. 10, 2020. 210 pages.
Plaintiff DMF's Reply in Support of Motion for Partial Summary Judgment in Civil Action No. 2:18-cv-07090-CAS-GJS filed Feb. 18, 2020. 33 pages.
Declaration of James R. Benya in Support of Plaintiff DMF's Motion for Summary Judgment in Civil Action No. 2:18-cv-07090-CAS-GJS filed Feb. 3, 2020. 193 pages.
Underwriters Laboratories Inc. Standard for Safely. UL 1598. Luminaires Jan. 11, 2020. 12 pages.
Exceptional LED Lighting Technology Product Portfolio. LightingScience 2012. 11 pages.
"Cree LMH2 LED Modules," Mouser Electronics. Sep. 9, 2012. 4 pages.
Slim Line Disc. EYE LEDs Specification Sheet 2012. 2 pages.
HiBay LED Heat Sink. Wakefield-vette. Dec. 11, 2017. 1 pages.
Thermal Management of Cree® XLamp® LEDs. Cree Application Note. 2004. 19 pages.
Imtra Marine Lighting Fall 2007 Catalog. 32 pages.
Cree LMH2 LED Modules Product Family Data Sheet. Cree 2011-2014, 18 pages.
Cree LMH2 LED Modules Design Guide. Cree 2011-2015, 23 pages.
Brochure of Elco EL49A, EL49ICA, EL49RA modules. ELCO Lighting Nov. 25, 2009. 1 page.
Image of Elco E347/247 module identified by Elco in response to DMF's Request for Production in Civil Action No. 2:18-cv-07090-CAS-GJS on Aug. 28, 2019. 1 page.
Screenshots from the Deposition of Brandon Cohen in Civil Action No. 2:18-cv-07090-CAS-GJS. Conducted Sep. 2, 2020. 8 pages.
Defendant AMP Plus, Inc.'s Initial Disclosure and Designation of Expert Witnesses in Civil Action No. 2:19-CV-4519-CAS. 37 pages.
Defendant AMP Plus, Inc. D/B/A Elco Lighting's Supplemental Responses to Plaintiff DMF, Inc.'s First Set of Interrogatories (Nos. 1-16) in Civil Action No. 2:19-CV-4519-CAS, Redacted. 13 pages.
Final Written Decision in IPR2019-01094 dated Nov. 19, 2020, 58 pages.
Non-Final Office Action dated Jul. 14, 2021 from U.S. Appl. No. 17/118,742, 11 pages.
Chinese Office Action and English Translation Thereof in Chinese Patent Application No. 201880088009.9 dated Jun. 30, 2021, 18 pages.
Notice of Allowance dated Jul. 21, 2021 from U.S. Appl. No. 17/318, 13 pages.

\* cited by examiner

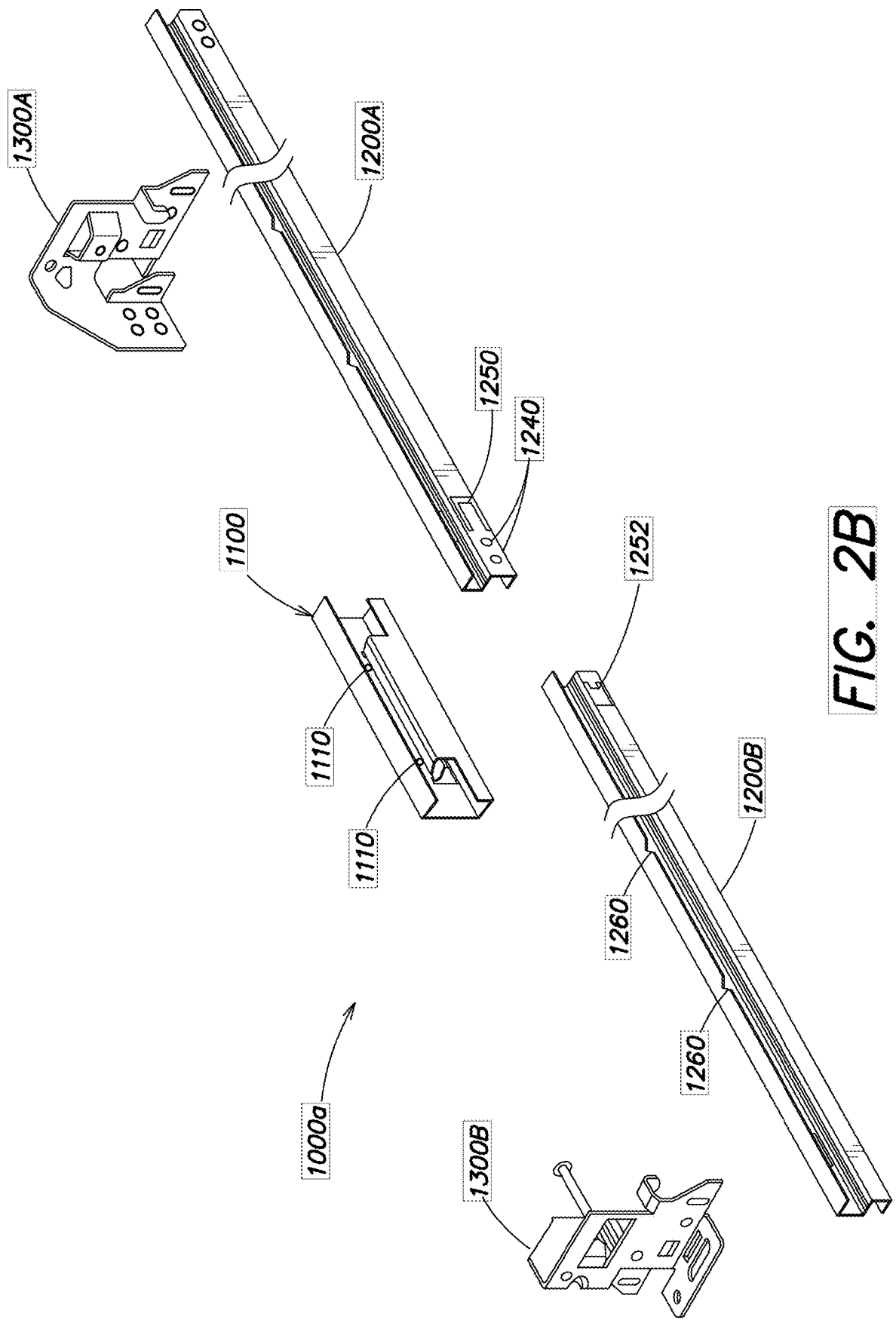

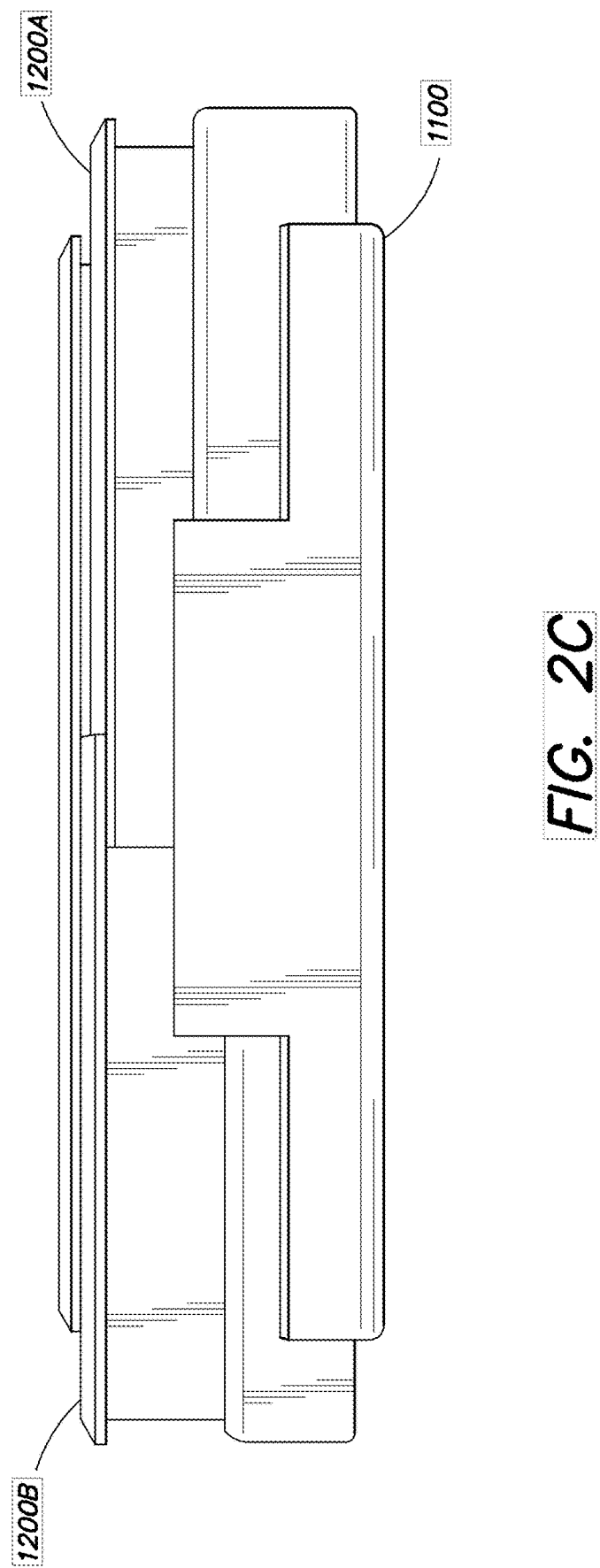

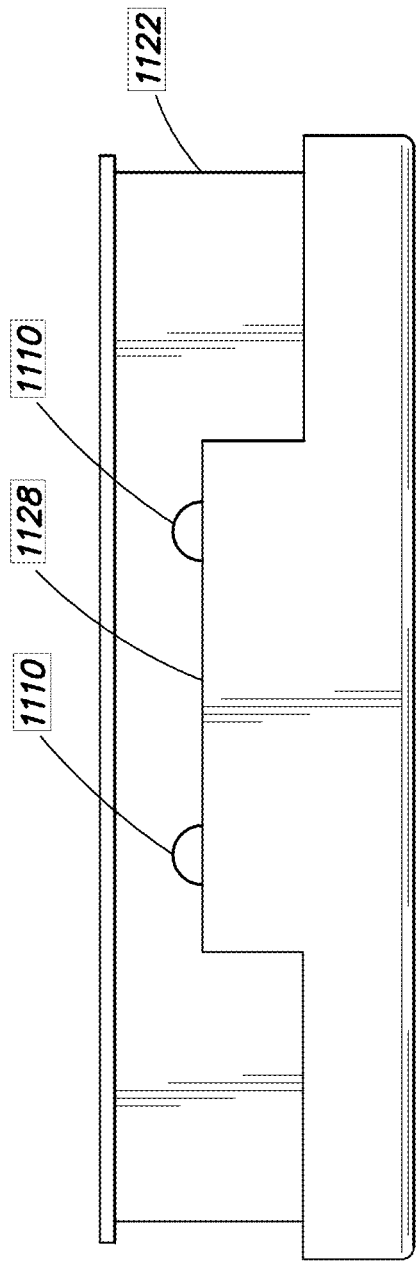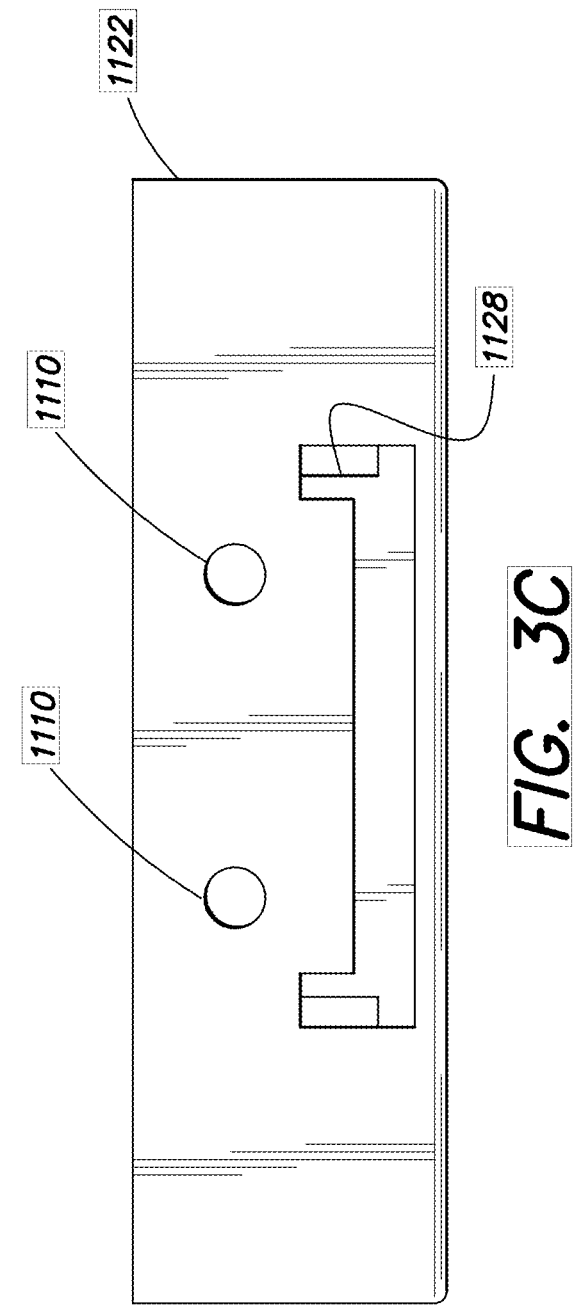

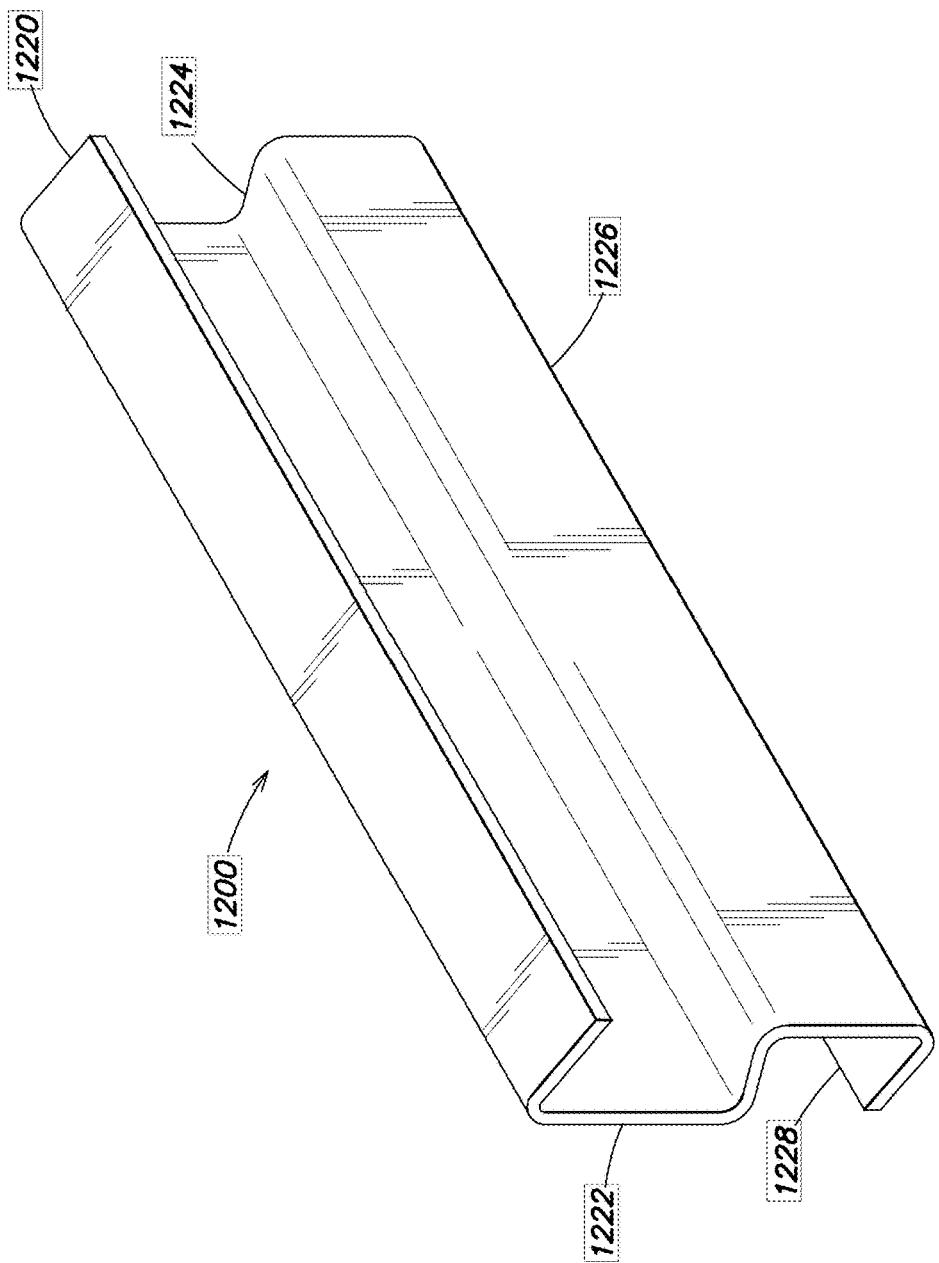
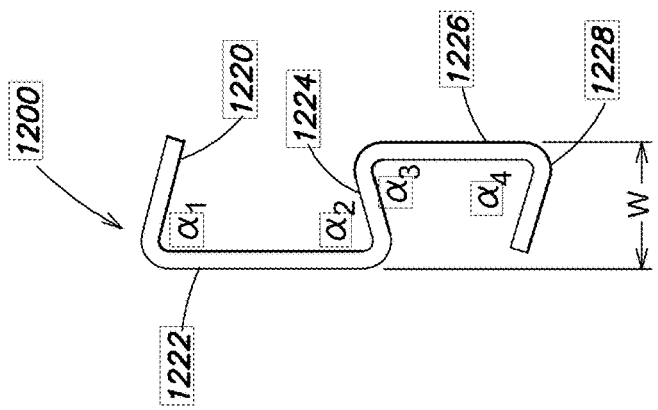

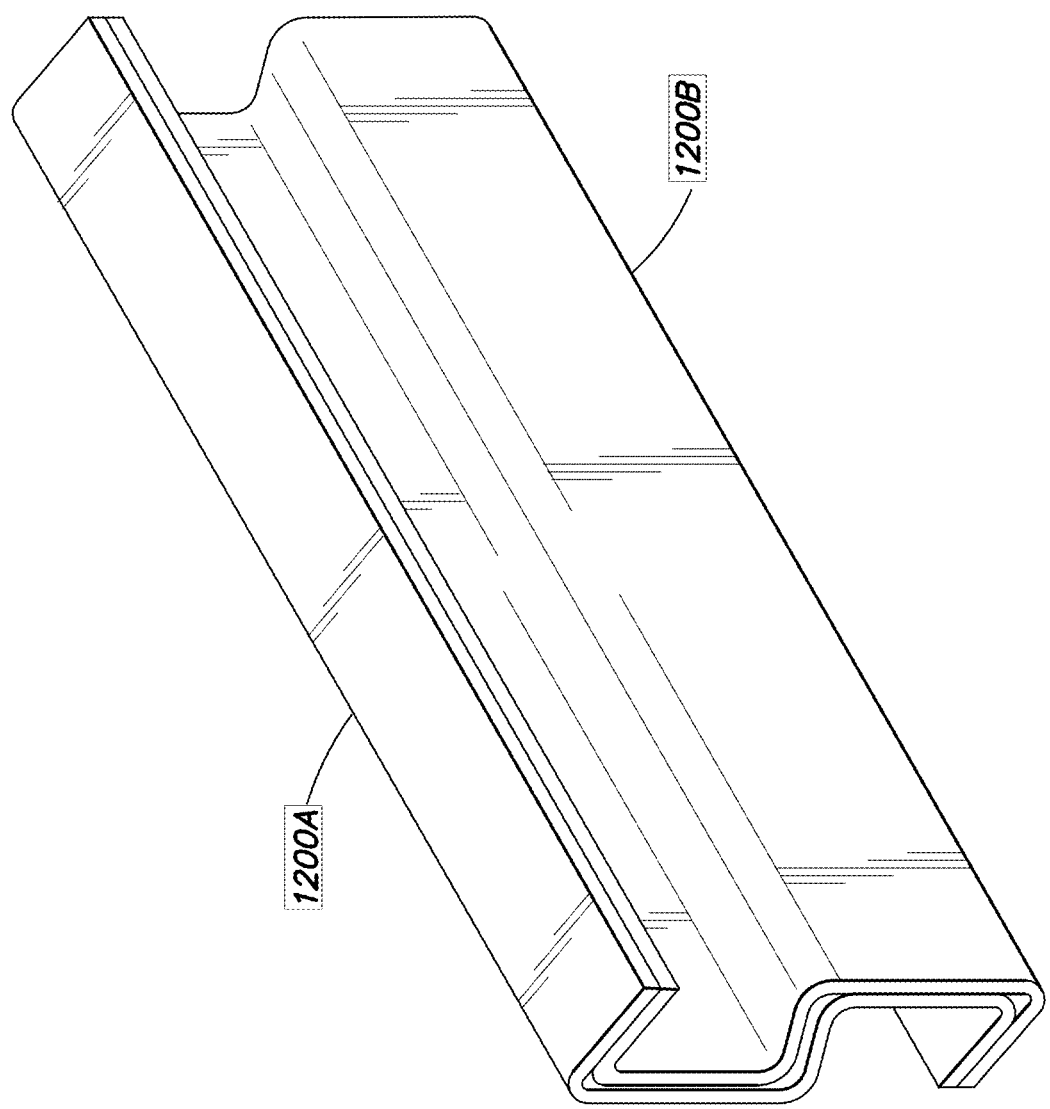
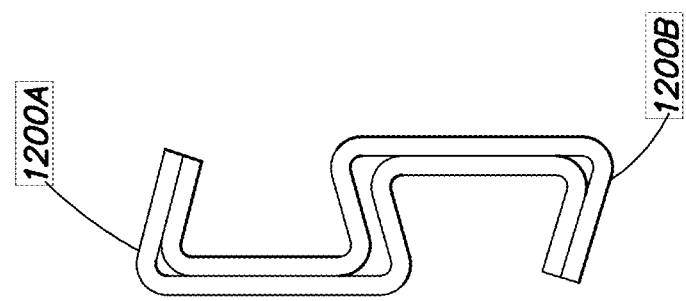

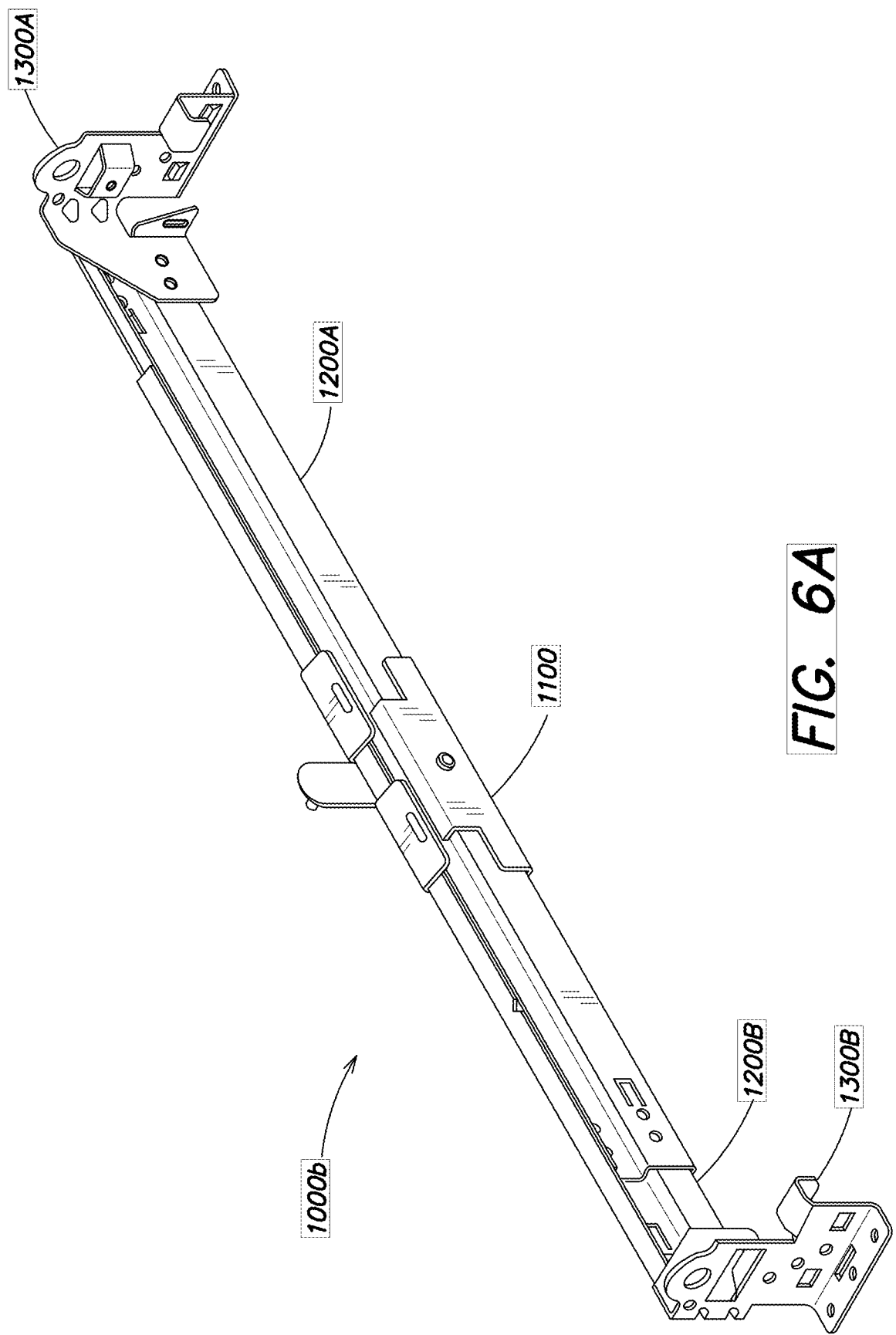

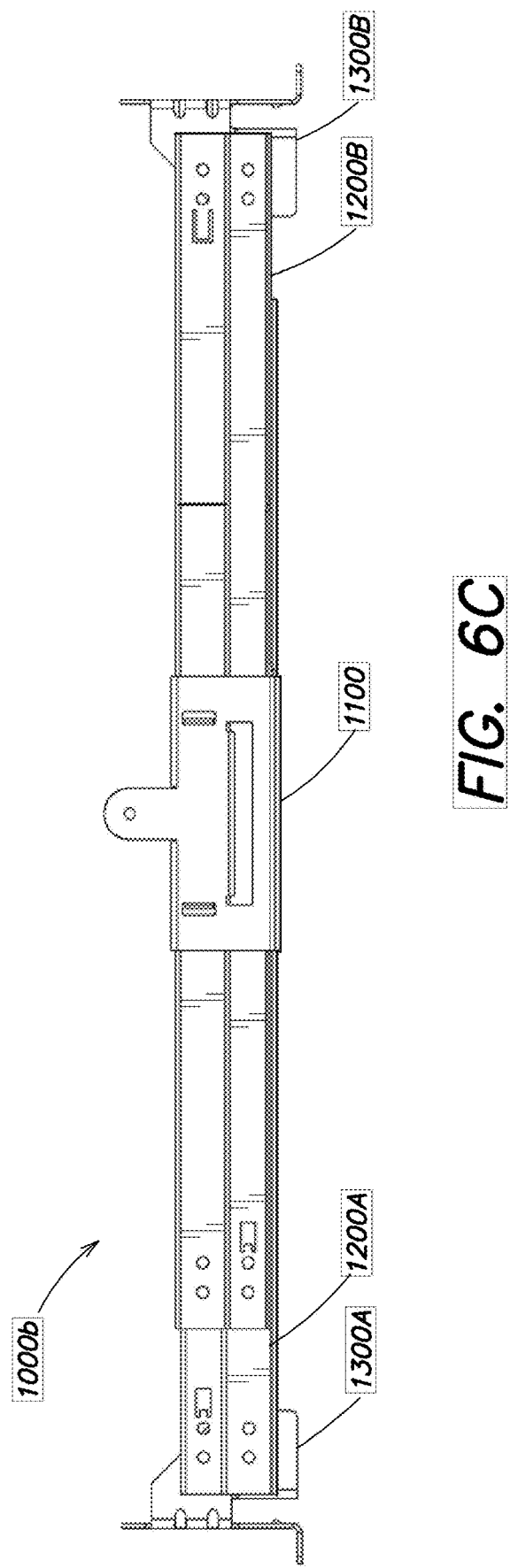

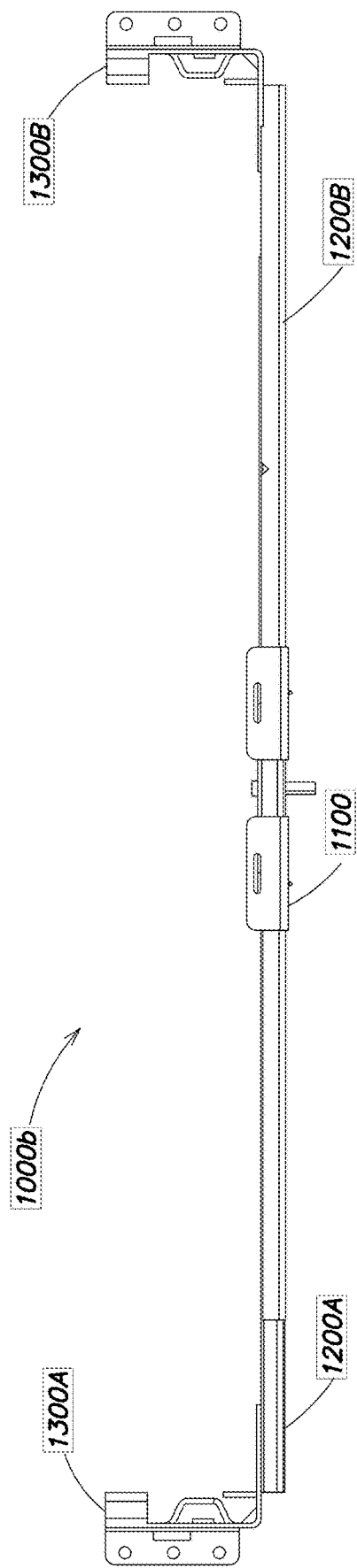

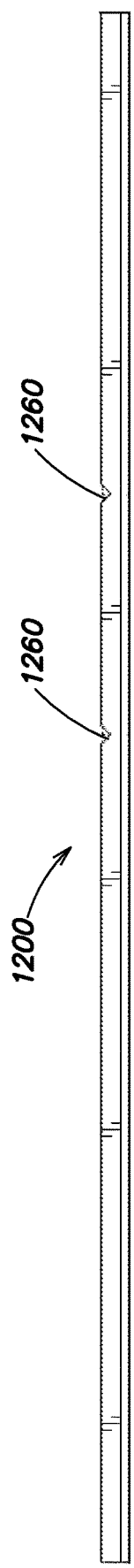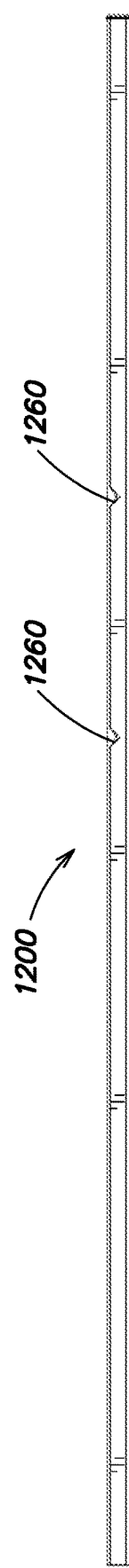

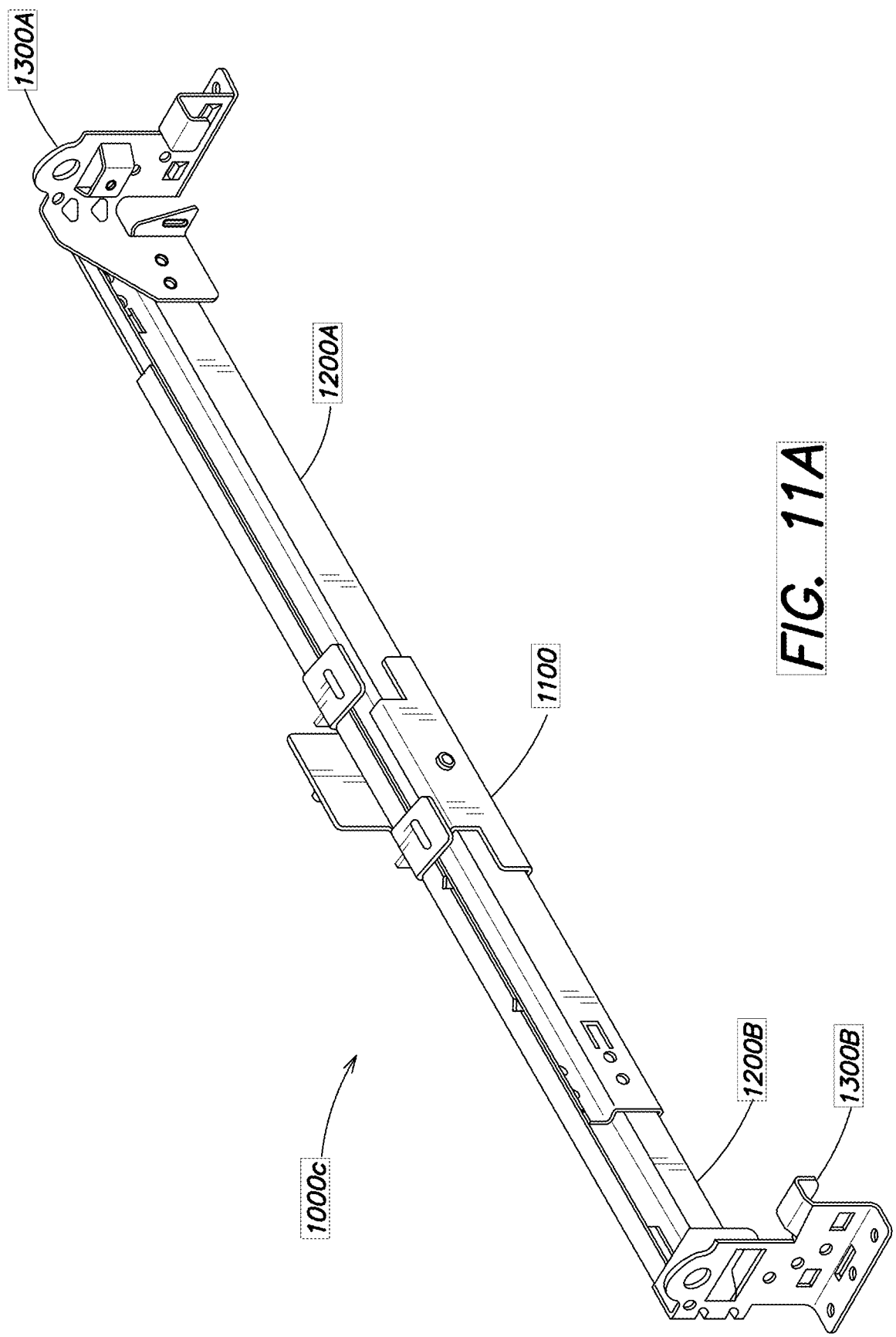

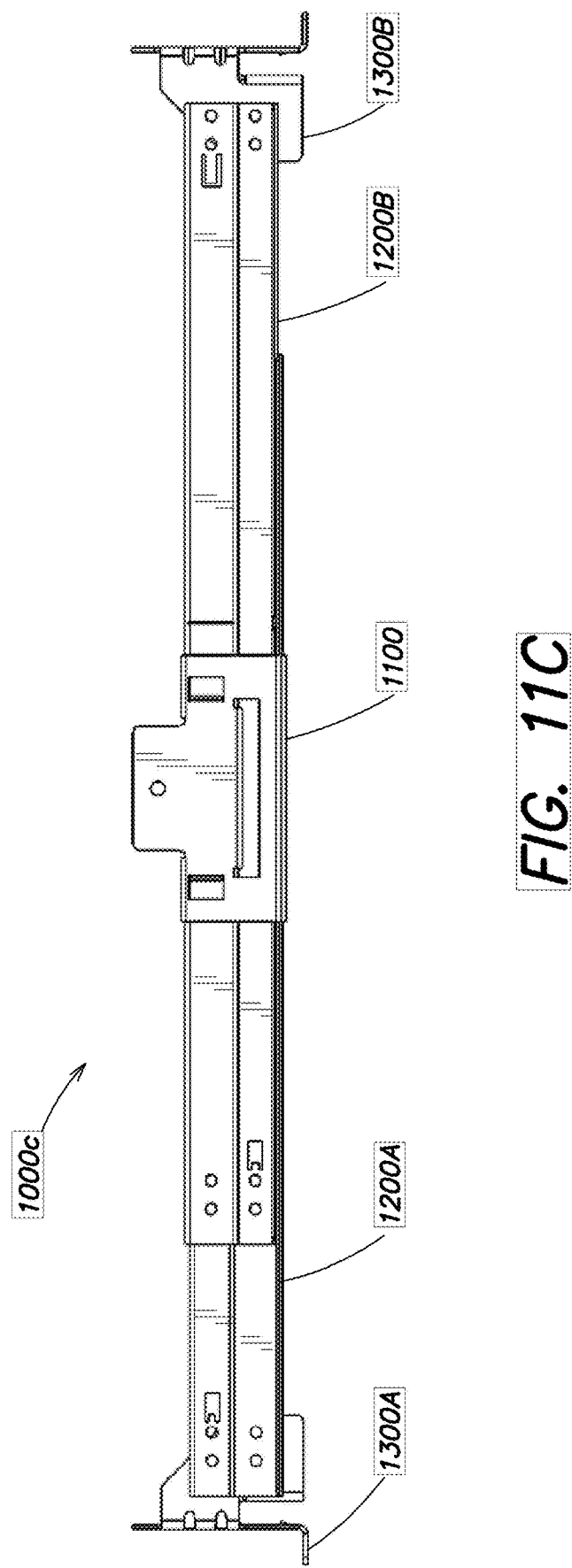

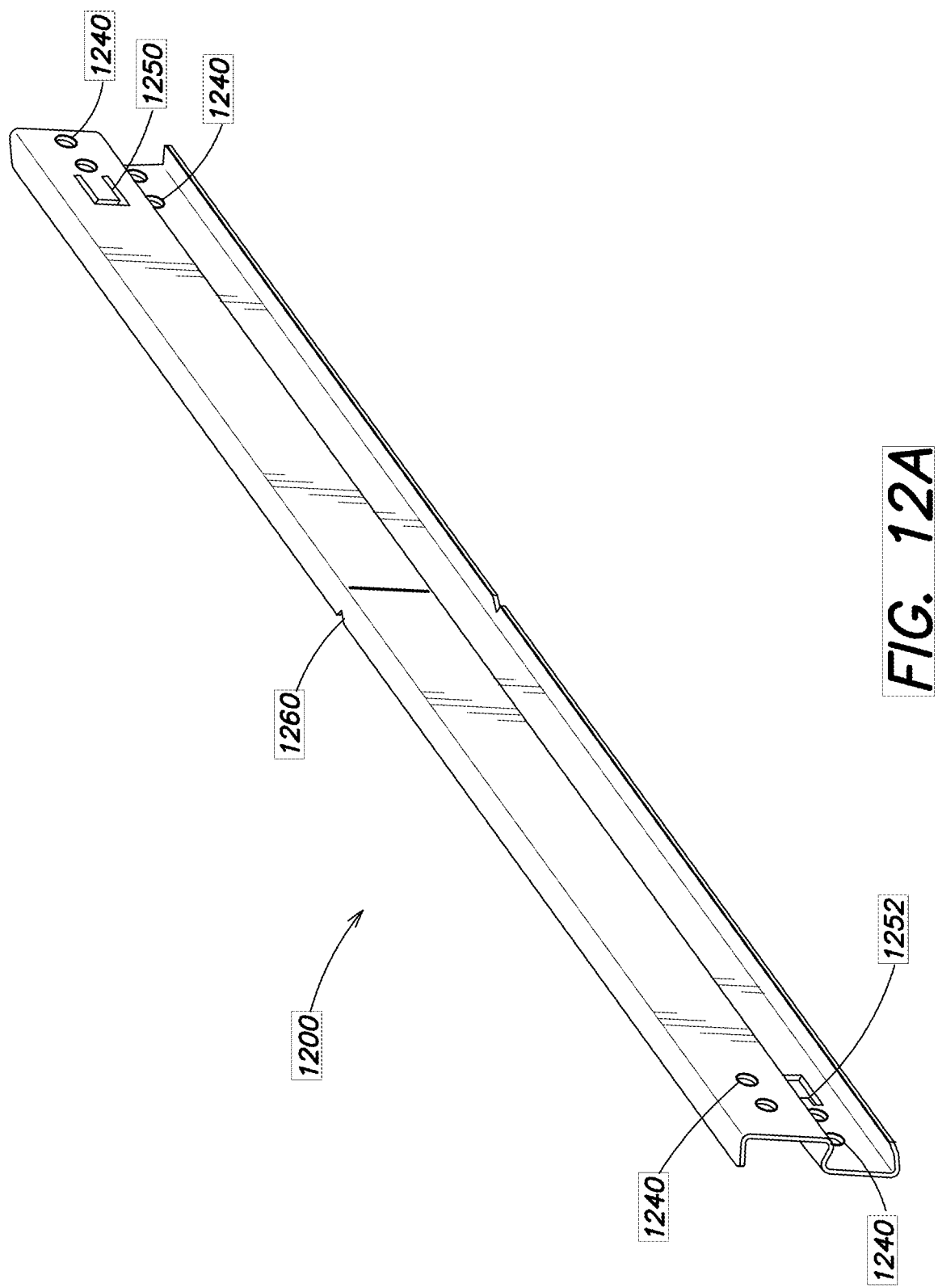

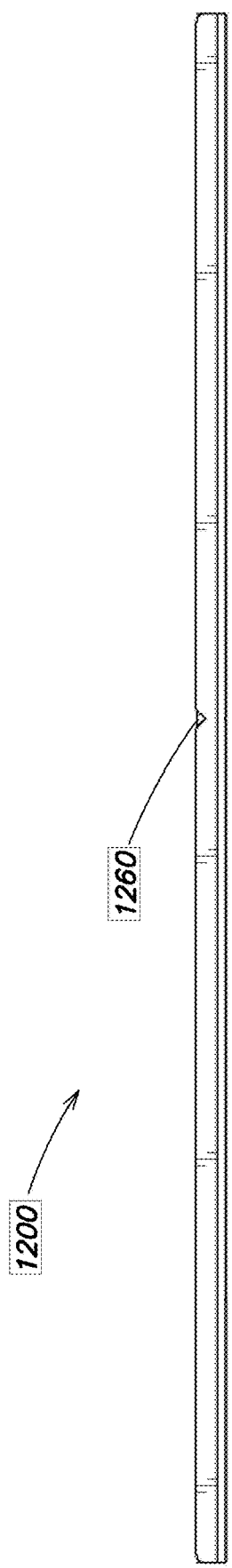
FIG. 12E
FIG. 12F

BAR HANGER ASSEMBLY WITH MATING TELESCOPING BARS

CROSS-REFERENCE TO RELATED PATENT APPLICATION(S)

The present application is a bypass continuation application of International Application PCT/US2019/054220, filed Oct. 2, 2019, and entitled "A BAR HANGER ASSEMBLY WITH MATING TELESCOPING BARS," which claims priority to U.S. provisional application Ser. No. 62/740,385, filed Oct. 2, 2018, entitled "BAR HANGER ASSEMBLY WITH IDENTICAL MATING TELESCOPING BARS," and U.S. provisional application Ser. No. 62/811,157, filed Feb. 27, 2019, entitled "BAR HANGER ASSEMBLY WITH IDENTICAL MATING TELESCOPING BARS." Each of the above identified applications is incorporated by reference herein in its entirety.

BACKGROUND

Luminaires are commonly installed in a building (e.g., multifamily housing, commercial spaces, residential homes) by utilizing a bar hanger assembly to mechanically couple the luminaire to a support structure, such as wooden or metal joists, T-bar supports, and/or steel framing. A conventional bar hanger assembly is typically comprised of one or more bar hangers that each include a bar hanger head to provide a mechanical interface from which the luminaire can be coupled to the various support structures described above. A pair of bar hangers are often coupled to each other such that the respective bar hangers are slidably adjustable along one preferred direction. In order to traverse a gap separating adjacent support structures, the bar hangers are slidably adjusted until the bar hanger head of each bar hanger is in physical contact with the support structure. In this manner, the bar hanger assembly can accommodate multiple support structures with variable separation distances between the support structures.

SUMMARY

The Inventors have recognized and appreciated that a bar hanger assembly readily provides users the flexibility to install a luminaire in various built environments, which may include different types of support structures in various arrangements. However, the Inventors have also recognized that previous bar hanger assemblies suffered from multiple limitations that hindered their ease of use, mechanical strength and stability, and manufacturability.

For example, previous bar hangers were typically shaped to allow one bar hanger to slide along a preferred direction with respect to another bar hanger while maintaining mechanical engagement between the bar hangers. Said in another way, previous bar hangers were not readily separable when subjected to a force applied along a direction that is not aligned with the preferred direction for adjustment.

Although previous bar hangers were able to maintain engagement with one another, the bar hangers were often fitted together loosely, which resulted in unwanted play between the bar hangers (i.e., unwanted relative movement between the bar hangers along a direction different from the preferred direction for adjustment). This unwanted play was further amplified when extending the bar hangers to cover a larger gap between the support structures due to a reduction in the physical overlap between the bar hangers. The unwanted play may also be exacerbated by the use of lower tolerances during manufacture. A large amount of unwanted play increases the difficulty in aligning and positioning the luminaire during installation and/or adjustment since the luminaire is able to move along multiple axes of motion rather than only the desired axes for adjustment.

In another example, previous bar hangers were often formed by bending a sheet, which resulted in a bar hanger cross-section shaped as a series of connected segments where each segment forms a side and/or a wall of the bar hanger. In previous bar hangers, adjoining segments were typically bent by more than 90 degrees resulting in an offset angle between said adjoining segments that was less than 90 degrees. For instance, a conventional bar hanger often included a cross-section with a U-shaped portion formed from two segments. As an example, FIG. 1 shows a cross-section of a conventional pair of bar hangers from U.S. Pat. No. 8,939,418. As shown, the bar hangers 202 and 204 each include a U-shaped portion (e.g., the top of bar hanger 204, the bottom of bar hanger 202) formed by bending a first segment with respect to a second segment adjoining the first segment about 180 degrees such that the resultant offset angle between the segments was about 0 degrees. The two sides and/or walls that are bent by an angle substantially greater than 90 degrees with a small bending radius is difficult to manufacture. Typically, the fabrication of such tightly bent features involves multiple manufacturing steps where the tools used for manufacture may be reconfigured and/or retooled between each step, thus increasing the time and cost of manufacture.

The present disclosure is thus directed towards various inventive implementations of a bar hanger assembly that provides substantially less undesirable play (and, as a result, greater mechanical strength and stability) and greater ease of manufacture. In one aspect, the bar hanger assembly may include a pair of bar hangers, in which a first bar hanger (also referred to in the art as a "bar hanger") of the pair is shaped to physically contact a second bar hanger of the pair at one or more locations along the bar hanger. The physical contact between the bar hangers may reduce unwanted play between an assembly of two bar hangers by substantially reducing or, in some instances, eliminating the gaps and/or spaces between the bar hangers. In other words, the bar hangers are physically unable to move along one or more undesirable directions due to a relatively tighter fitting between the bar hangers (e.g., as compared to prior art approaches for bar hanger assemblies).

In some implementations, the bar hanger may be dimensioned to mechanically interfere with another bar hanger after engagement. For example, the bar hangers may be specified to have a unilateral tolerance (a tolerance that allows variation along one direction) for manufacture that results in interference under normal operating conditions. The interference may, in turn, generate a compressive force that presses the bar hangers together to ensure contact is maintained, thereby reducing unwanted play between the bar hangers. The compressive force may be adjusted such that the bar hangers remain slidably adjustable. For example, even with a significant compressive force applied to the bar hangers, the coefficient of friction (static and kinetic) of the contact surfaces of the respective bar hangers may be reduced by coating at least a portion of these surfaces with a lubricant. In this manner, a significant compressive force may be applied between the bar hangers without preventing a user from being able to slidably adjust one bar hanger with respect to the other bar hanger.

In another aspect, the compressive force may generate a corresponding frictional force between the two bar hangers that reduces or, in some instances, eliminates unwanted sliding movement between the bar hangers. Unwanted sliding movement may arise, for example, during installation when a user adjusts the bar hangers to cover a desired gap. If the user inadvertently tilts the bar hanger assembly, the weight of one bar hanger may cause said bar hanger to slidably move with respect to the other bar hanger resulting in the user having to readjust the relative positions of the bar hangers. The frictional force between the bar hangers may thus be tailored to prevent such unintended sliding movement of the bar hangers. In some implementations, the frictional force may be sufficiently large to prevent the bar hangers from moving relative to one another without human intervention.

In another aspect, the bar hanger may be shaped to have a section forming a recessed rail on one side and/or a protruding rail on the opposite side. For example, the bar hanger may have a U-shaped section formed from three segments (as opposed to the two segments used in the conventional bar hangers of FIG. 1). Thus, the recessed and protruding rails correspond to the interior and exterior, respectively, of the U-shaped section. The protruding rail of one bar hanger may thus fit into the recessed rail of another bar hanger. In some implementations, this type of fitting may reduce the form factor of the bar hangers without reducing the mechanical stiffness and/or rigidity of the bar hanger assembly. In some implementations, the bar hangers in the bar hanger assembly may also be substantially identical.

In another aspect, the bar hanger may have a cross-section that comprises a series of connected segments where each segment represents a side and/or a wall of the bar hanger. Unlike previous conventional bar hangers, adjoining segments in inventive implementations disclosed herein may be formed to have an offset angle that allows manufacture without having to retool and/or reconfigure the instruments/machinery used for manufacturing. For example, the offset angle between adjoining segments in bar hangers according to the present disclosure may be between about 45 degrees and about 90 degrees. This corresponds to the adjoining segments being bent by about 90 degrees to about 135 degrees during manufacture. In this manner, the bar hanger may be more easily fabricated using fewer manufacturing steps.

Each bar hanger may further include a bar hanger head to facilitate coupling of the bar hanger assembly to a support structure. The bar hanger head may include one or more attachment features to couple to various types of support structures including, but not limited to a joist, a stud, a T-bar, and a frame. In some implementations, the bar hanger assembly may include substantially similar bar hanger heads (e.g., mirror symmetric bar hanger heads) coupled to each bar hanger for greater ease of alignment and attachment.

The bar hanger assembly may also include a bar hanger holder to couple the bar hangers to a housing (e.g., a can housing, a junction box, a frame) to contain a light source (e.g., luminaire) and/or another functional device. The bar hanger holder may define a channel through which the bar hangers are slidably adjustable with respect to the bar hanger holder. The bar hanger holder may also be shaped to physically contact the bar hangers so as to constrain unwanted play between the bar hangers and the bar hanger holder. Thus, principles similar to those described above relating to design of respective bar hangers of the bar hanger assembly may also be applied to the bar hanger holder. For example, the bar hanger holder may be dimensioned to mechanically interfere with the bar hangers, resulting in a compressive force being applied to the bar hangers that ensures contact is maintained as the bar hangers are slidably adjusted relative to each other and/or the bar hanger holder. In some implementations, the compressive force may also generate a frictional force that prevents unwanted sliding movement between the bar hangers and the bar hanger holder without human intervention. The bar hanger holder may also be formed by bending a sheet with adjoining segments having an offset angle between about 45 degrees and about 90 degrees.

The bar hanger holder may also enable the bar hanger assembly to be adjustable with respect to the housing along a second axis that is different (e.g., not parallel) to a first axis along which the bar hangers are slidably adjustable. For example, the bar hanger holder may include a slot. A fastener may be inserted through the slot to couple the bar hanger holder to the housing. The slot may thus define another axis to adjust the position of the bar hanger assembly and, hence, the housing, with respect to the support structure. For instance, the slot may be oriented substantially orthogonal relative to the first axis along which the bar hangers are slidably adjustable (e.g., to enable both horizontal and vertical adjustments to the housing during installation). In another example, the bar hanger holder may include a threaded stud that is inserted through an opening (e.g., a slot) on the housing.

In one example, a bar hanger includes a rod having a S-shaped cross-section. The cross-section is formed from a bottom segment, a first segment coupled to a first end of the bottom segment that is parallel to a first axis, a middle segment coupled to a first end of the first segment, a second segment coupled to a first end of the middle segment that is parallel to the first axis, and a top segment coupled to a first end of the second segment. The first and bottom segments define a first offset angle. The middle and first segments define a second offset angle. The second and middle segments define a third offset angle. The top and second segments define a fourth offset angle. The first, second, third, and fourth offset angles are between about 45 degrees and about 90 degrees.

In another example, a bar hanger assembly includes a first bar hanger and a second bar hanger coupled to the first bar hanger where (1) the second bar hanger is telescopically slidable with respect to the first bar hanger along an axis and (2) a portion of the second bar hanger contacts a portion of the first bar hanger such that a compressive force is generated between the first and second bar hangers. The compressive force substantially reduces movement of the second bar hanger with respect to the first bar hanger along a direction that is not parallel to the axis.

In another example, a bar hanger assembly includes a first bar hanger having a first cross-section comprising a first series of connected segments and a second bar hanger, coupled to the first bar hanger, having a second cross-section comprising a second series of connected segments. The second bar hanger is telescopically slidable with respect to the first bar hanger along an axis. Each pair of adjoining segments in the first and second series of connected segments defines an offset angle between about 45 degrees and about 90 degrees. A subset of the first series of connected segments contacts a subset of the second series of connected segments such that movement of the second bar hanger with respect to the first bar hanger along a direction not parallel to the axis is substantially constrained.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2B is an exploded top, front, right perspective view of the bar hanger assembly of FIG. 2A.

FIG. 2C is a front view of a portion of the bar hanger assembly of FIG. 2A.

FIG. 3B is a front view of the bar hanger holder of FIG. 3A.

FIG. 3C is a rear view of the bar hanger holder of FIG. 3A.

FIG. 4A is a right view of the bar hanger of FIG. 2A.

FIG. 4B is a top, front, right perspective view of the bar hanger of FIG. 4A.

FIG. 4C is a right view of the pair of bar hangers of FIG. 2A.

FIG. 4D is a top, front, right perspective view of the pair of bar hangers of FIG. 4C.

FIG. 6A is a top, front perspective view of another bar hanger assembly with mating telescoping bars.

FIG. 6C is a rear-side view of the bar hanger assembly shown in FIG. 6A.

FIG. 6F is a top-side view of the bar hanger assembly shown in FIG. 6A.

FIG. 7E is a top-side view of the bar hanger shown in FIG. 7A.

FIG. 7F is a bottom-side view of the bar hanger shown in FIG. 7A.

FIG. 11A is a top, front perspective view of another bar hanger assembly with mating telescoping bars.

FIG. 11C is a rear-side view of the bar hanger assembly shown in FIG. 11A.

FIG. 12A is a top, rear perspective view of a bar hanger for the bar hanger assembly with mating telescoping bars shown in FIG. 11A.

FIG. 12E is a top-side view of the bar hanger shown in FIG. 12A.

FIG. 12F is a bottom-side view of the bar hanger shown in FIG. 12A.

DETAILED DESCRIPTION

Following below are more detailed descriptions of various concepts related to, and implementations of, a bar hanger apparatus, including one or more bar hangers, bar hanger holders, and bar hanger heads, and methods for mechanically coupling a housing (e.g., a can housing for a downlight or a spotlight, a junction box, a frame) to a support structure (e.g., a ceiling, a wall). It should be appreciated that various concepts introduced above and discussed in greater detail below may be implemented in numerous ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of a bar hanger assembly are provided, wherein a given example or set of examples showcases one or more particular features of a bar hanger, bar hanger holder, and a bar hanger head. It should be appreciated that one or more features discussed in connection with a given example may be employed in other examples according to the present disclosure, such that the various features disclosed herein may be readily combined in a given system according to the present disclosure (provided that respective features are not mutually inconsistent).

A First Exemplary Bar Hanger Assembly

Figure 1:
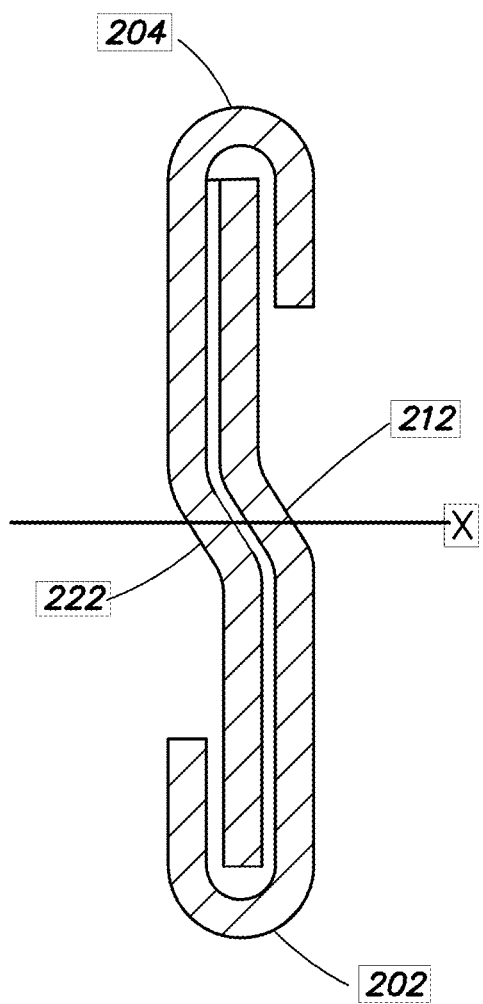
FIG. 1 shows a cross-section of a conventional pair of bar hanger.
Figure 2A:
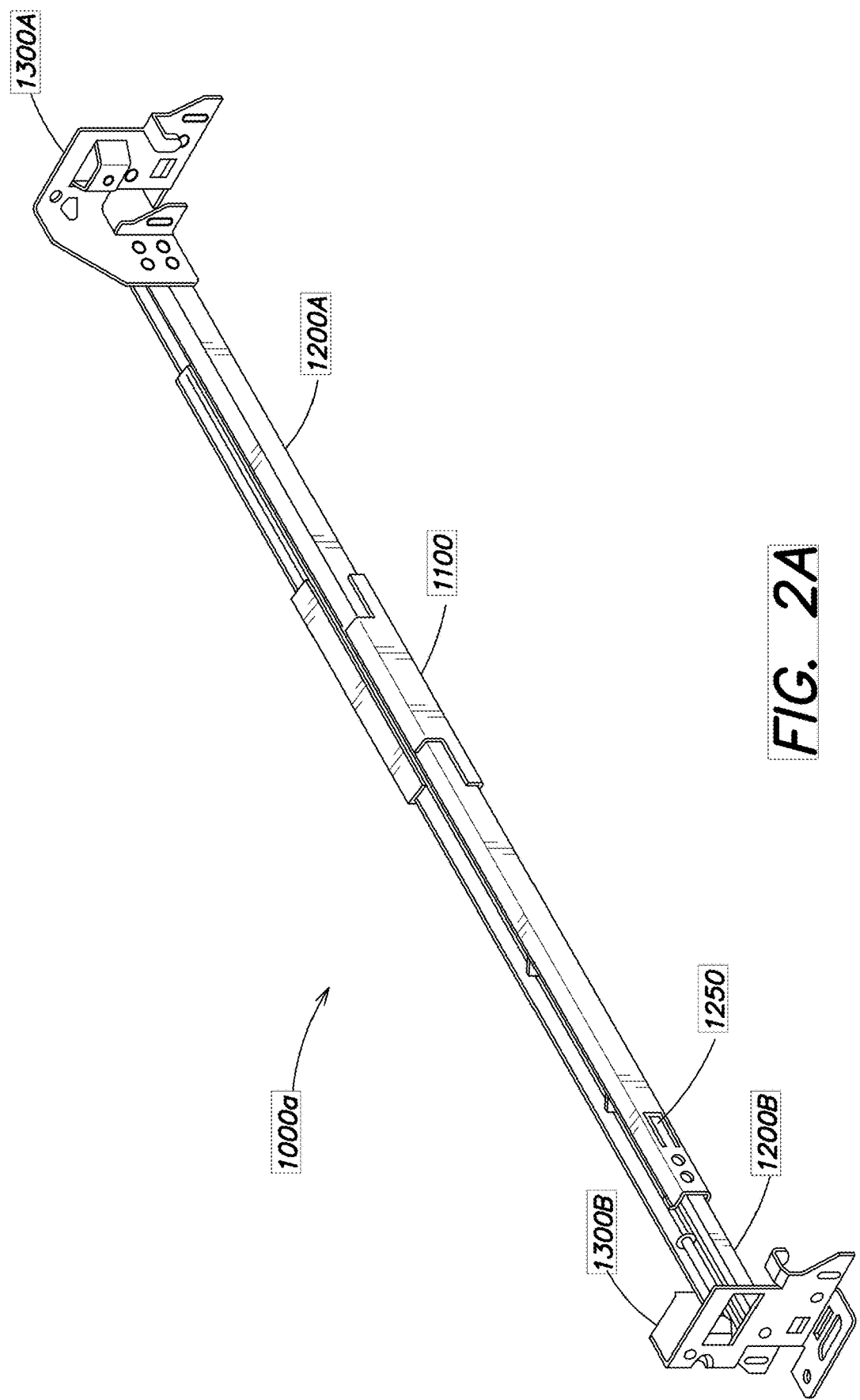
FIG. 2A is a top, front, right perspective view of a bar hanger assembly.

FIGS. 2A-2C show an exemplary bar hanger assembly 1000*a* according to one inventive implementation. The bar hanger assembly 1000*a* may include a bar hanger holder 1100 to mechanically couple the bar hanger assembly 1000*a* to a housing (not shown in the figures). Examples of housings with which the bar hanger assembly 1000*a* may be used include, but are not limited to, a can housing (e.g., for a recessed lighting fixture), a junction box (e.g., to contain one or more electrical connections, and optionally one or more functional elements such as a luminaire), and a frame (e.g., which may have mounted or otherwise mechanically coupled to it one or more can housings or one or more junction boxes).

The bar hanger holder 1100 is used to mechanically guide a pair of bar hangers 1200A and 1200B (collectively referred to herein as the bar hanger 1200), which may be mechanically coupled together in a telescoping manner such that the bar hanger 1200A is slidably adjustable with respect to the bar hanger 1200B. Each bar hanger 1200 may include a bar hanger head 1300A or 1300B (collectively referred to herein as bar hanger head 1300) to couple the bar hanger assembly 1000*a* to one or more support structures disposed in the surrounding environment into which the bar hanger assembly is being installed.

The bar hanger holder 1100 is used, in part, to mechanically couple the bar hanger assembly 1000*a* to a housing (e.g., for a luminaire and/or other functional device). The bar hanger holder 1100 is also employed to guide and/or mechanically constrain the motion of the bar hangers 1200. FIGS. 3A-3F show various views of an exemplary bar hanger holder 1100. It should be appreciated that the top, bottom, front, rear, left, and right views of the bar hanger holder 1100 shown in FIGS. 3A-3F are intended to provide orientation and may not be representative of the actual orientation of the bar hanger holder 1100 when deployed with a housing in a built environment.

The bar hanger holder 1100 may be dimensioned and shaped, based at least in part, on the housing to which the bar hanger assembly 1000a is coupled and the shape and dimensions of the bar hangers 1200 contained, at least in part, therein. For example, the length of the bar hanger holder 1100 (i.e., the length is defined parallel to the direction of slidable adjustment for the bar hangers 1200) may be constrained so as not to exceed the diameter/width of the housing. In another example, the width and height of the bar hanger holder 1100 (i.e., the width and the height are defined orthogonal to the direction for slidable adjustment) may be constrained to be sufficiently large to contain at least two bar hangers 1200 along at least a substantial portion, if not the entirety, of the length of the bar hanger holder 1100.

The bar hanger holder 1100 may include one or more mounting elements 1110 to facilitate mechanical coupling to one or more corresponding receiving elements on a housing. The one or more mounting elements 1110 may be used in conjunction with various coupling mechanisms including, but not limited to, screw fasteners, bolt fasteners, spring clips, friction clips, clamps, resins, adhesives, and any other coupling mechanism known to one of ordinary skill in the art. The bar hanger holder 1100 may also be coupled to various housings including, but not limited to, a can housing of a recessed lighting fixture, a junction box (e.g., to contain one or more electrical connections and/or functional elements, such as a luminaire), or a frame (e.g., which in turn may comprise a can housing and/or a junction box mounted to or otherwise mechanically coupled to the frame).

For example, FIGS. 2B, 3B, and 3C shows the mounting elements 1110 as openings that allow a bolt fastener or a screw fastener to pass through the mounting elements 1110 and into corresponding opening(s) on the housing. The opening(s) on the housing may be shaped as holes or slots to allow additional adjustment of the housing relative to the bar hanger assembly 1000a (e.g., along an axis orthogonal to the direction for slidable adjustment of the bar hangers 1200). In some implementations, the mounting element 1110 on the bar hanger holder 1100 may be a slot to allow adjustment of the bar hanger assembly 1000a relative to the housing. For example, the mounting elements 1110 may be slots oriented such that the axis aligned to the longer portion of the slot is orthogonal to the direction for slidable adjustment of the bar hangers 1200. If the housing contains a luminaire and is oriented to emit light downwards (e.g., from a ceiling) and the bar hangers are oriented to slidably adjust along a horizontal axis, the mounting elements 1110 may allow the vertical adjustment of the luminaire relative to the bar hanger assembly 1000a. In some implementations, the mounting element 1110 may be a stud integrated into the bar hanger holder 1100 that is inserted through the opening(s) on the housing.

Figure 3A:
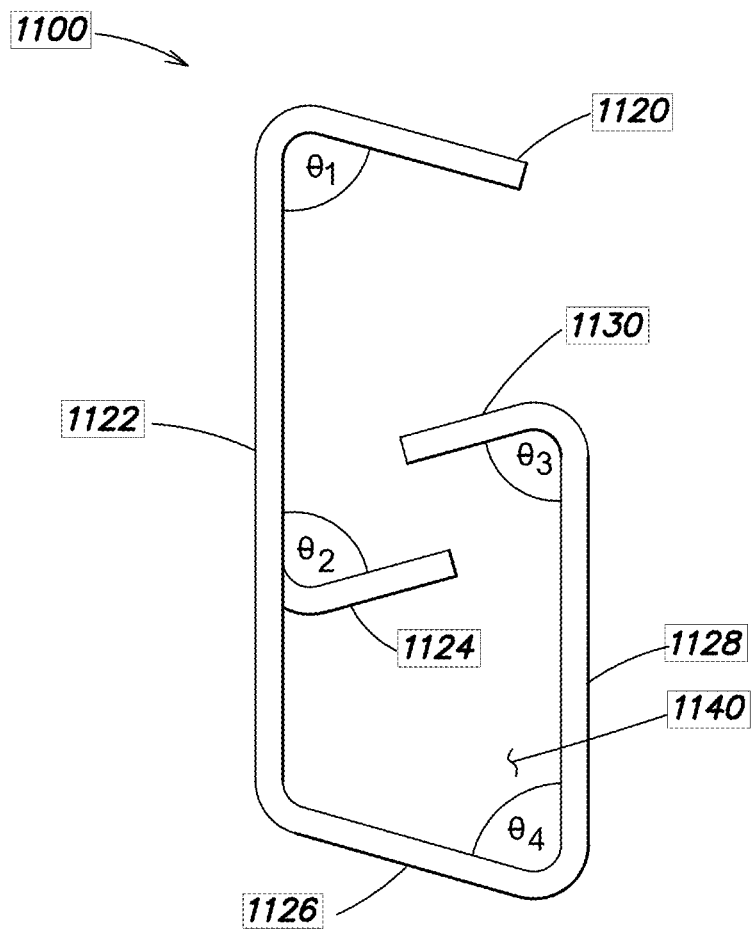
FIG. 3A is a right view of the bar hanger holder of FIG. 2A.
Figure 3D:
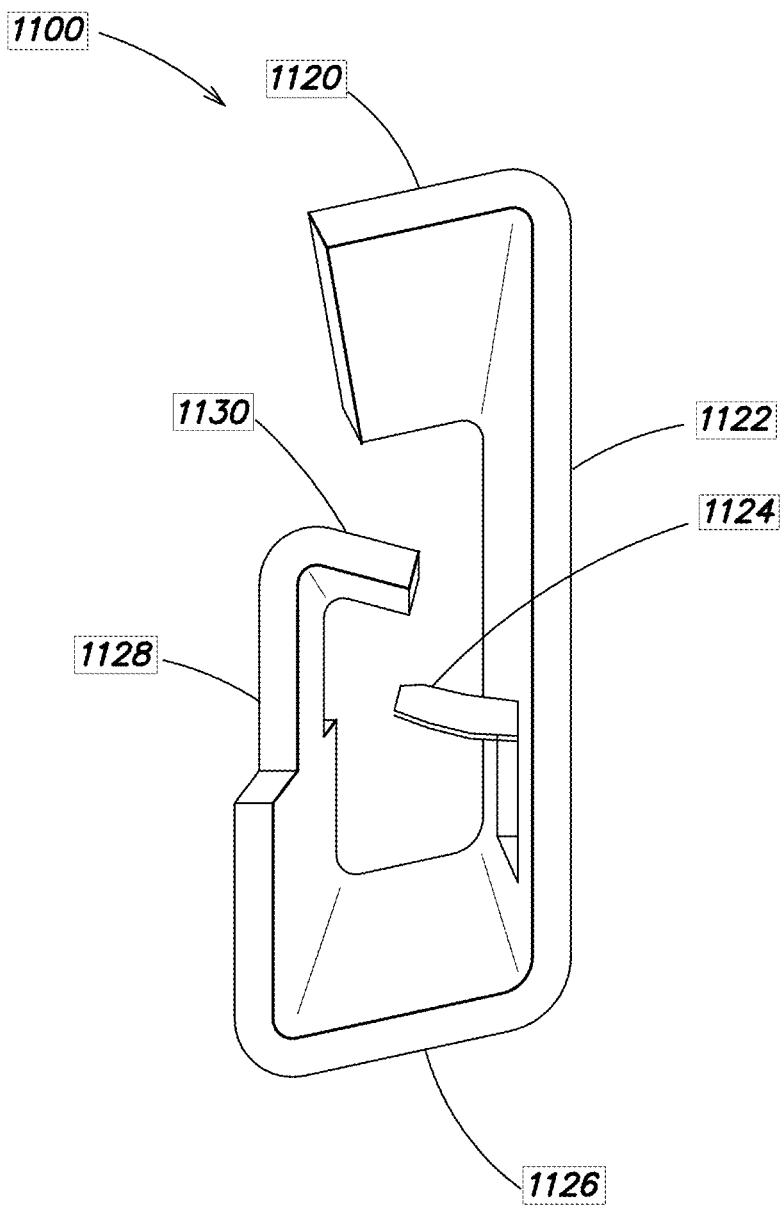
FIG. 3D is a left view of the bar hanger holder of FIG. 3A.
Figure 3E:
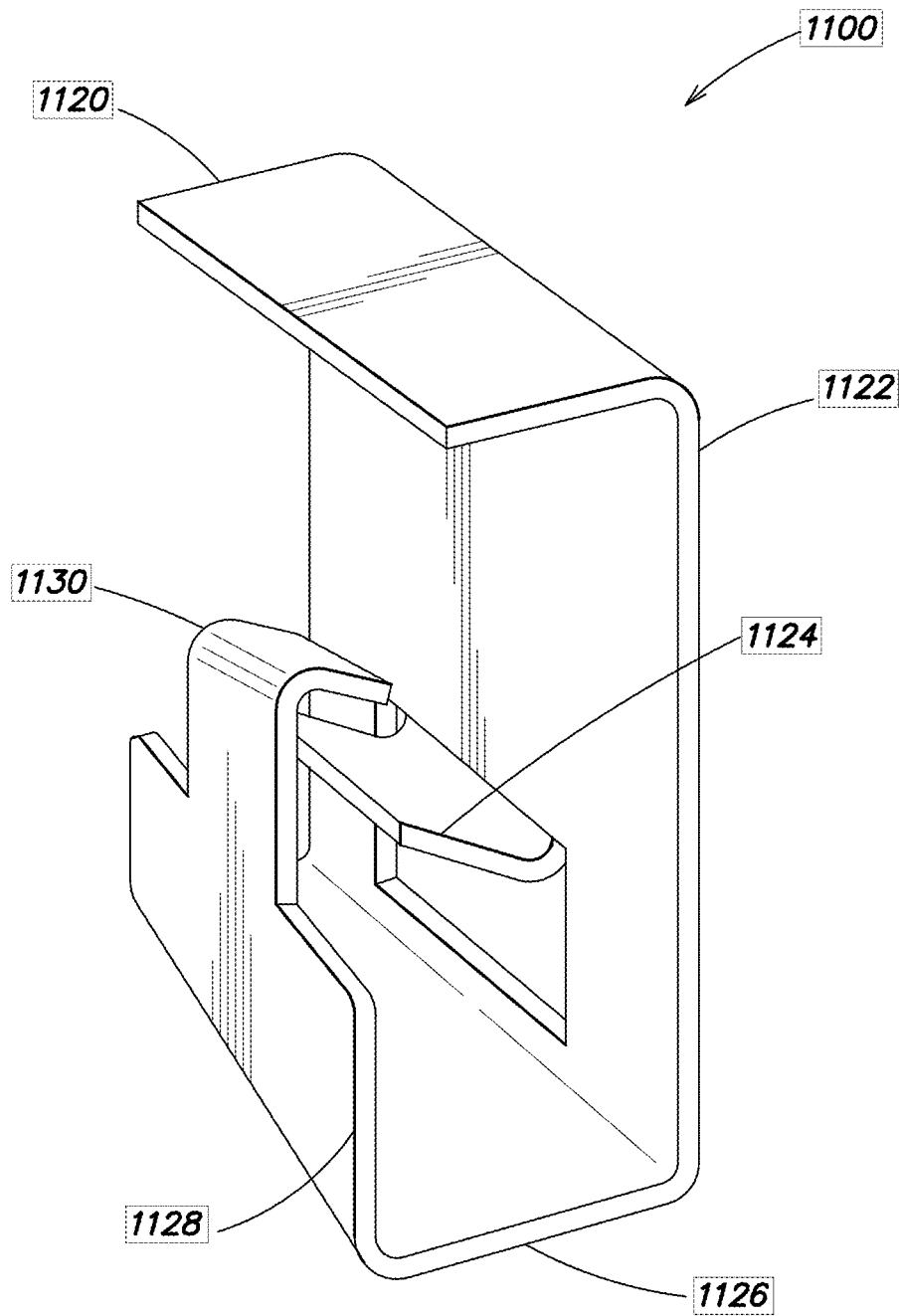
FIG. 3E is a left, front perspective view of the bar hanger holder of FIG. 3A.
Figure 3F:
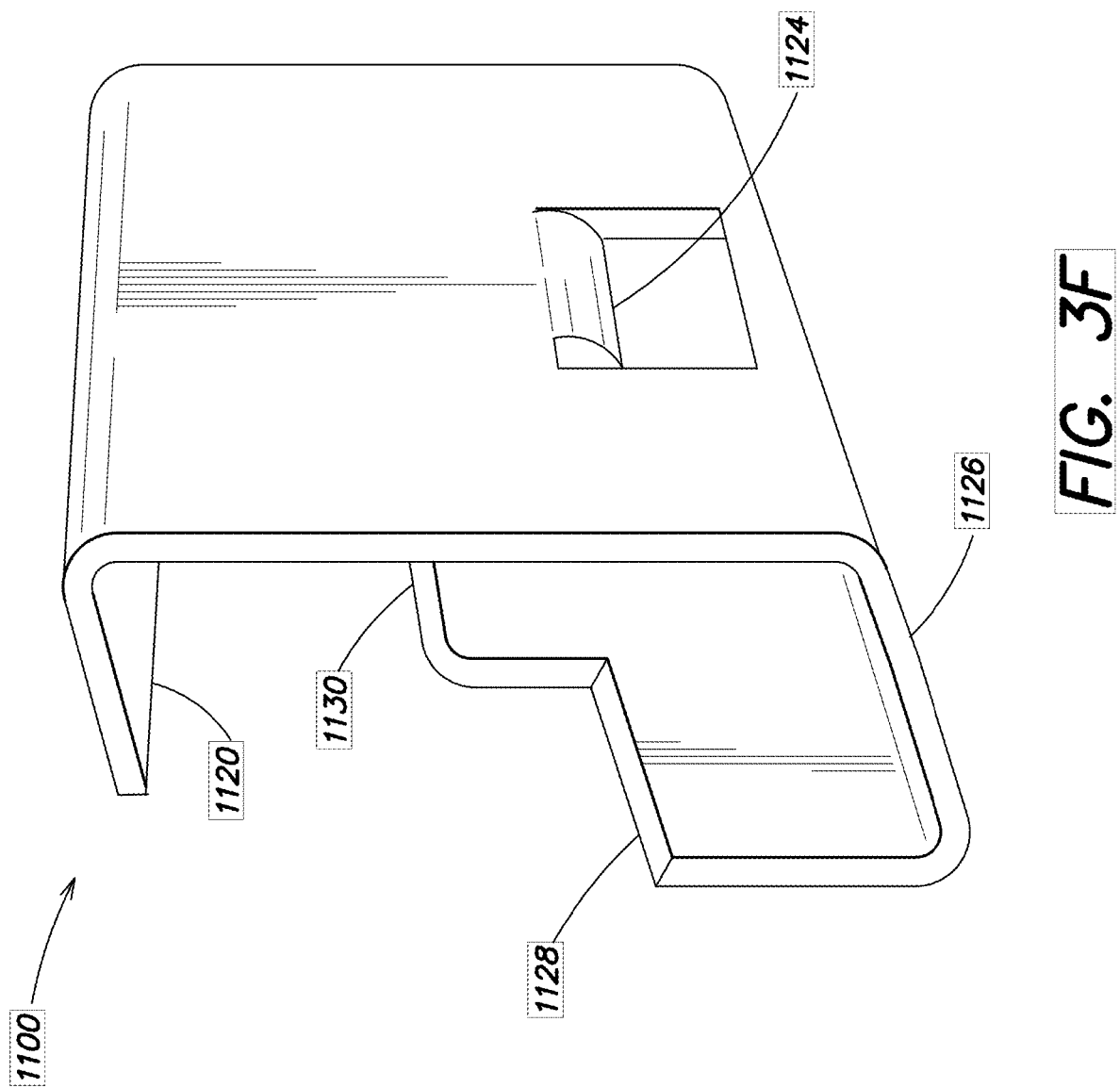
FIG. 3F is a left, rear perspective view of the bar hanger holder of FIG. 3A.

FIG. 3A shows a right view of the bar hanger holder 1100. As shown, the bar hanger holder 1100 may include a top segment 1120, a first segment 1122, and a first middle segment 1124 to contact, at least in part, the bar hanger 1200B. The bar hanger holder 1100 may also include a bottom segment 1126, a second segment 1128, and a second middle segment 1130 to contact, at least in part, the bar hanger 1200A. The various segments of the bar hanger holder 1100 define a channel 1140 to support and guide the bar hangers 1200A and 1200B. In this manner, the respective segments of the bar hanger holder 1100 may physically contact opposing portions of the bar hangers 1200A and 1200B to mechanically constrain the motion of the bar hangers 1200A and 1200B in one or more directions other than the desired direction for slidable adjustment of the bar hangers 1200, thus substantially reducing undesirable play.

For example, the top segment 1120 may contact the top segment 1220 of the bar hanger 1200B and the bottom segment 1126 may contact the bottom segment 1226 of the bar hanger 1200A, thus constraining the motion of the bar hangers 1200A and 1200B along the top-bottom direction. As shown in FIGS. 3B and 3C, the first and second middle segments 1124 and 1130 (not visible in FIGS. 3B and 3C) may extend along only a portion of the length of the bar hanger holder 1100 to provide, in part, sufficient area to contact the bar hangers 1200A and 1200B for mechanical support while the remaining portions of the bar hanger holder 1100 provide sufficient mechanical rigidity to mechanically support the bar hanger assembly 1000a under normal operating loads.

In some implementations, the bar hanger holder 1100 may impart a compressive force onto the bar hangers 1200A and 1200B. The compressive force may further reduce the presence of gaps and/or spaces between the bar hanger holder 1100 and the bar hangers 1200 (i.e., the main source for unwanted play) to ensure that physical contact between the bar hanger holder 1100 and the bar hangers 1200 is sufficiently maintained as the bar hangers 1200 are slidably adjusted. This may be accomplished, in part, by dimensioning the bar hanger holder 1100 (e.g., changing the offset angle between adjoining segments, reducing the length of a segment) to mechanically interfere with the bar hangers 1200A and 1200B when inserted through the channel 1140 of the bar hanger holder 1100.

For example, the top segment 1120 and the bottom segment 1126 may apply a force onto the top segment 1220 of the bar hanger 1200B and the bottom segment 1226 of the bar hanger 1200A, respectively. The respective forces may be oriented towards each other resulting in the bar hanger holder 1100 pressing the bar hangers 1200A and 1200B from the top and the bottom. Similarly, a compressive force may also be generated by the first and second segments 1122 and 1128 and/or the first and second middle segments 1124 and 1130.

In some implementations, the bar hanger holder 1100 may be shaped such that one segment generates a force that constrains the bar hanger 1200 along one or more axes. For example, if the segments 1120, 1122, 1126, and 1128 were to form a rectangle (differently than shown in FIG. 2A), the force imparted by the top and bottom segments 1120 and 1126 may only constrain the bar hangers 1200 vertically. In other words, the bar hangers 1200 may still move horizontally with respect the bar hanger holder 1100. On the other hand, if the offset angle between the top and first segments 1120 and 1122 and/or the bottom and second segments 1126 and 1128 is less than 90 degrees (e.g., as shown in FIG. 2A), the resulting forces generated by, for example, the top and bottom segments 1120 and 1126 may constrain the bar hangers 1200 vertically and horizontally.

Additionally, in some implementations, the generation of a compressive force may relax the tolerances used in the manufacture on the bar hanger assembly 1000a. In other words, the tolerances specified for the various dimensions of the bar hanger holder 1100 and the bar hangers 1200 may be larger (corresponding to a greater variance) so long as the respective limits in the tolerance of each dimension ensure the bar hanger holder 1100 interferes with the bar hangers 1200 along a substantial portion of the length of the respective bar hangers 1200. Interference in this context refers to the bar hanger holder 1100 and the bar hangers 1200 being dimensioned in such a manner that a portion of the bar hanger holder 1100 would nominally intersect the bar hangers 1200 during assembly. However, the bar hanger holder 1100 and the bar hangers 1200 are formed from materials that are deformable; hence, the intersection of the bar hanger holder 1100 with the bar hangers 1200 results in the deformation and corresponding generation of stress resulting in the compressive force between the bar hanger holder 1100 and the bar hangers 1200.

It should be appreciated that the compressive force may generate a corresponding frictional force that to some extent impedes slidable adjustment of the bar hangers 1200 with respect to the bar hanger holder 1100. The magnitude of the compressive force should thus balance between maintaining contact/reducing unwanted movement between the bar hanger holder 1100 and the bar hangers 1200 while enabling a user to slidably adjust the bar hangers 1200 without having to apply excessive force. In some implementations, the frictional force generated between the bar hanger holder 1100 and the bar hangers 1200 may be modified by at least partially coating respective surfaces of the bar hanger holder 1100 and/or the bar hangers 1200 with a lubricant that modifies the coefficient of friction (static and kinetic) as discussed below. A lower coefficient of friction may allow a larger compressive force to be used.

In some implementations, the frictional force may provide the added benefit of preventing unwanted sliding movement between the bar hangers 1200 and the bar hanger holder 1100. For example, when a user is installing a bar hanger assembly coupled to a housing (e.g., which may contain a luminaire), the user may initially position the respective bar hangers 1200A and 1200B and the bar hanger holder 1100 such that the housing is placed at a desired location between support structures. However, as the user begins to mount the bar hanger assembly and housing to the support structure, the weight of the various components in the housing may cause the bar hanger holder 1100 and/or the bar hangers 1200 to slidably move. For example, the user may inadvertently tilt the housing, or the user may be installing the housing such that the bar hangers 1200 are oriented vertically. The user should thus readjust the bar hanger holder 1100 and the bar hangers 1200 in order to continue with the installation, which increases the time and inconvenience for installation.

The magnitude of the frictional force may thus be chosen to reduce or, in some instances, eliminate such unwanted sliding movement by tailoring the coefficient of friction and/or the compressive force between the bar hangers 1200 and the bar hanger holder 1100. In some implementations, the frictional force may be sufficiently large such that the bar hangers 1200 are unable to slidably move with respect to the bar hanger holder 1100 unaided and/or without human intervention.

The angles: (1) $\Theta_4$ defined between the top segment 1120 and the first segment 1122, (2) $\Theta_2$ defined between the first segment 1122 and the first middle segment 1124, (3) $\Theta_3$ defined between the second segment 1128 and the second middle segment 1130, and (4) $\Theta_4$ defined between the bottom segment 1126 and the second segment 1128, may each be about 45 degrees to about 90 degrees. The angles $\Theta_1$, $\Theta_2$, $\Theta_3$, and $\Theta_4$ between the various segments may be chosen, in part, based on the shape of the bar hangers 1200 and/or for ease of manufacturability. For example, the exemplary bar hanger holder 1100 in FIG. 3A shows the angles $\Theta_1$, $\Theta_2$, $\Theta_3$, and $\Theta_4$ are about 75 degrees, which is chosen, in part, to ensure the bar hanger holder 1100 may be formed from a flat sheet (e.g., from sheet metal) without having to excessively bend said flat sheet by an angle substantially greater than 90 degrees (e.g., greater than or equal to about 135 degrees). In this manner, the bar hanger holder 1100 may be fabricated using fewer manufacturing steps and without having to retool and/or reconfigure various machinery used for manufacturing.

In some implementations, the portions of the bar hanger holder 1100 that contact the bar hangers 1200 may be coated with a lubricant to facilitate slidable adjustment of the bar hangers 1200 by reducing friction. The lubricant may be various types of lubricating materials including, but not limited to, Teflon, graphite, grease, mineral oil, synthetic oil, and any other lubricating materials known to one of ordinary skill in the art. In some implementations, the top segment 1120, the first and second segments 1122 and 1128, the first and second middle segments 1124 and 1130, and the bottom segment 1126 may be shaped such that a relatively small portion of the bar hanger holder 1100 contacts the bar hangers 1200A and 1200B. For example, one or more notches or one or more bumps may be disposed along the length of the bar hanger holder 1100, where the vertex of such features contact the bar hangers 1200A and 1200B. The one or more notches and/or the one or more bumps may be distributed such that multiple points of contact are made along opposing portions of the bar hangers 1200A and 1200B (e.g., top and bottom segments 1120 and 1126, first and second segments 1122 and 1128) for mechanical stability. In this manner, the bar hangers 1200A and 1200B may be mechanically constrained while substantially smaller contact area, thus reducing the friction between the bar hanger holder 1100 and the bar hangers 1200A and 1200B.

In some implementations, the bar hanger holder 1100 may include a locking mechanism (not shown) to constrain the bar hangers 1200 to the bar hanger holder 1100 (e.g., after the housing and the bar hanger assembly 1000a are installed). In some implementations, the locking mechanism may be a bendable tab located along a portion of the bar hanger holder 1100 that, when bent into a locking position, mechanically restricts subsequent motion of the bar hangers 1200A and 1200B. The locking mechanism may also include one or more mechanical stops to limit the extension of the bar hangers 1200A and 1200B. The mechanical stop may be a tab that is bent into, for example, a slotted opening (e.g., opening 1252) along the bar hangers 1200 once the bar hangers 1200 are inserted into the bar hanger holder 1100. In some implementations, the locking mechanism may be an opening on the bar hanger holder 1100 that receives a fastener that applies a sufficiently large compressive force between the bar hanger holder 1100 and the bar hangers 1200 that the bar hangers 1200 are restrained from moving with respect to the bar hanger holder 1100. Exemplary implementations of the locking mechanism are described further below.

The bar hanger holder 1100 may be formed from various metals and polymers including, but not limited to, aluminum, steel, cast iron, tin, brass, polyethylene, and polyvinyl chloride. In some implementations where the bar hanger holder 1100 is formed from metals, the bar hanger holder 1100 may be fabricated from a sheet metal through a series of bending, cutting, and drilling processes to form the desired shape of the bar hanger holder 1100. In some implementations where the bar hanger holder 1100 is formed from plastic, the bar hanger holder 1100 may be fabricated using various processes including, but not limited to, extrusion and injection molding.

The bar hanger 1200 is used to adjust the bar hanger assembly 1000a in order to position the bar hanger heads 1300 to physically contact support structures during installation of a housing. FIGS. 4A-4D show various views of an exemplary bar hanger 1200. It should be appreciated that the top, bottom, front, rear, left, and right views of the bar hanger 1200 shown in FIGS. 4A-4D are intended to provide orientation and may not be representative of the actual orientation of the bar hanger 1200 when deployed with a housing in a built environment.

As shown in FIGS. 4A and 4B, the bar hanger 1200 may be comprised of a top segment 1220, a first segment 1222, a middle segment 1224, a second segment 1226, and a bottom segment 1228 arranged to form a S-shaped cross-section. The bar hanger 1200 may be designed to couple to a substantially identical bar hanger 1200 in a telescoping manner, as shown in FIGS. 4C and 4D. As shown, the bar hanger 1200A is flipped relative to the bar hanger 1200B such that the top segment 1220, the first segment 1222, the second segment 1226, and the bottom segment 1228 of the bar hanger 1200A contacts the bottom segment 1228, the second segment 1226, the first segment 1222, and the top segment 1220 of the bar hanger 1200B, respectively. The angles: (1) $\alpha_1$ defined between the top segment 1220 and the first segment 1222, (2) $\alpha_2$ defined between the first segment 1222 and the middle segment 1224, (3) $\alpha_3$ defined between the second segment 1226 and the middle segment 1224, and (4) $\alpha_4$ defined between the bottom segment 1228 and the second segment 1226, may each be about 45 degrees to about 90 degrees. The lower bound on the angles $\alpha_1$, $\alpha_2$, $\alpha_3$, and $\alpha_4$ is based, in part, on the ease of manufacturability as smaller angles (corresponding to larger bending angles) may impose additional manufacturing steps and retooling/reconfiguring of various machinery used during manufacture.

In some implementations, the bar hanger 1200 may form recessed/protruding rails. For example, the top segment 1220, the first segment 1222, and the middle segment 1224 may form a first recessed rail on one side (e.g., on the right side in FIG. 4A) and a first protruding rail on the opposite side (e.g., on the left side of FIG. 4A). The middle segment 1224, the second segment 1226, and the bottom segment 1228 may form a second recessed rail on the left side of FIG. 4A and a second protruding rail on the right side of FIG. 4A. The protruding portions of the bar hanger 1200 may be disposed inside the respective recessed portions on another bar hanger 1200. For instance, FIG. 4C shows the first recessed rail of bar hanger 1200A receives the second protruding rail of bar hanger 1200B and second recessed rail of bar hanger 1200B receives the first protruding rail of bar hanger 1200A. As shown, the bar hangers 1200A and 1200B may be substantially nested when engaged with one another, resulting in a smaller overall assembly of bar hangers 1200.

The angles $\alpha_1$, $\alpha_2$, $\alpha_3$, and $\alpha_4$ may be chosen, in part, to reduce the likelihood the bar hangers 1200A and 1200B can separate from one another when a force is applied (e.g., during assembly, regular operating loads) along a direction different from the desired direction for slidable adjustment of the bar hangers 1200A and 1200B (e.g., orthogonal to the desired direction for slidable adjustment). For instance, the top and bottom segments 1220 and 1228 of the bar hangers 1200A and 1200B may provide sufficient physical contact to mechanically constrain each bar hanger 1200 from moving relative to one another along a top-bottom direction. For a sufficiently small angle $\alpha_1$ and $\alpha_4$, the top and bottom segments 1220 and 1228 of the bar hangers 1200A and 1200B may also mechanically constrain each bar hanger 1200 from moving relative to one another along a front-rear direction as well. The angles $\alpha_1$, $\alpha_2$, $\alpha_3$, and $\alpha_4$ that are sufficient to mechanically constrain the respective bar hangers 1200A and 1200B may also depend on the width of the bar hanger 1200 (the width, W, being defined along the front-rear direction of the bar hanger 1200 and/or the distance between the segments 1222 and 1226 as shown in FIG. 4A). A wider bar hanger 1200 may allow for larger angles approaching 90 degrees as a wider top segment 1220 may still provide sufficient mechanical constraint, despite the larger angle, to limit unwanted separation of the bar hangers 1200. Furthermore, bar hangers 1200A and 1200B may be substantially identical, thus simplifying manufacture since only one part is fabricated.

By utilizing a design for the bar hanger 1200, as shown in FIGS. 4A-4D, that provides substantial physical contact between two coupled bar hangers 1200 for mechanical constraint, the bar hanger 1200 may also be less sensitive to variabilities caused by manufacturing tolerances. For example, the angle $\alpha_1$ may be smaller and the angle $\alpha_4$ may be larger than design specifications, which would generate greater contact between the top and bottom segments 1220 and 1228 of respective bar hangers 1200. If the material used to form the bar hanger 1200 is sufficiently compliant, the bar hanger 1200 may be bent to an appropriate angle by another bar hanger 1200 upon insertion into the other bar hanger 1200.

In some implementations, the bar hangers 1200 may be intentionally designed with a unilateral tolerance to increase the contact between the respective bar hangers 1200, thereby reducing unwanted play. For example, the angle $\alpha_1$ may be specified as $75_{-1.0}^{+0.0}$ degrees and the angle $\alpha_4$ may be specified as $75_{-0.0}^{+1.0}$ degrees. If the bar hangers 1200A and 1200B are similar, the top segment 1220 of bar hanger 1200A would contact the bottom segment 1228 of the bar hanger 1200B. If the material used to form the bar hanger 1200 is sufficiently stiff, each bar hanger 1200 may apply a compressive force onto the other bar hanger 1200 such that physical contact is maintained as the bar hangers 1200 are slidably adjusted. More generally, the tolerances of the angles $\alpha_1$, $\alpha_2$, $\alpha_3$, and $\alpha_4$ may be tailored according to respective angles of another bar hanger (substantially similar or different with the bar hanger 1200) that are proximate to $\alpha_1$, $\alpha_2$, $\alpha_3$, and $\alpha_4$ (e.g., $\alpha_1$ is proximate to an angle $\gamma$ of another bar hanger). The tolerances and the resultant compressive force may be adjusted such that frictional forces are not excessive so as to prevent adjustment of the bar hangers 1200 during assembly and under normal operating loads.

Similar to the bar hanger holder 1100, the frictional force between two coupled bar hangers 1200 may be sufficiently large to reduce, or prevent entirely, unwanted sliding motion of each bar hanger 1200 relative to one another. For example, when installing a bar hanger assembly coupled to a housing, each bar hanger 1200 may be slidably adjusted to a desired position. The frictional force between the bar hangers 1200 may be sufficient to maintain the desired position of each bar hanger 1200, particularly as subsequent bar hangers 1200 are then adjusted. In some implementations, the frictional force between two bar hangers 1200 may be adjusted by incorporating a lubricant between the bar hangers 1200. The lubricant may be various types of lubricating materials including, but not limited to, Teflon, graphite, grease, mineral oil, synthetic oil, and any other lubricating materials known to one of ordinary skill in the art.

In some implementations, the top segment 1220, the first and second segments 1222 and 1226, the middle segments 1224, and the bottom segment 1228 of the bar hanger 1200 may also be shaped such that a relatively small portion of the bar hanger 1200 contacts the other bar hanger. For example, one or more notches or one or more bumps may be disposed along the length of the bar hanger 1200, where the vertex of such features contacts a surface on the other bar hanger 1200. The one or more notches and/or the one or more bumps may be distributed such that multiple points of contact are made between the bar hangers 1200A and 1200B (e.g., between the top and bottom segments 1220 and 1228, between the first and second segments 1222 and 1226, between the middle segments 1224) for mechanical stability. In this manner, the physical contact between the bar hangers 1200 may be sufficient to mechanically constrain unwanted relative motion orthogonal to the direction for slidable adjustment of the bar hangers 1200, while the frictional force is reduced when adjusting the bar hangers 1200.

In some implementations, the bar hanger 1200 may include one or more attachment features, disposed at one or both ends of the bar hanger 1200, to couple to the bar hanger head 1300. The attachment features may be used in conjunction with various coupling mechanisms including, but not limited to, screw fasteners, bolt fasteners, spring clips, friction clips, clamps, resins, adhesives, and any other coupling mechanism known to one of ordinary skill in the art. For example, FIG. 2A-2B shows the exemplary bar hanger 1200 may include one or more holes 1240, disposed along the second segment 1226, which may be aligned to corresponding holes 1322 on the bar hanger head 1300 to be coupled using rivets (not shown). In some implementations, the bar hanger head 1300 may be welded to the bar hanger 1200. In some implementations, the bar hanger head 1300 may be integrally formed with the bar hanger 1200. For example, the bar hanger head 1300 and the bar hanger 1200 may be formed from the same piece of sheet metal during manufacture.

In some implementations, the bar hanger 1200 may also include one or more mechanical stops, disposed at one or both ends of the bar hanger 1200, to mechanically limit the motion of the bar hanger 1200. As shown in FIG. 2A, the mechanical stops may be comprised of a tab 1250, disposed on the second segment 1226, that are bent such that when the bar hanger 1200 is inserted through the bar hanger holder 1100, the end of the tab subsequently contacts a corresponding opening 1252 on the first segment 1222 of another bar hanger 1200, thus preventing the respective bar hangers 1200 from disengaging from one another (see FIG. 2B).

In some implementations, the bar hanger 1200 may also include one or more notches 1260 formed at specified locations along the body of the bar hanger 1200. The notch 1260 may allow a user to break the bar hanger 1200 into smaller sections having a shorter length to facilitate installation of a bar hanger assembly coupled to a housing. For example, the bar hanger assembly coupled to a housing may be installed in an environment where the distance between neighboring support structures is shorter than the length of the bar hanger 1200. For these situations, the bar hanger 1200 may be broken into shorter segments that are then used for installation. In this manner, the bar hanger assembly 1000*a* may be installed across a larger range of gaps between the support structures. As shown in FIG. 2B, the notch 1260 may be formed by thinning a section of the bar hanger 1200. The thinned section is mechanically weaker, thus when a sufficiently large bending force is applied to the bar hanger 1200, the bar hanger 1200 is more likely to fracture at the notch 1260 (as opposed to another location along the bar hanger 1200).

The bar hanger 1200 may be formed from various materials including, but not limited to, aluminum, steel, cast iron, tin, brass, polyethylene, and polyvinyl chloride. In some implementations where the bar hanger 1200 is formed from metals, the bar hanger 1200 may be fabricated from a sheet metal through a series of bending, cutting, and drilling processes to form the desired shape of the bar hanger 1200. In some implementations where the bar hanger 1200 is formed from plastic, the bar hanger 1200 may be fabricated using various processes including, but not limited to, extrusion and injection molding.

Figure 5:
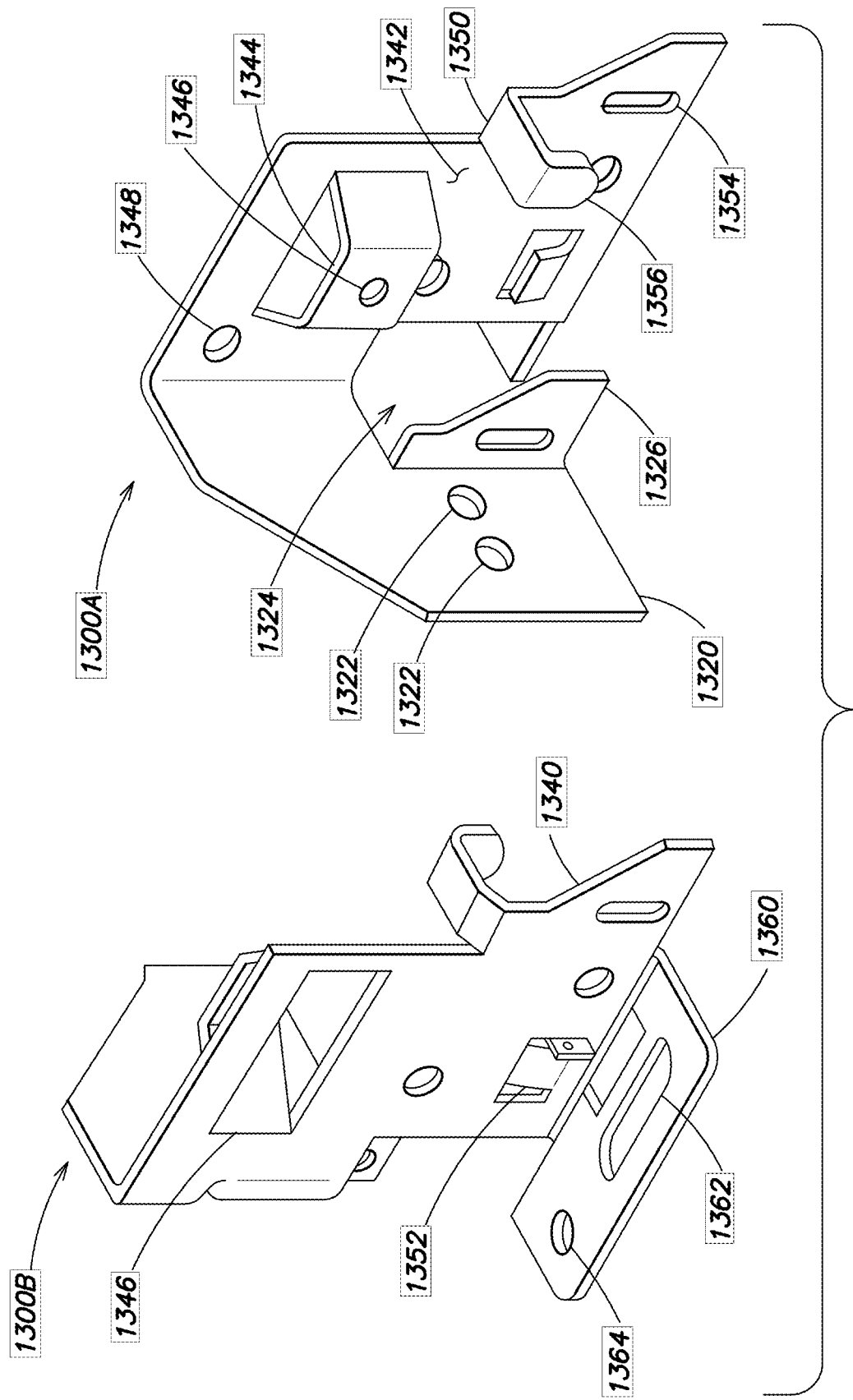
FIG. 5 is a top, front perspective view of the pair of bar hanger heads of FIG. 2A.
Figure 6B:
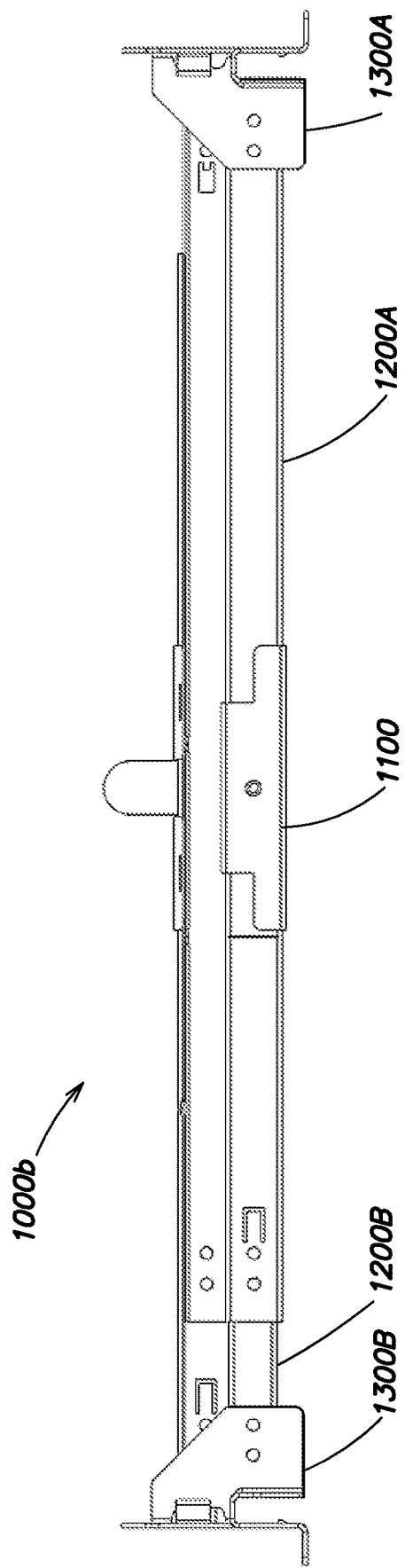
FIG. 6B is a front-side view of the bar hanger assembly shown in FIG. 6A.
Figure 6D:
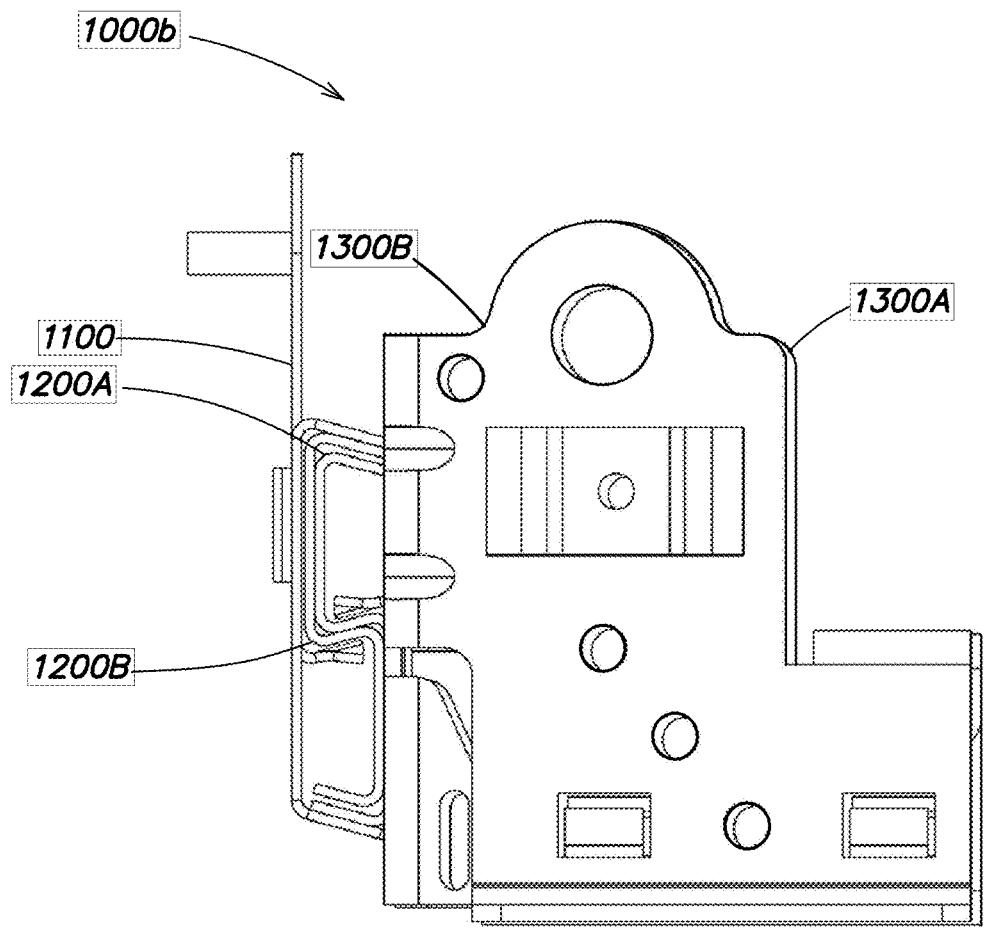
FIG. 6D is a right-side view of the bar hanger assembly shown in FIG. 6A.
Figure 6E:
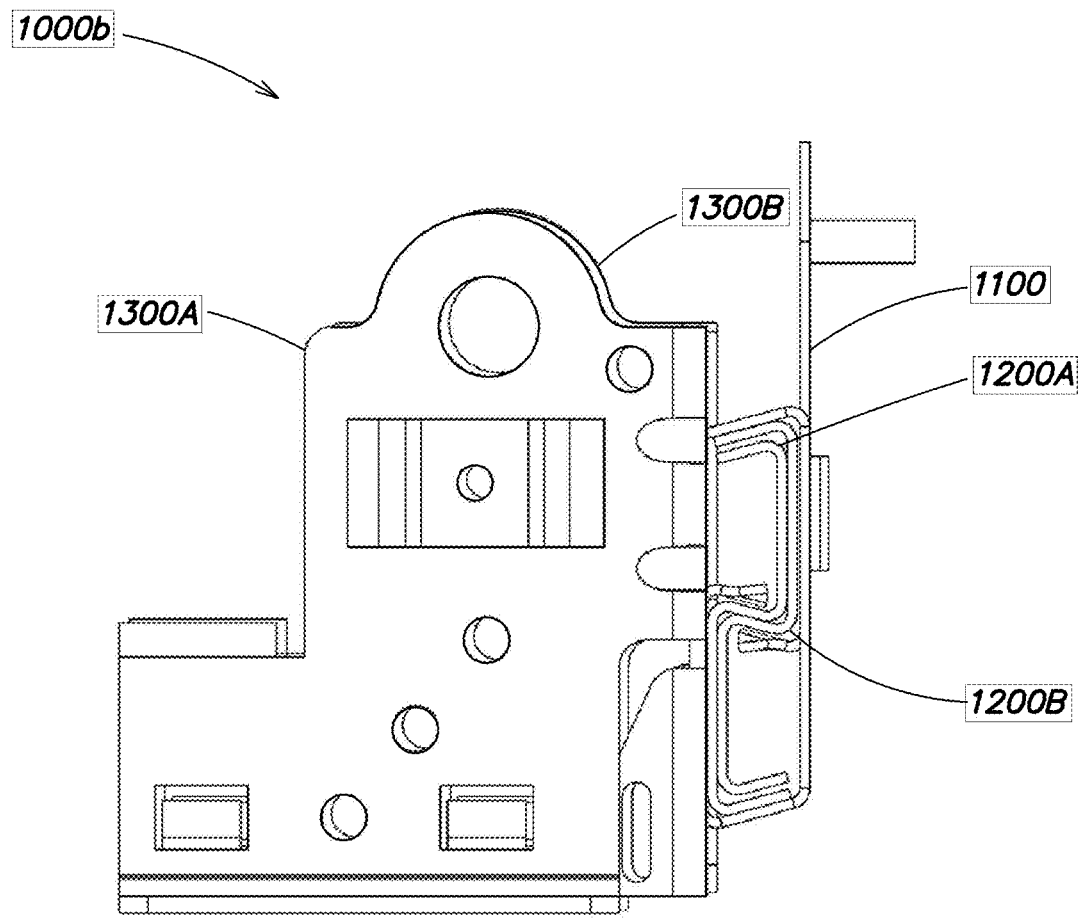
FIG. 6E is a left-side view of the bar hanger assembly shown in FIG. 6A.
Figure 6G:
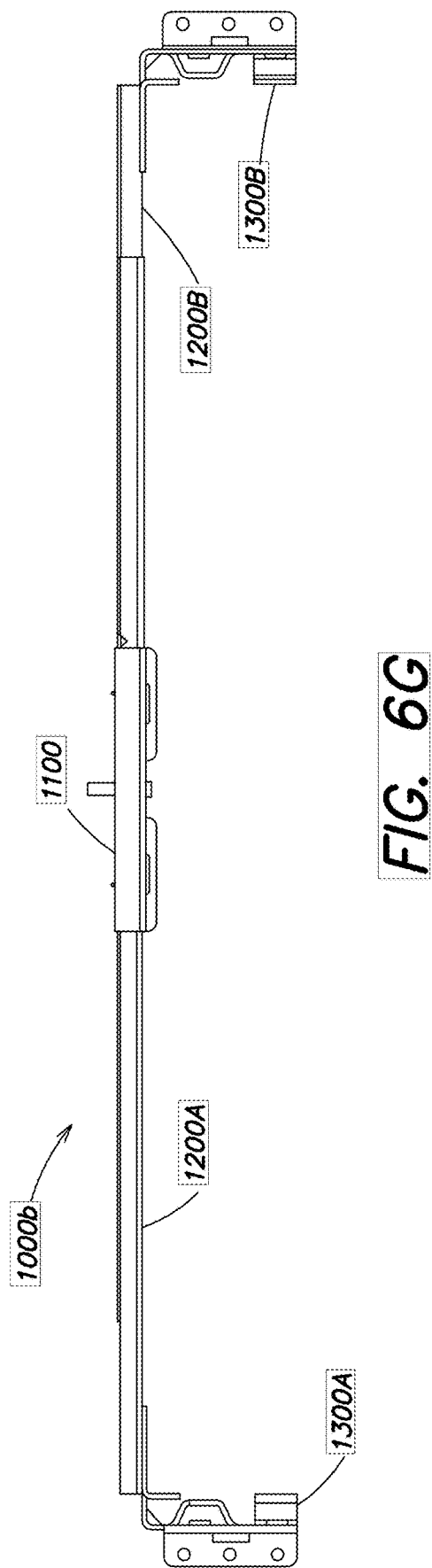
FIG. 6G is a bottom-side view of the bar hanger assembly shown in FIG. 6A.
Figure 6H:
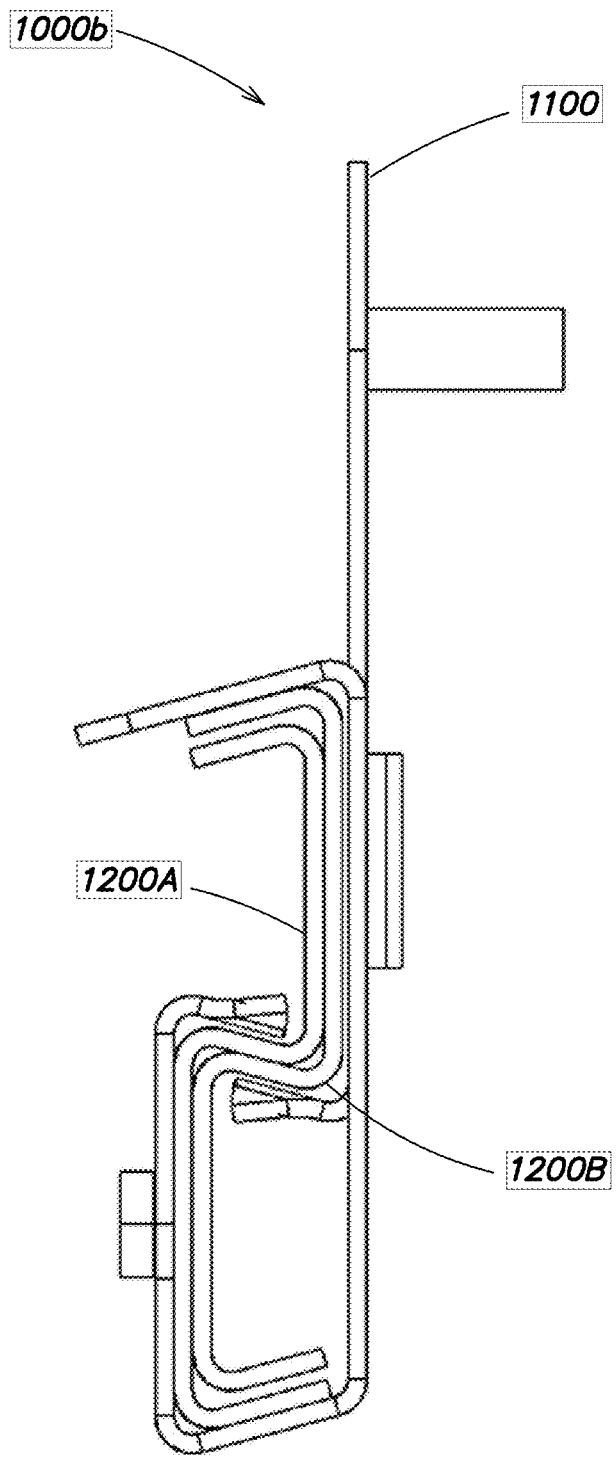
FIG. 6H is a left-side view of the bar hanger assembly shown in FIG. 6A without bar hanger heads.
Figure 7A:
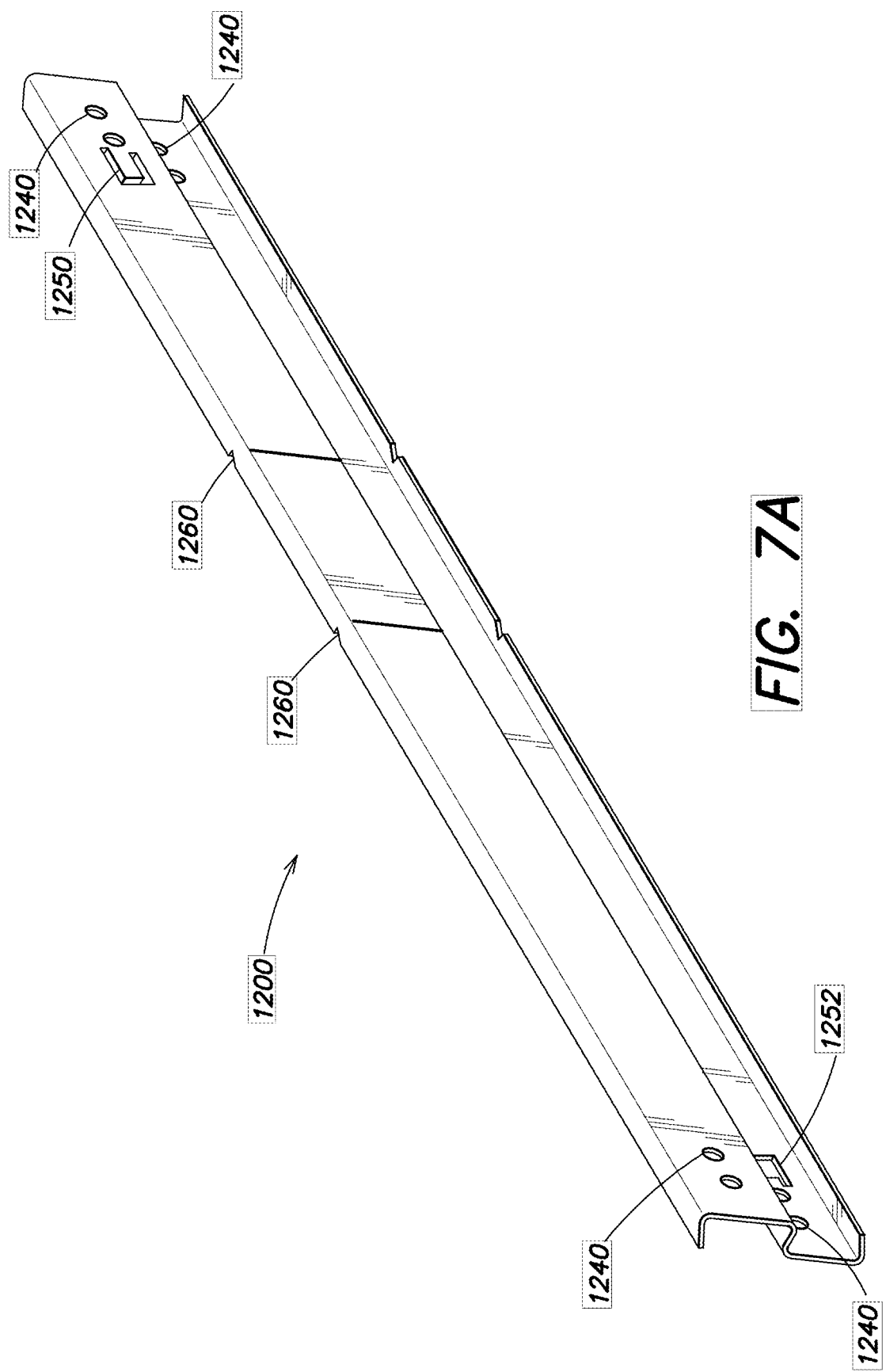
FIG. 7A is a top, rear perspective view of a bar hanger for the bar hanger assembly with mating telescoping bars shown in FIG. 6A.
Figure 7B:
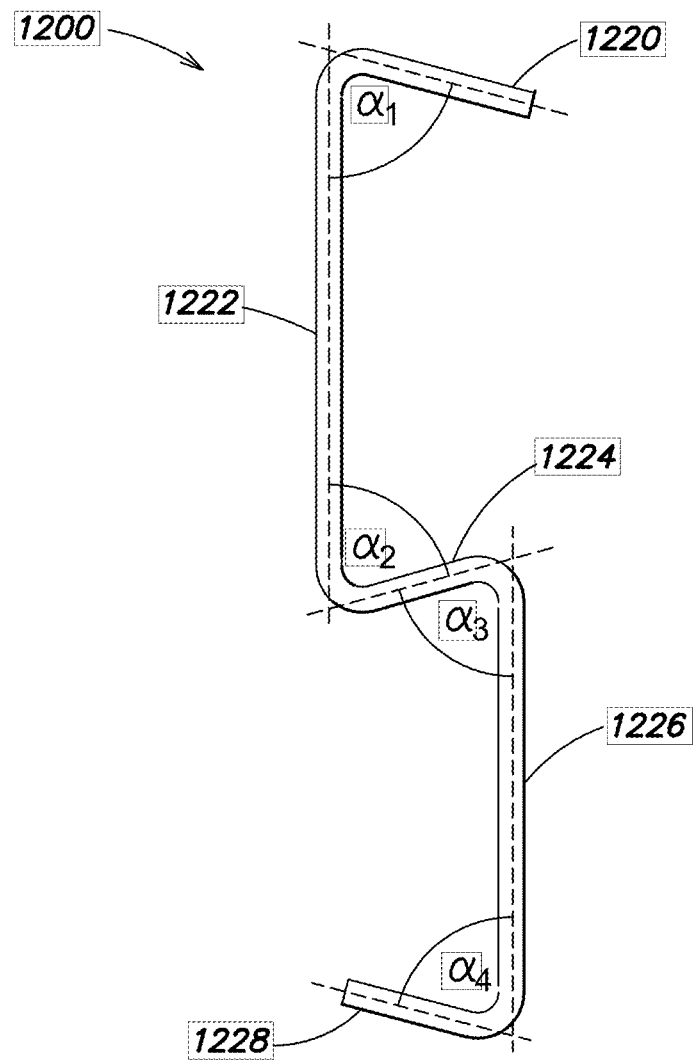
FIG. 7B is a right-side view of the bar hanger shown in FIG. 7A, the left-side view being a mirror image.
Figure 7C:
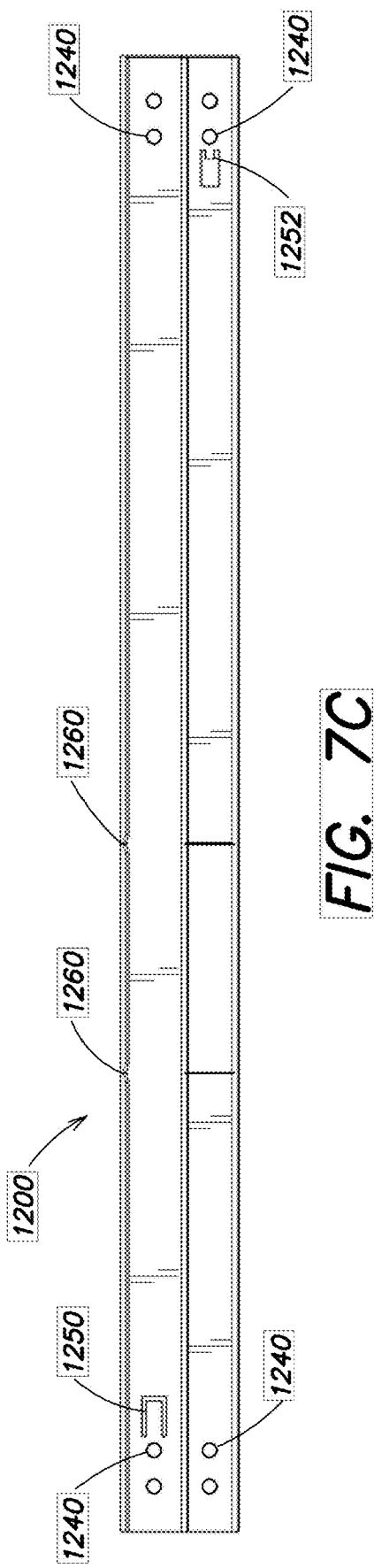
FIG. 7C is a front-side view of the bar hanger shown in FIG. 7A.
Figure 7D:
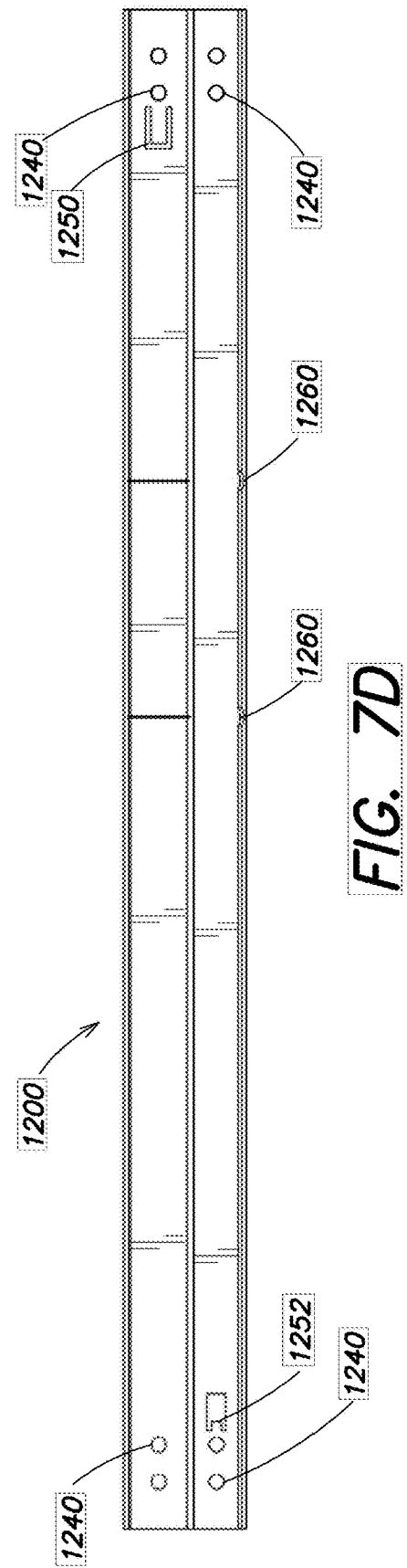
FIG. 7D is a rear-side view of the bar hanger shown in FIG. 7A.
Figure 8A:
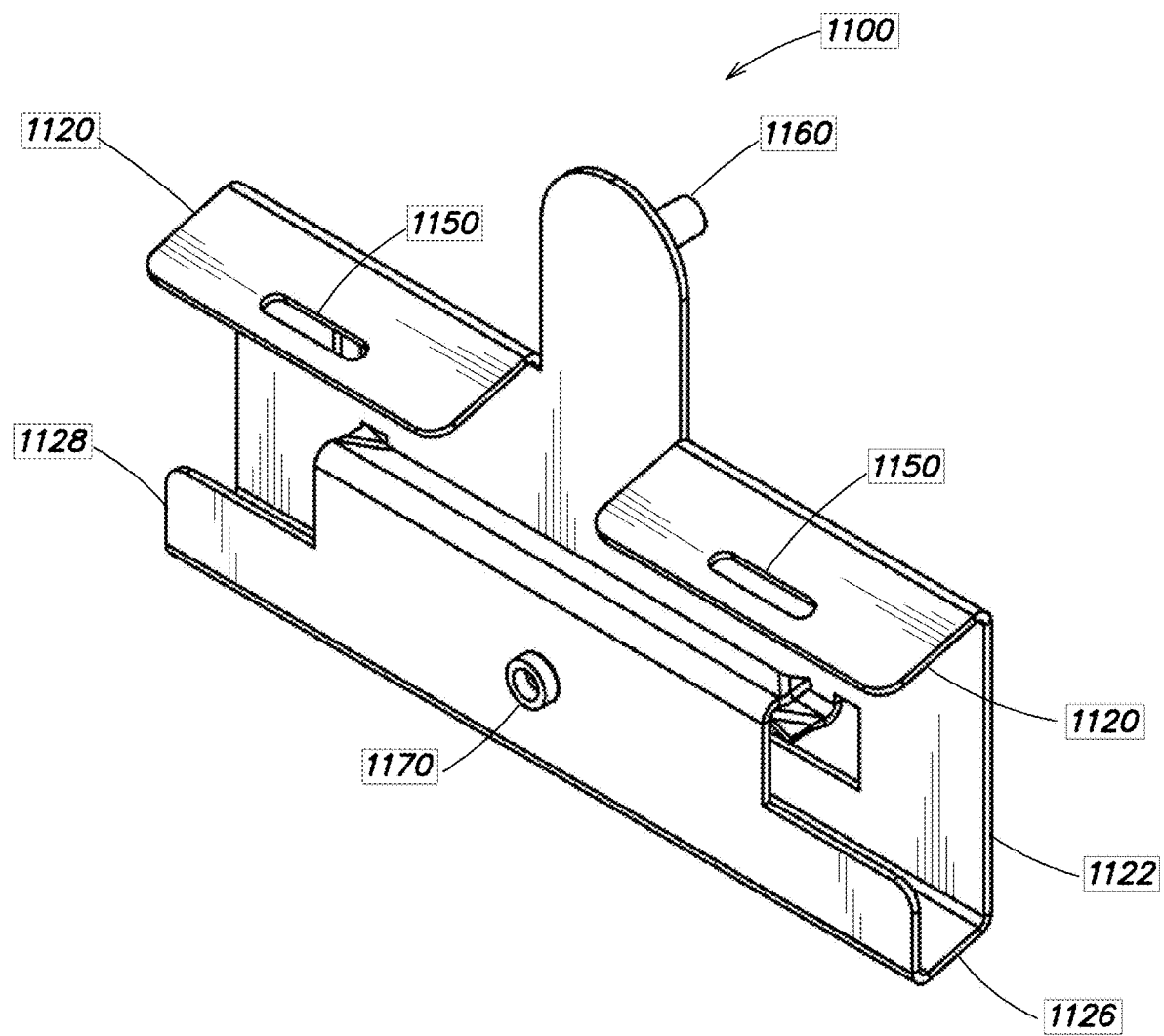
FIG. 8A is a top, front perspective view of a bar hanger holder for the bar hanger assembly with mating telescoping bars shown in FIG. 6A.
Figure 8B:
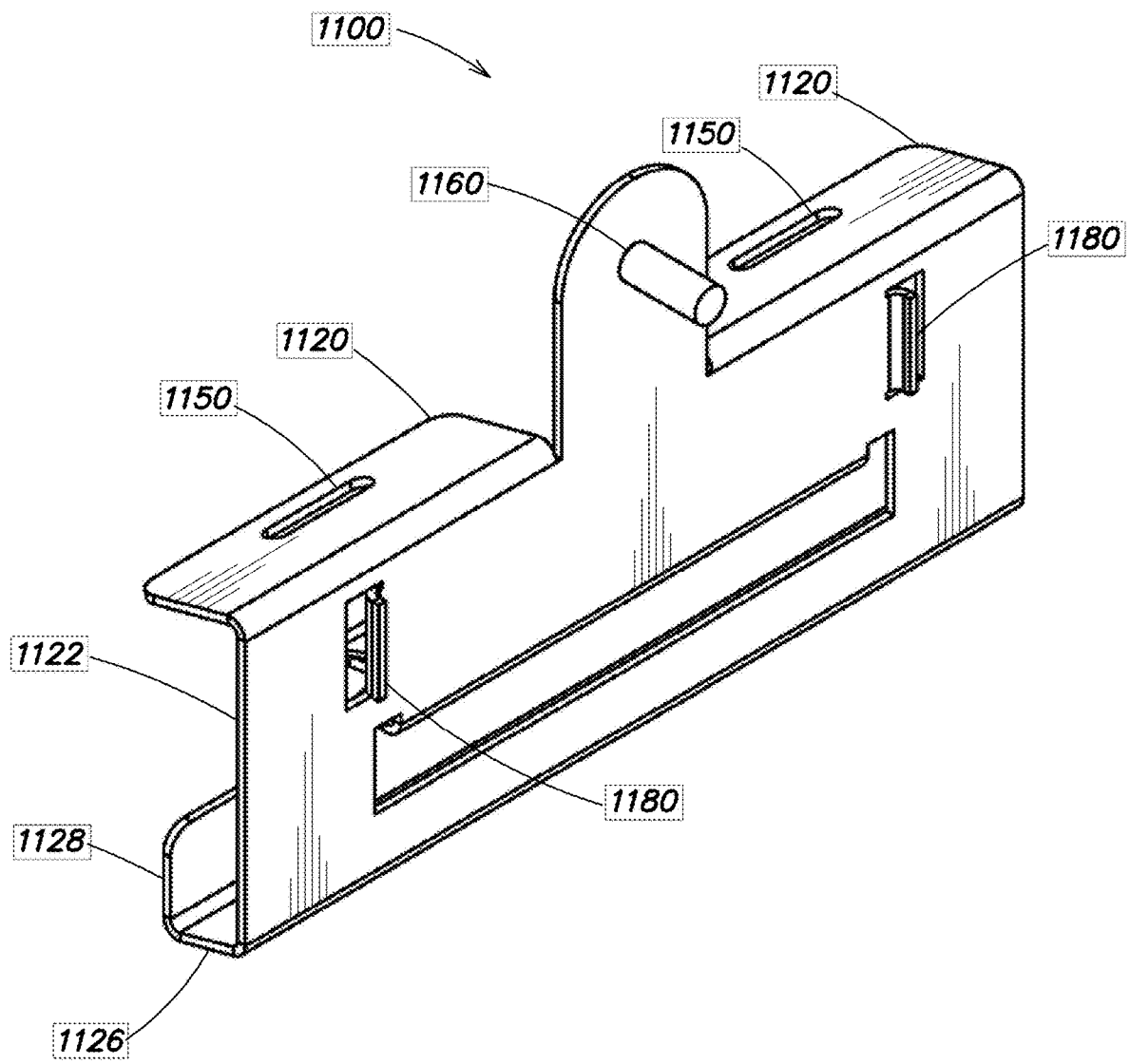
FIG. 8B is a top, rear perspective view of the bar hanger holder shown in FIG. 8A.
Figure 8C:
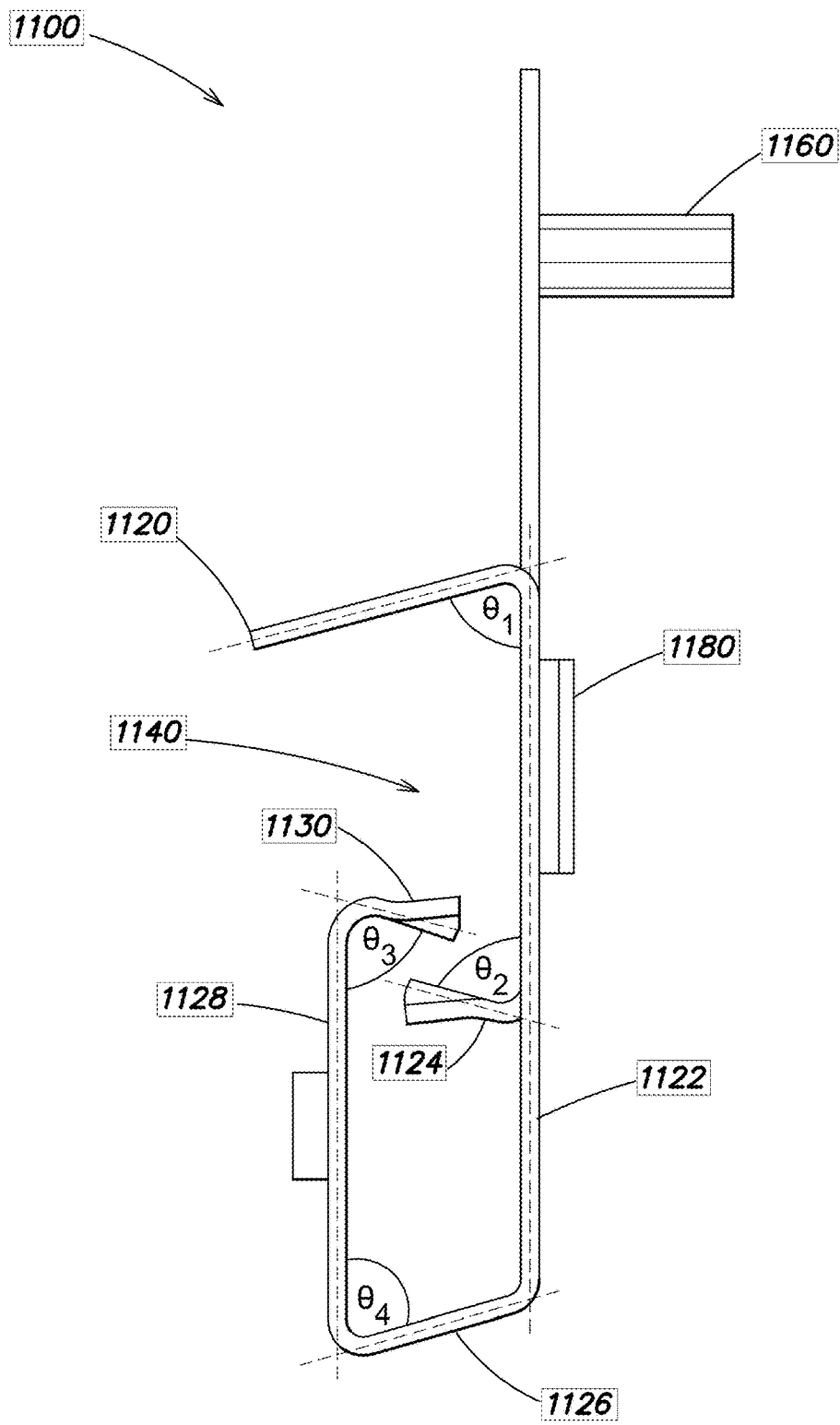
FIG. 8C is a left-side view of the bar hanger holder shown in FIG. 8A, the right-side view being a mirror image.
Figure 8D:
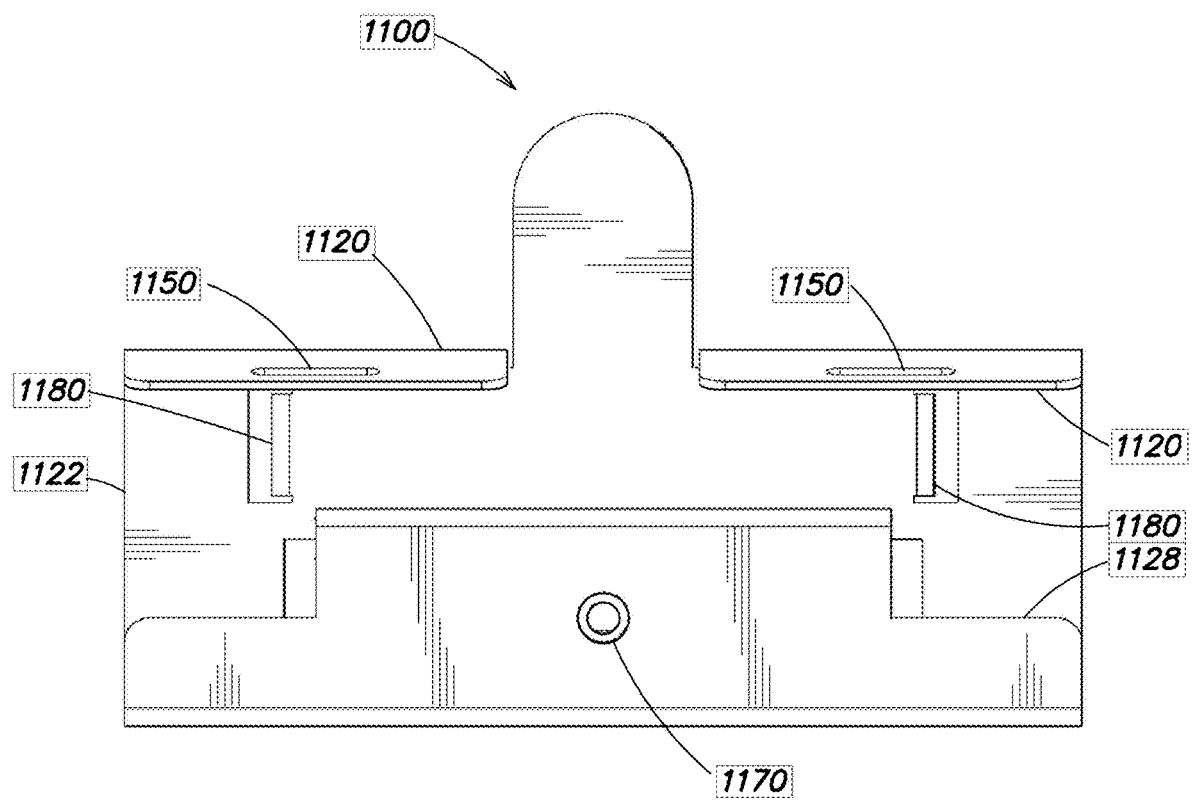
FIG. 8D is a front-side view of the bar hanger holder shown in FIG. 8A.
Figure 8E:
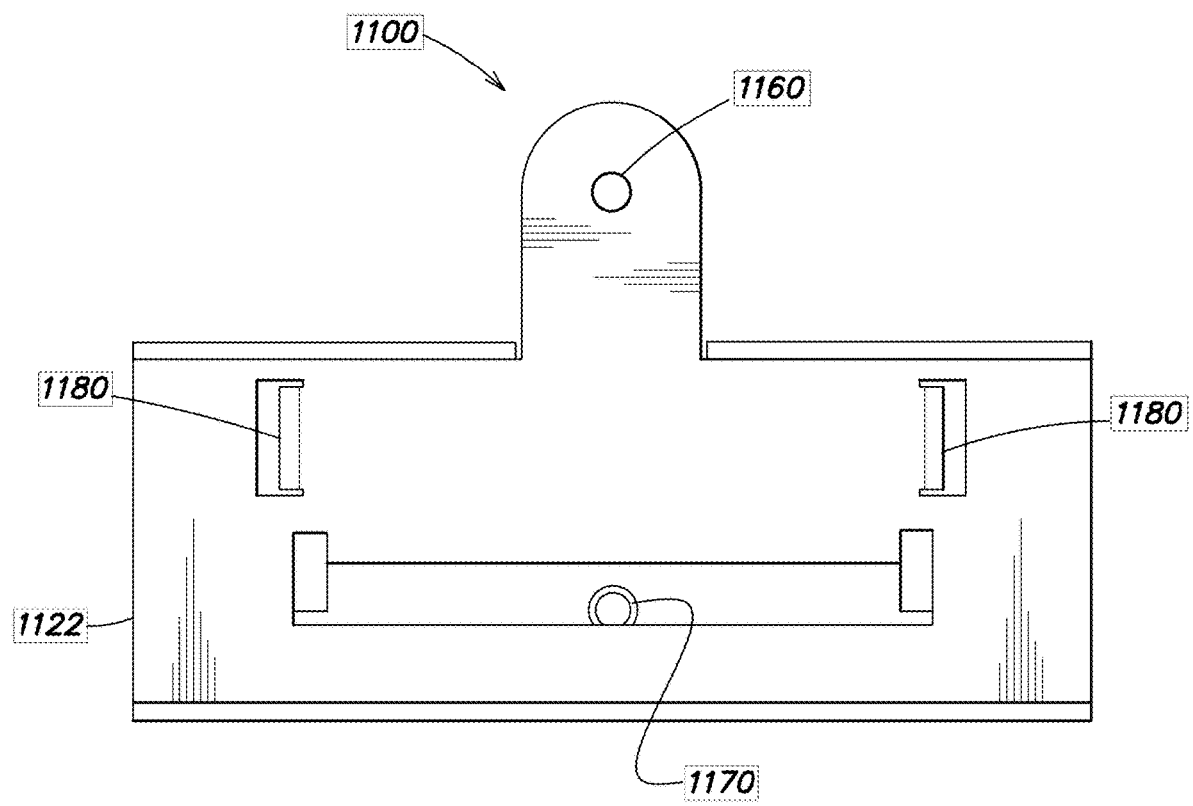
FIG. 8E is a rear-side view of the bar hanger holder shown in FIG. 8A.
Figure 8F:
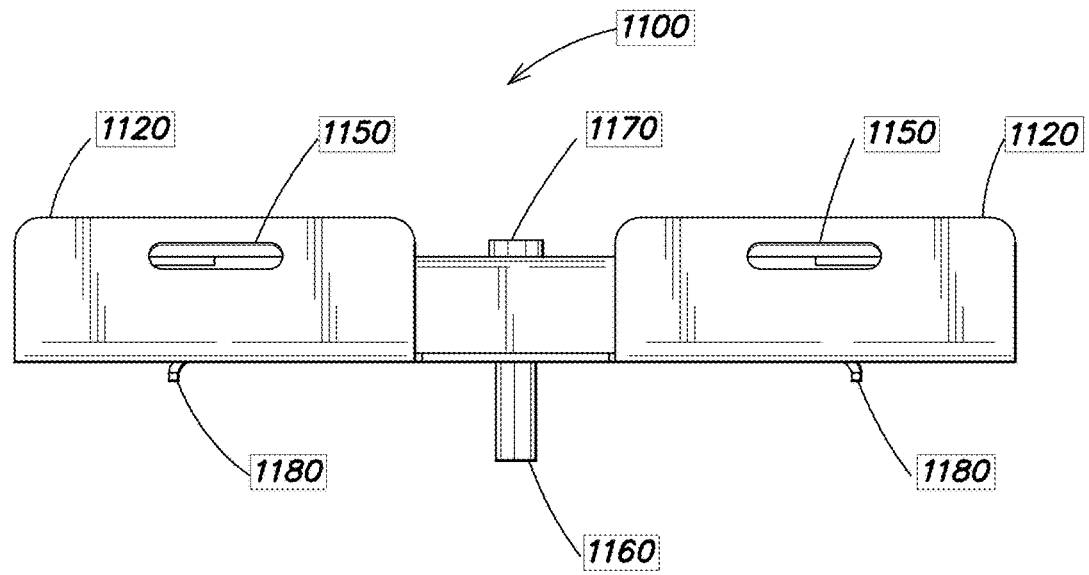
FIG. 8F is a top-side view of the bar hanger holder shown in FIG. 8A.
Figure 8G:
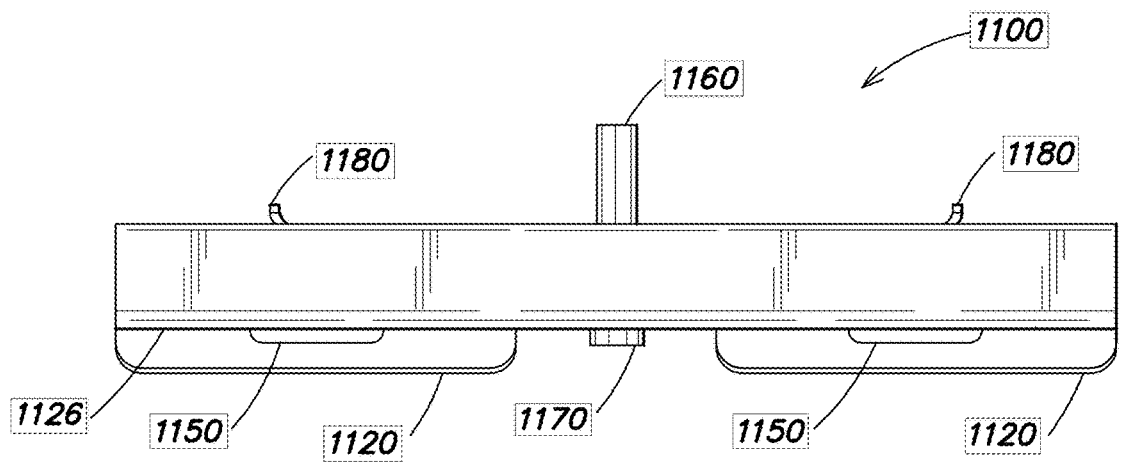
FIG. 8G is a bottom-side view of the bar hanger holder shown in FIG. 8A.
Figure 9A:
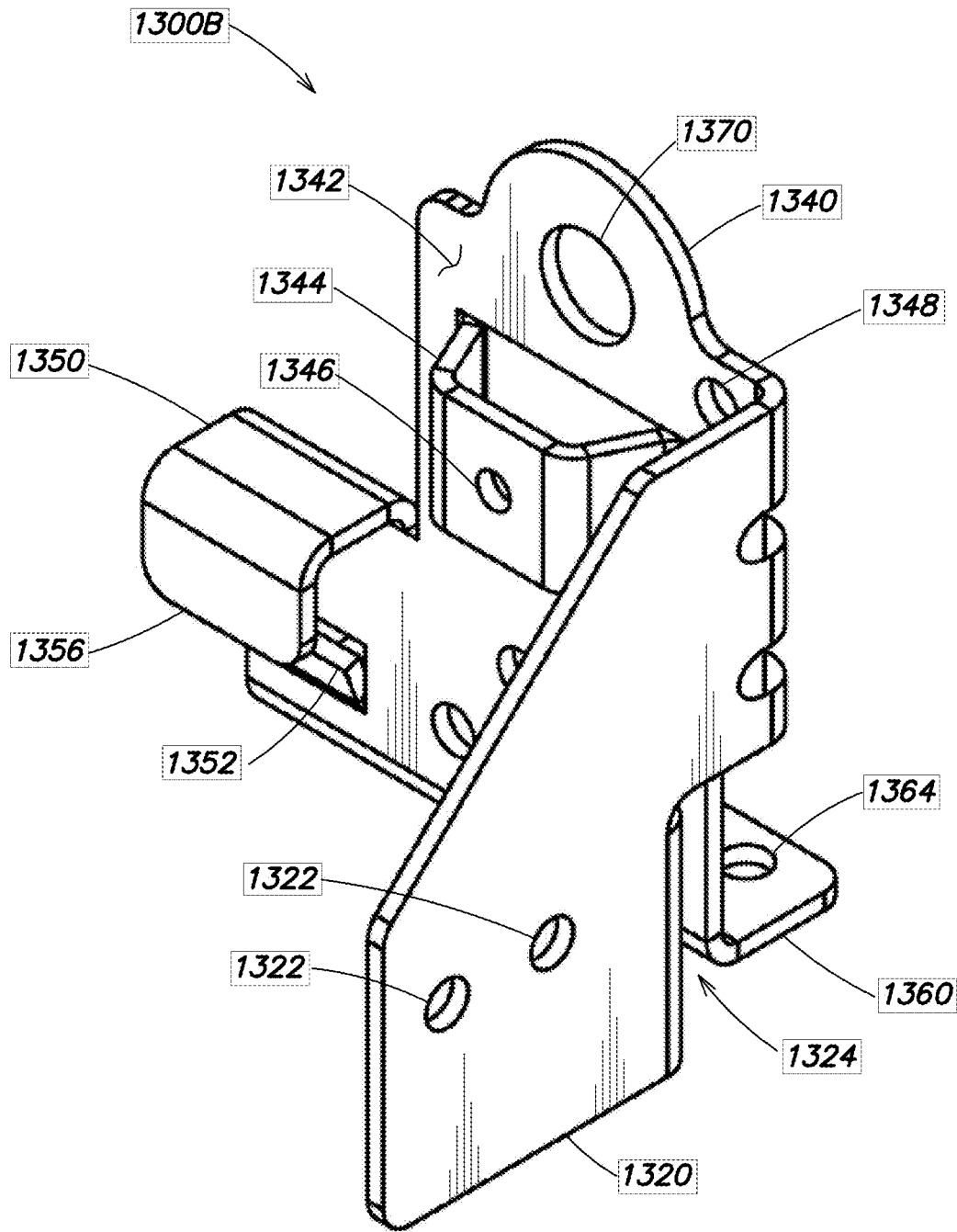
FIG. 9A is a top, rear perspective view of a first bar hanger head for the bar hanger assembly with mating telescoping bars shown in FIG. 6A.
Figure 9B:
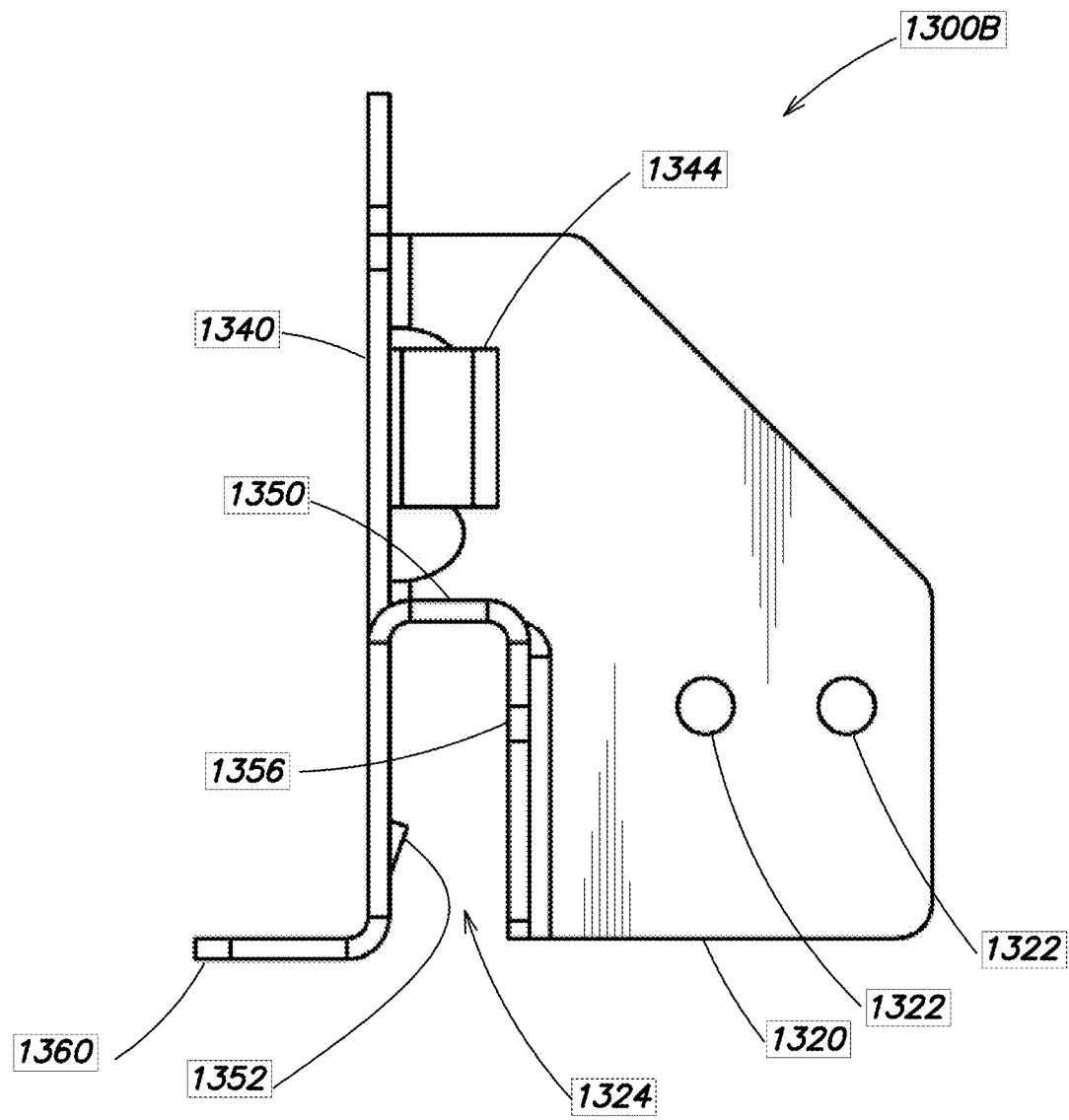
FIG. 9B is a front-side view of the first bar hanger head shown in FIG. 9A.
Figure 9C:
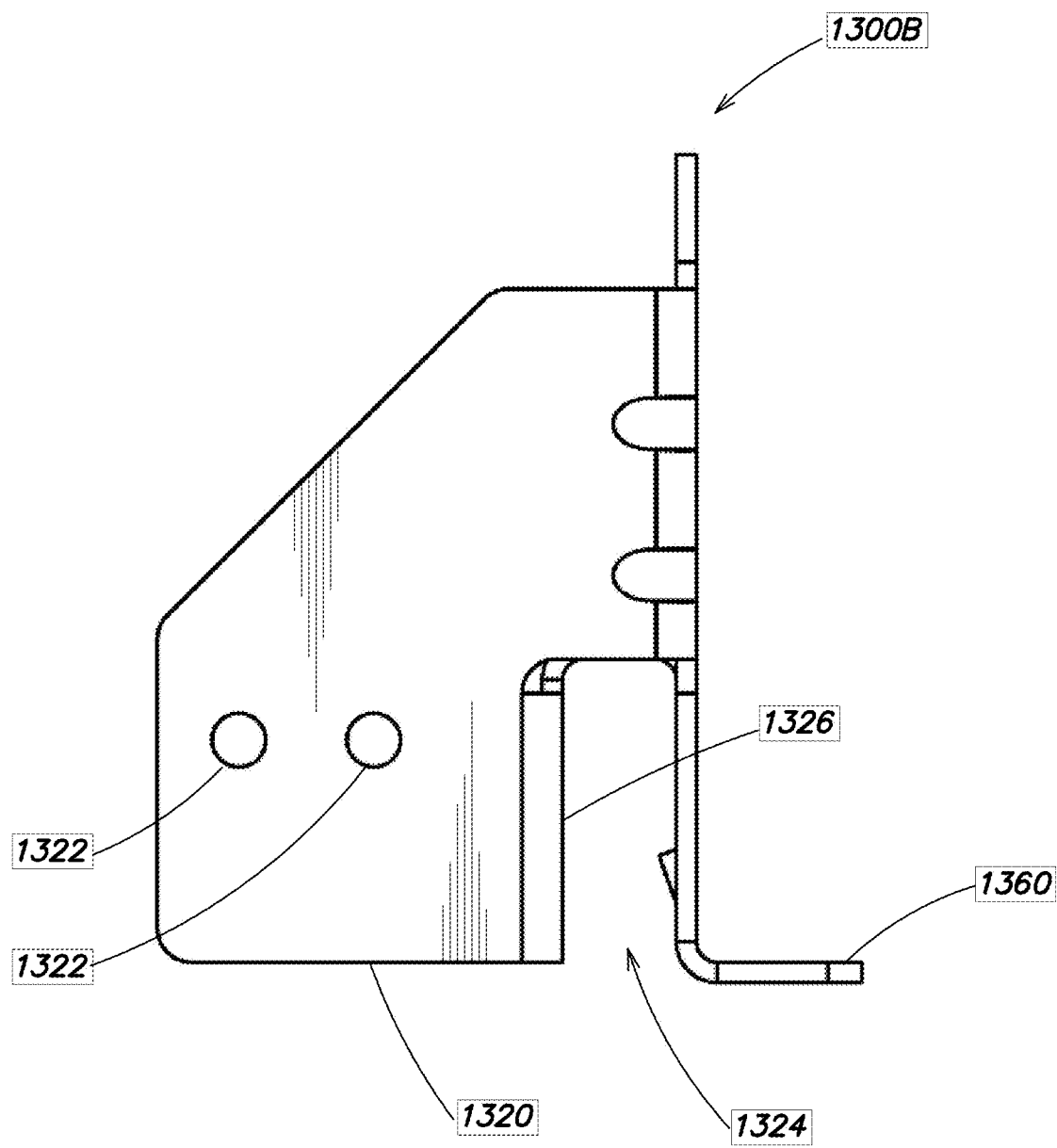
FIG. 9C is a rear-side view of the first bar hanger head shown in FIG. 9A.
Figure 9D:
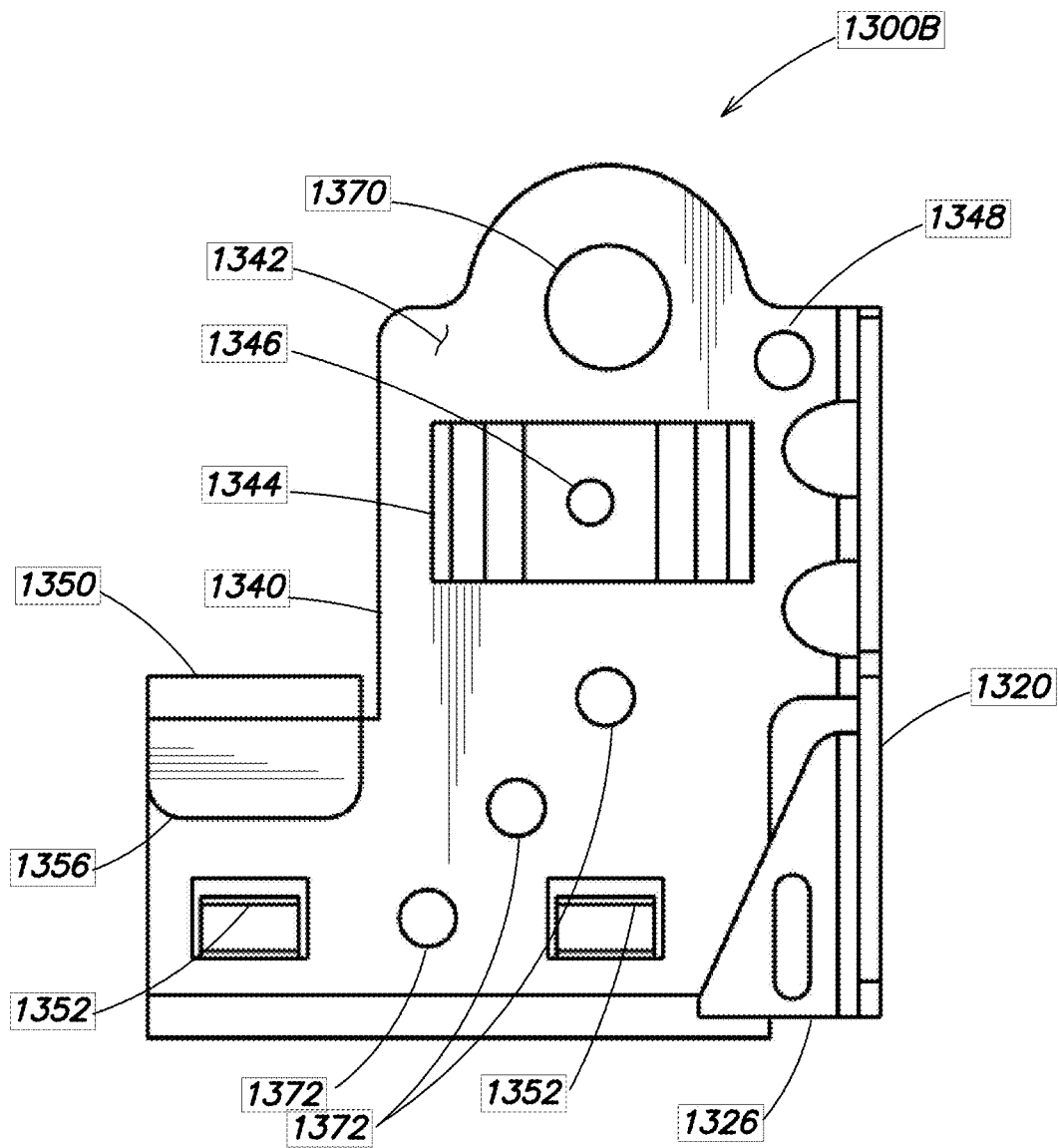
FIG. 9D is a left-side view of the first bar hanger head shown in FIG. 9A.
Figure 9E:
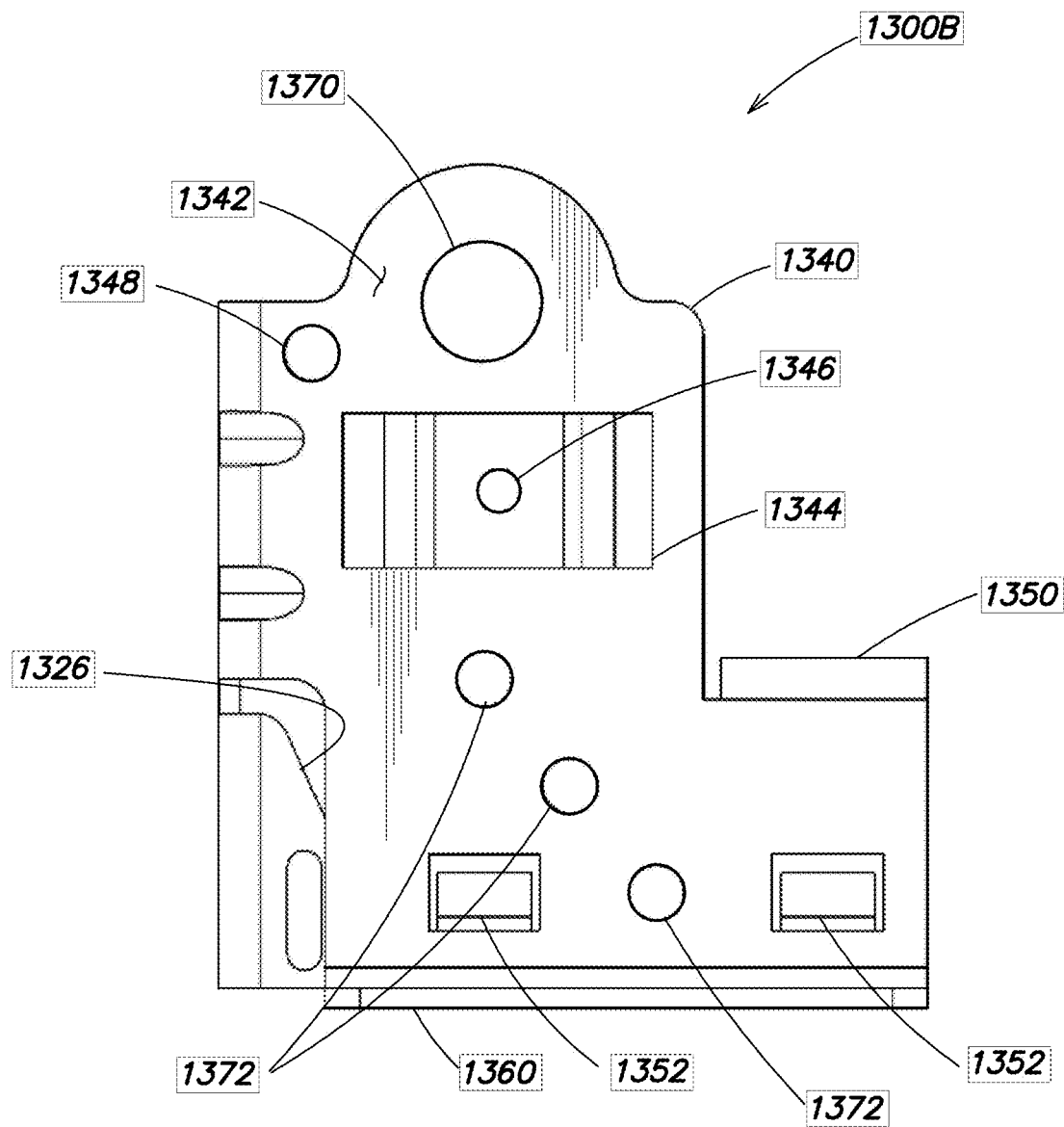
FIG. 9E is a right-side view of the first bar hanger head shown in FIG. 9A.
Figure 9F:
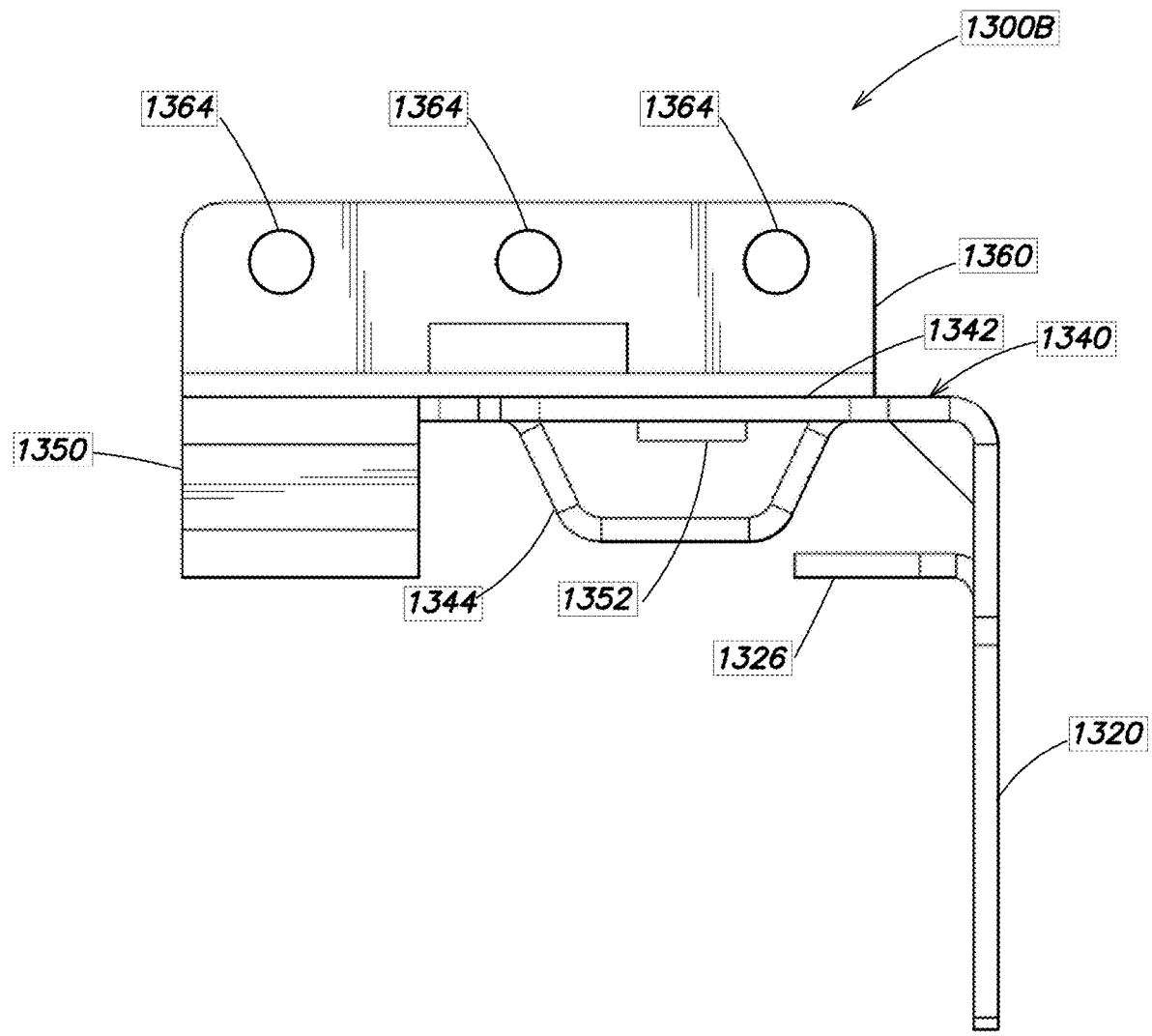
FIG. 9F is a top-side view of the first bar hanger head shown in FIG. 9A.
Figure 9G:
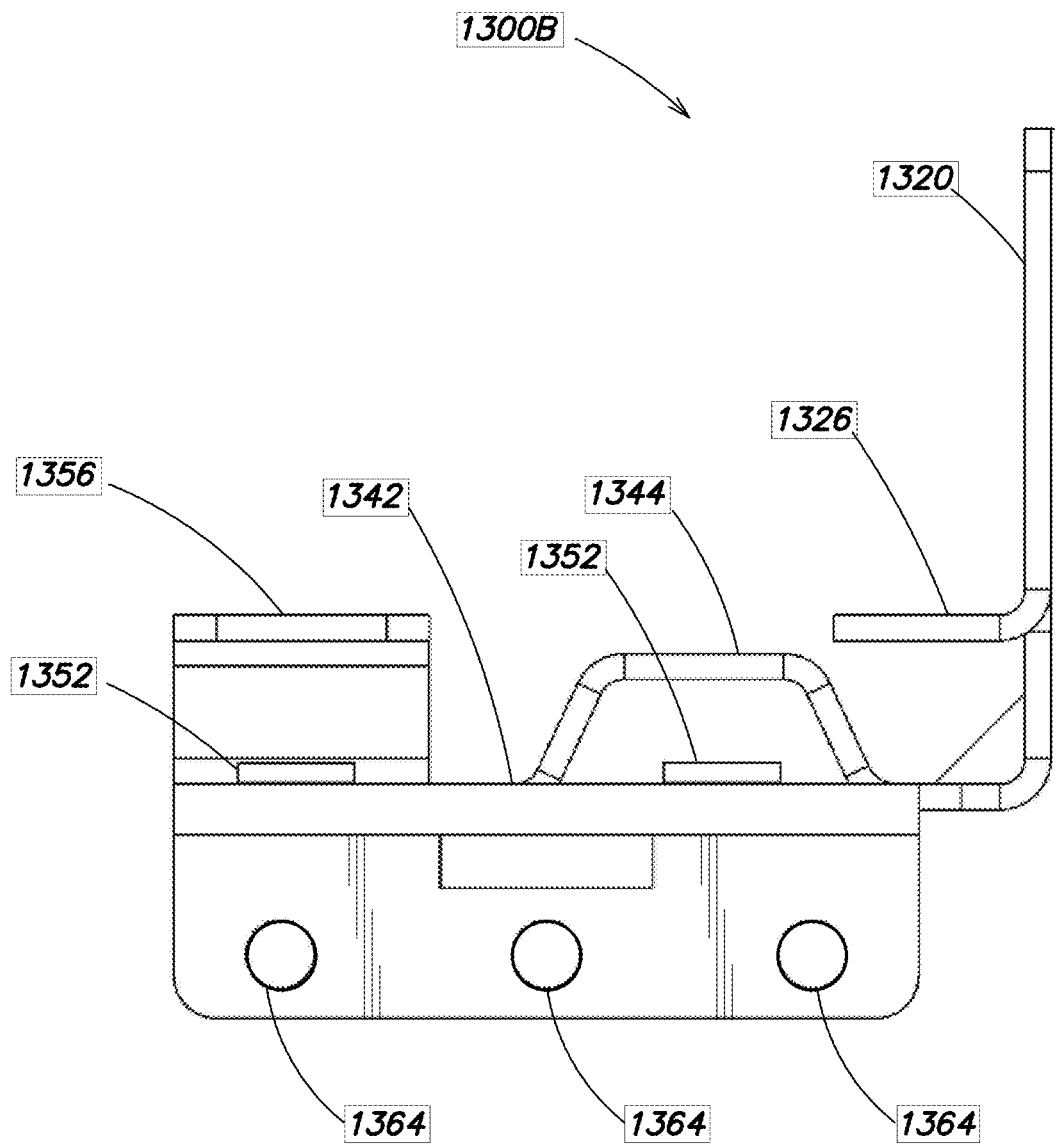
FIG. 9G is a bottom-side view of the first bar hanger head shown in FIG. 9A.
Figure 10A:
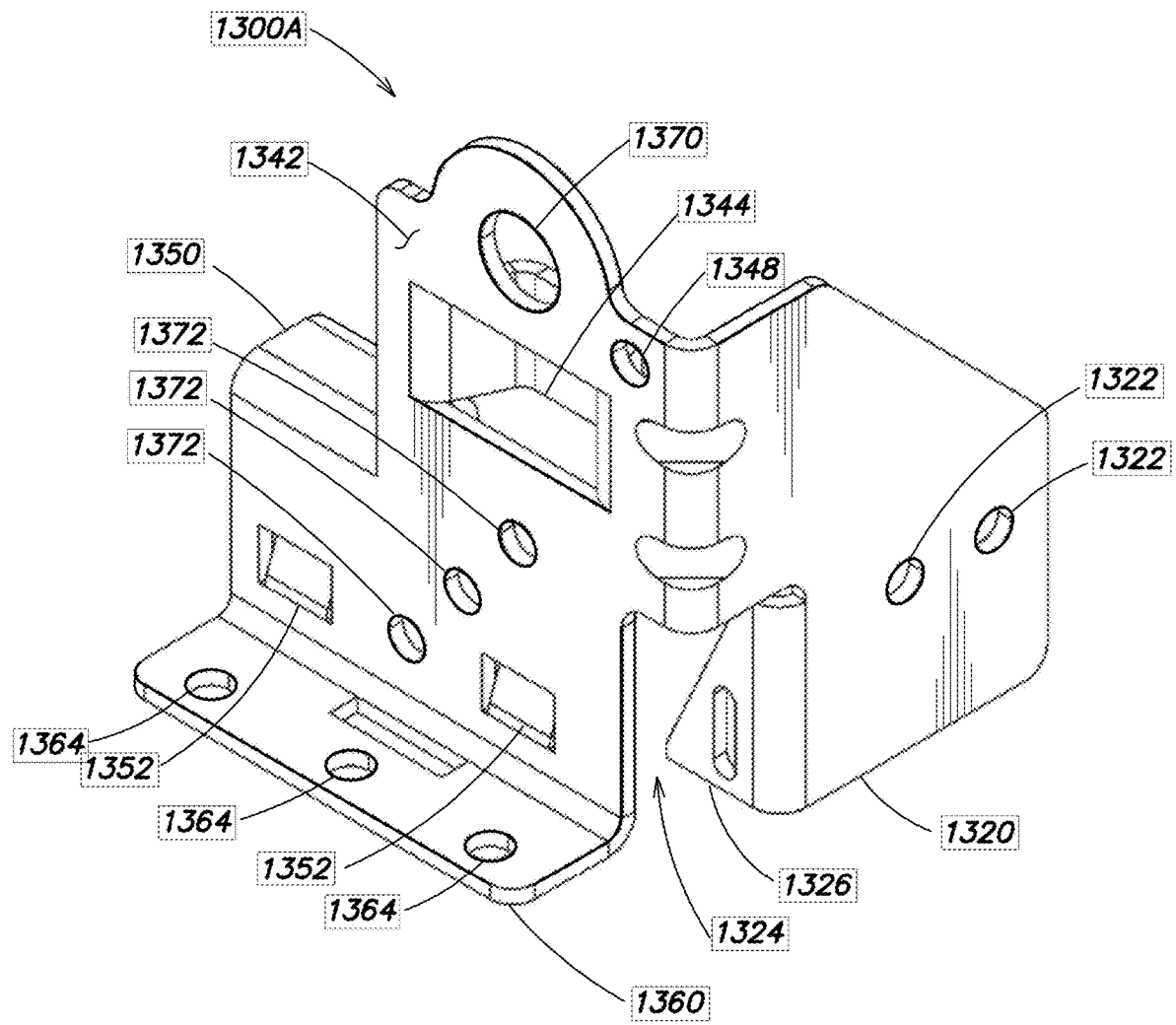
FIG. 10A is a top, rear perspective view of a second bar hanger head for the bar hanger assembly with mating telescoping bars shown in FIG. 6A.
Figure 10B:
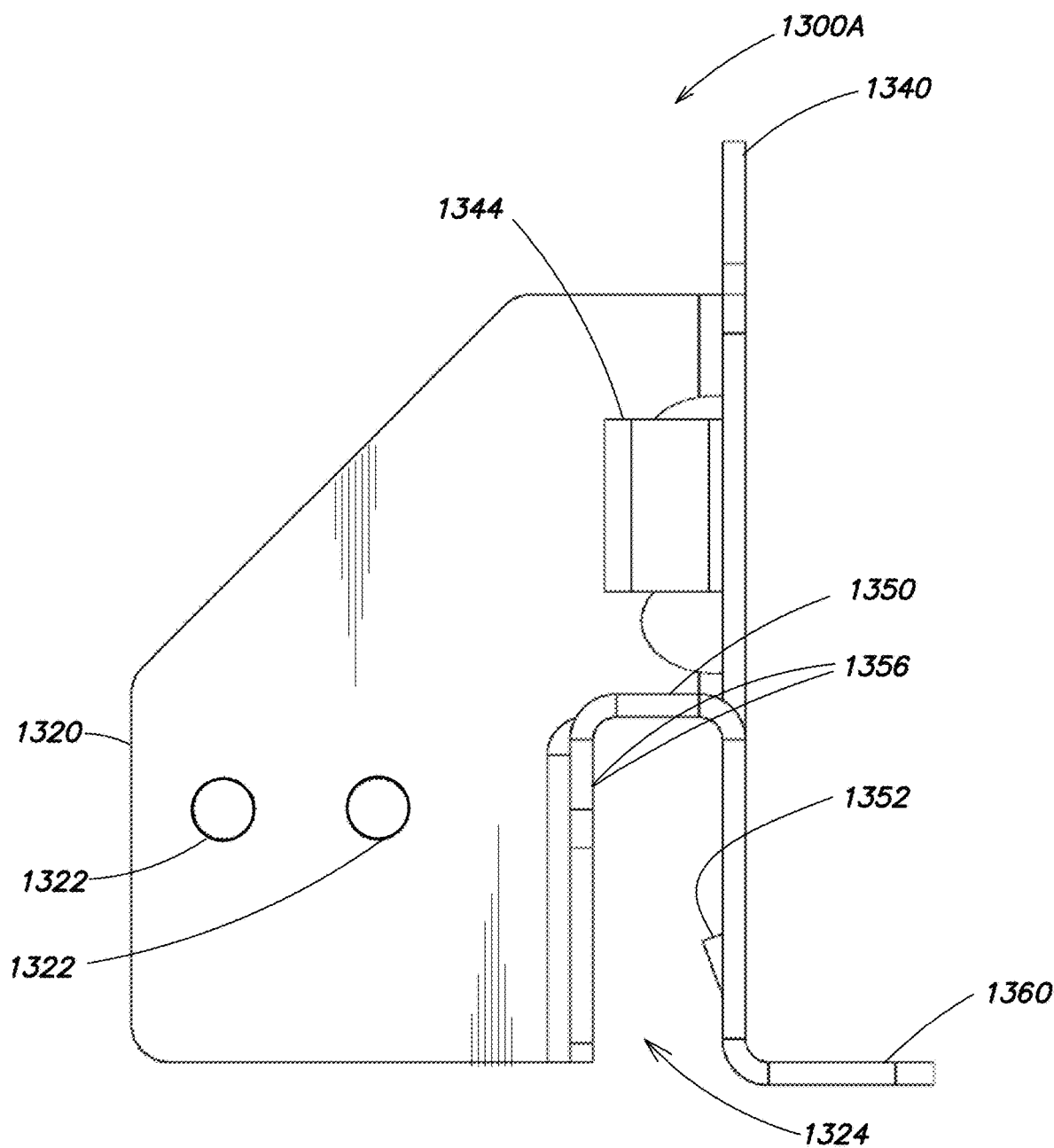
FIG. 10B is a front-side view of the second bar hanger head shown in FIG. 10A.
Figure 10C:
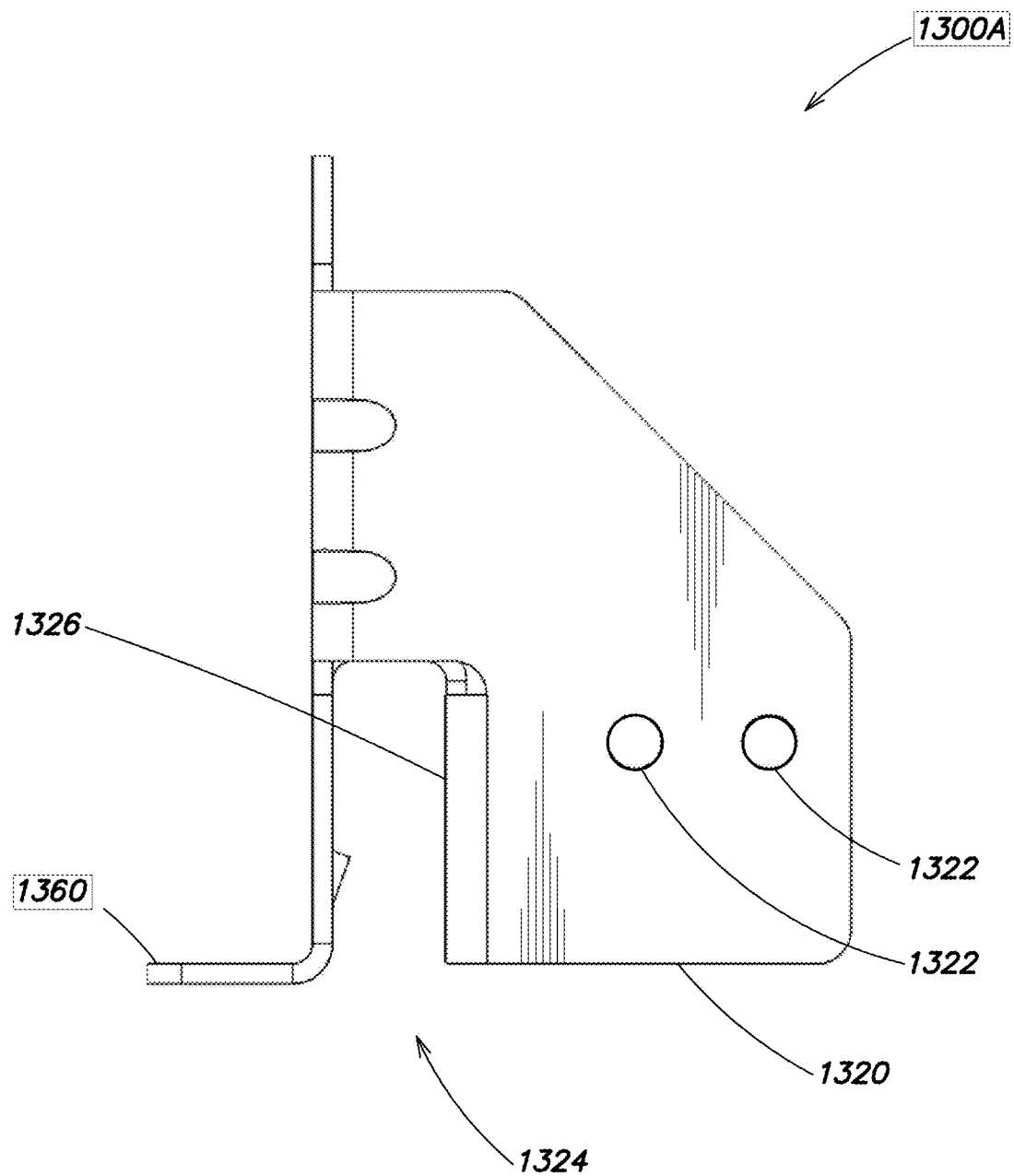
FIG. 10C is a rear-side view of the second bar hanger head shown in FIG. 10A.
Figure 10D:
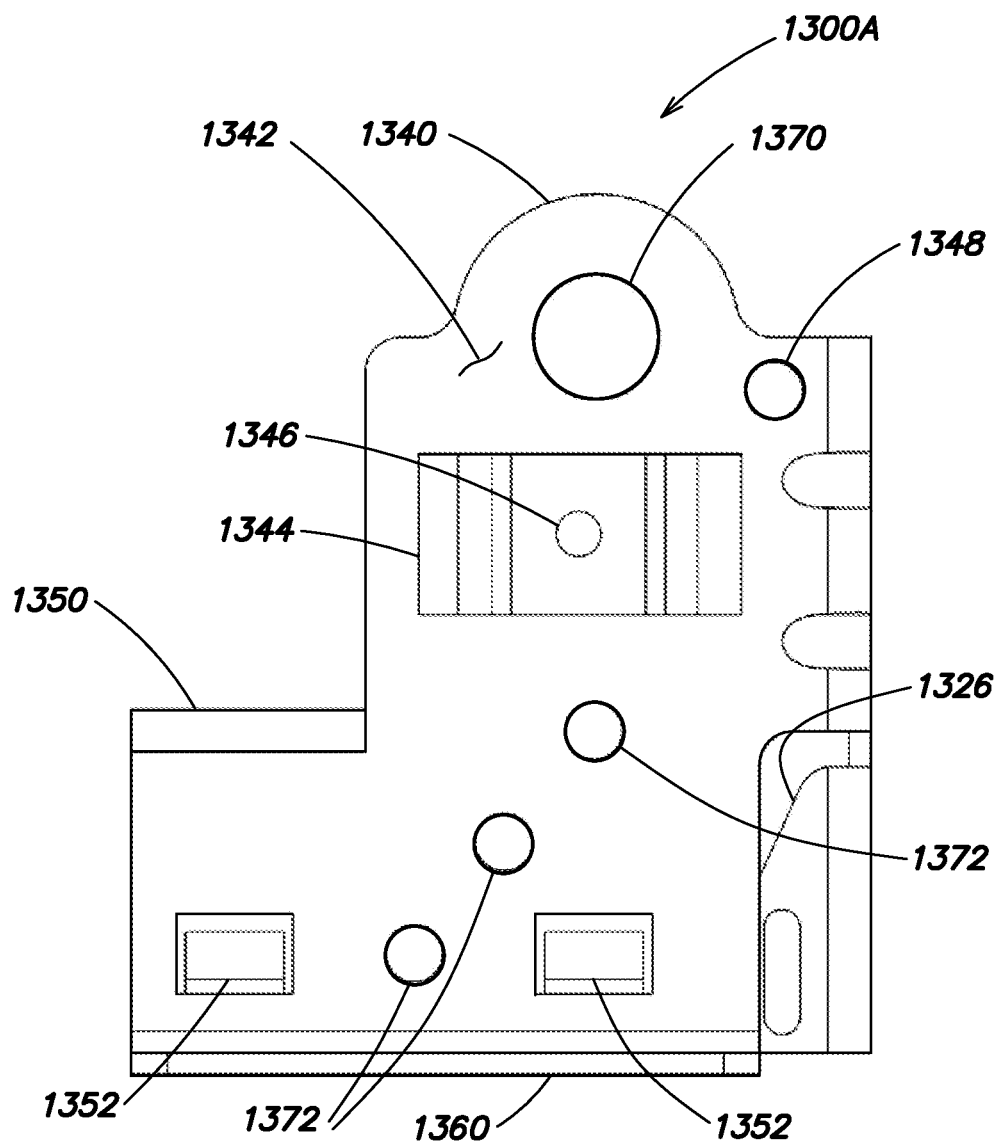
FIG. 10D is a left-side view of the second bar hanger head shown in FIG. 10A.
Figure 10E:
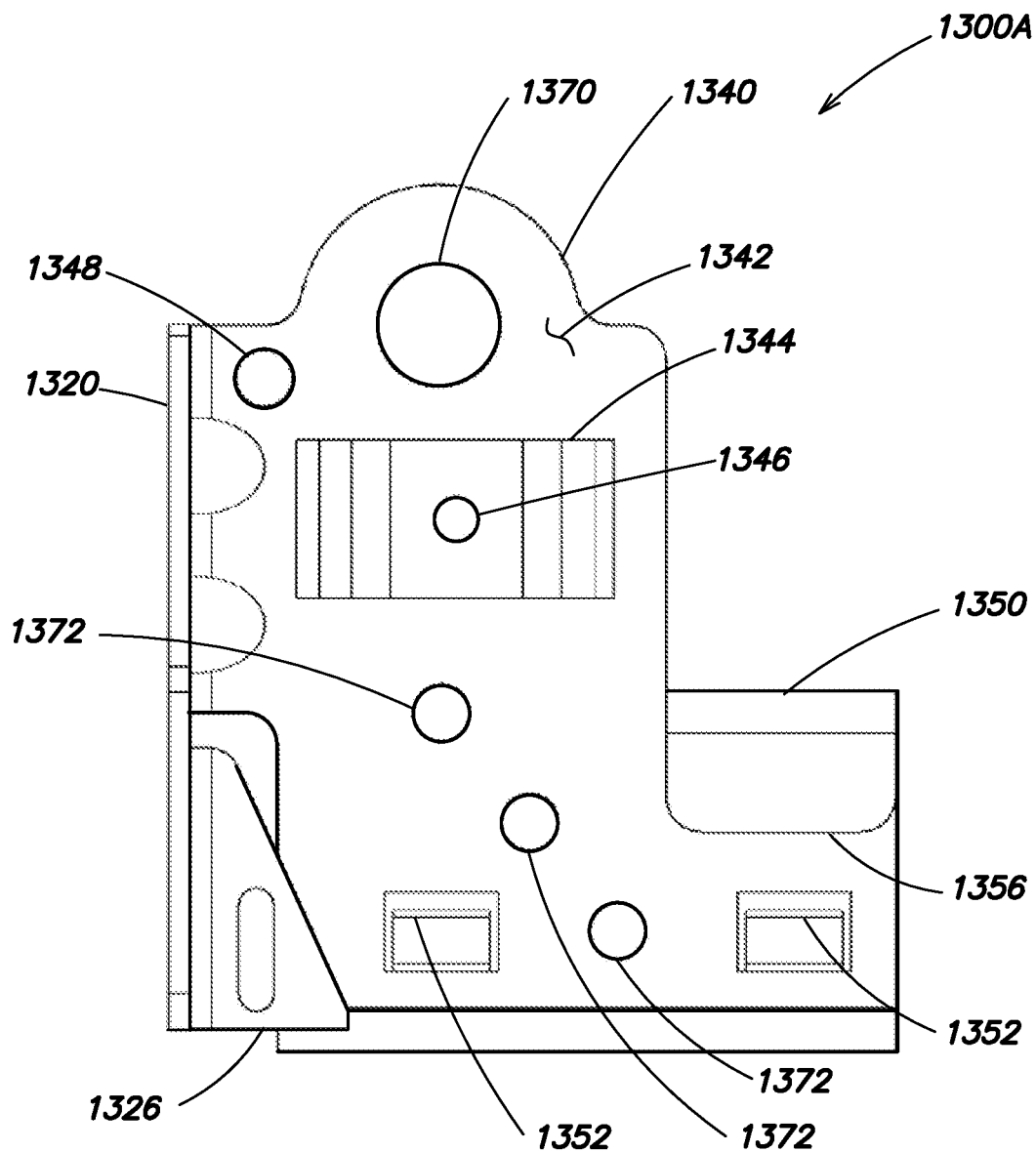
FIG. 10E is a right-side view of the second bar hanger head shown in FIG. 10A.
Figure 10F:
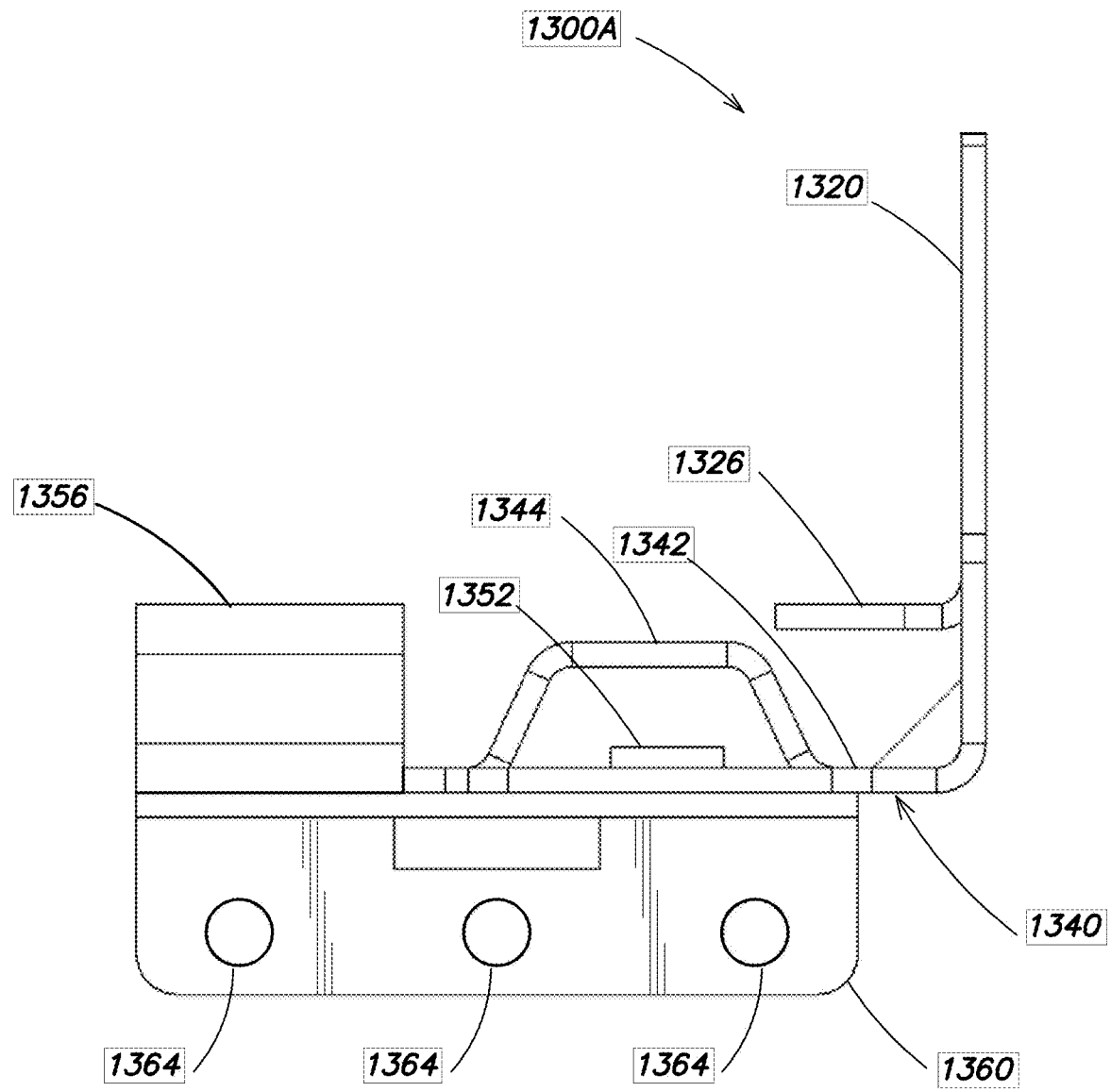
FIG. 10F is a top-side view of the second bar hanger head shown in FIG. 10A.
Figure 10G:
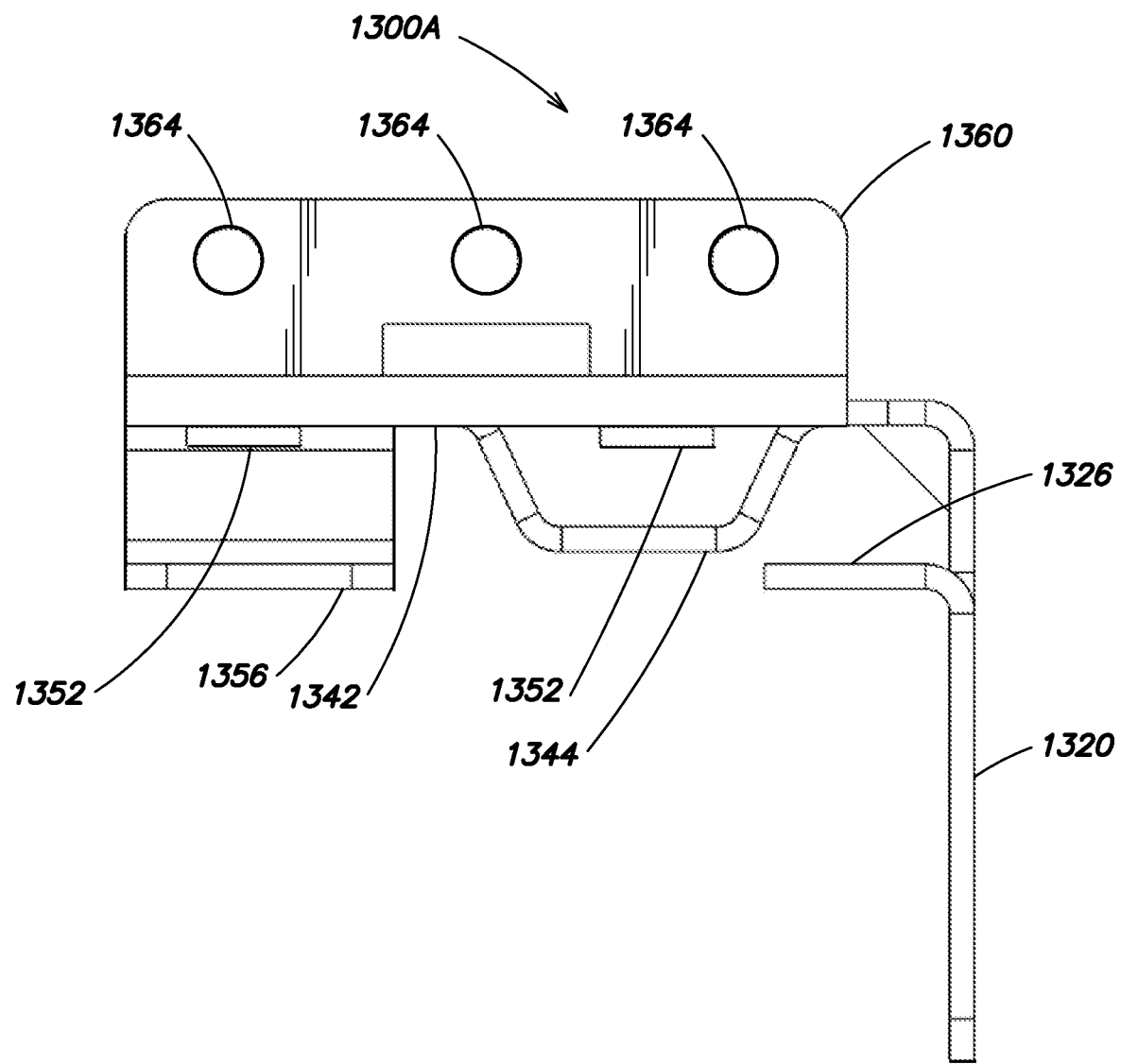
FIG. 10G is a bottom-side view of the second bar hanger head shown in FIG. 10A.

The bar hanger head 1300 provides the mechanical interface to couple the bar hanger assembly 1000*a* to various support structures in the built environment. FIG. 5 show exemplary bar hanger heads 1300A and 1300B, which are mirror symmetric variants containing the same features. As shown, the bar hanger head 1300 may include an attachment flange 1320 to couple the bar hanger head 1300 to the bar hanger 1200, a primary mounting flange 1340 to couple the bar hanger head 1300 to a support structure, and a secondary mounting flange 1360 to provide additional mechanical support to the support structure, as shown in FIG. 5. In some implementations, the multiple symmetric variants of the bar hanger head 1300 (e.g., 1300A and 1300B) may be used at respective ends of the bar hanger assembly 1000*a* shown in FIGS. 2A and 2B.

The attachment flange 1320 may be used to couple the bar hanger head 1300 to the bar hanger 1200 via one or more attachment features disposed on the attachment flange 1320. The attachment features may be used in conjunction with various coupling mechanisms including, but not limited to, screw fasteners, bolt fasteners, spring clips, friction clips, clamps, resins, adhesives, and any other coupling mechanism known to one of ordinary skill in the art. For example, FIG. 5 shows the exemplary bar hanger head 1300 includes the attachment flange 1320 where the plane of the attachment flange 1320 is oriented parallel to the plane defined by the first and second segments 1222 and 1226 of the bar hanger 1200. One or more holes 1322 may be disposed on the attachment flange 1320, aligned to corresponding holes 1322 on the bar hanger head 1300 to be coupled using rivets. However, it should be appreciated other coupling mechanisms may be used to couple the bar hanger head 1300 to the bar hanger 1200 as describe above. A portion of the attachment flange 1320 may be removed to form a gap 1324 that is dimensioned to receive a T-bar support for coupling to the bar hanger head 1300. The attachment flange 1320 may also include a tab A 1326 oriented orthogonally with respect to the attachment flange 1320 and parallel to the primary mounting flange 1340. The tab A 1326 may include a slot to facilitate coupling to a support structure, such as a T-bar support.

The primary mounting flange 1340 may provide several features to allow the bar hanger head 1300 to couple to various types of support structures including, but not limited to, T-bars, joists, and framing structures. In some implementations, the primary mounting flange 1340 may be oriented orthogonally to the attachment flange 1320 such that the plane of the primary mounting flange 1340 is parallel to a plane with a normal vector substantially aligned with the direction for slidable adjustment of the bar hangers 1200. The primary mounting flange 1340 may include various attachment features to accommodate various coupling mechanisms including, but not limited to, screw fasteners, bolt fasteners, spring clips, friction clips, clamps, resins, adhesives, and any other coupling mechanism known to one of ordinary skill in the art. In one example shown in FIG. 5, the primary mounting flange 1340 may include a first wall 1342 and a second wall 1344 protruding from the first wall 1342, as shown in FIG. 5. The second wall 1344 may include a hole 1346 for a screw fastener or a bolt fastener to couple to the support structure. The first wall 1342 may include additional holes 1348 to provide additional reinforcement when attaching the bar hanger head 1300 to the support structure.

As shown in FIG. 5, the primary mounting flange 1340 may also include one or more brace stubs 1350 arranged such that when a T-bar support is inserted through the gap 1324, the brace stubs 1350 may rest (e.g., mounting tab 1356) on at least a portion of the T-bar support. In this manner, the bar hanger head 1300 may be physically placed onto the T-bar support to position the bar hanger head 1300 for subsequent coupling to the T-bar support. The primary mounting flange 1340 may also include a catch 1352, which may be a protruding tab, designed to engage a portion of the T-bar support such that the bar hanger head 1300 may be securely attached to the T-bar support. The primary mounting flange 1340 may also include an additional slot 1354, which may be used to further couple the bar hanger head 1300 to a support structure, such as a T-bar support.

The secondary mounting flange 1360 may be oriented orthogonally with respect to the attachment flange 1320 and the primary mounting flange 1340 and disposed along a bottom edge of the primary mounting flange 1340. In this manner, the secondary mounting flange 1360 may provide additional coupling to the support structure along a direction orthogonal to the primary mounting flange 1340, such as in a wooden or metal joist. Various attachment features may be disposed on the secondary mounting flange 1360 to accommodate various coupling mechanisms including, but not limited to, screw fasteners, bolt fasteners, spring clips, friction clips, clamps, resins, adhesives, and any other coupling mechanism known to one of ordinary skill in the art. In one example in FIG. 5, the secondary mounting flange 1360 may include a slot 1362 and a hole 1364 to accommodate a screw fastener or a bolt fastener.

In some implementations, the bar hanger assembly 1000a may be coupled to a support structure where the primary mounting flange 1340 is unable to physically contact the desired surface of the support structure due to the presence of the secondary mounting flange 1360. For example, the bar hanger head 1300 may be coupled to a C-shaped or an I-shaped support structure where the primary mounting flange 1340 couples to the web (i.e., the portion of the support structure that supports two opposing flanges). In such cases, the secondary mounting flange 1360 may be designed to be removable to allow the primary mounting flange 1340 to couple to such support structures. As shown in FIG. 5, a portion of the secondary mounting flange 1360 located between where the secondary mounting flange 1360 and the primary mounting flange 1340 join together may be removed. The remaining portions may then be further perforated. In this manner, the secondary mounting flange 1360 may be readily removed by simply bending the secondary mounting flange 1360 relative to the primary mounting flange 1340 until fatigue in the material results in detachment of the secondary mounting flange 1360.

The bar hanger head 1300 may be formed from various materials including, but not limited to, aluminum, steel, cast iron, tin, brass, polyethylene, and polyvinyl chloride. In some implementations where the bar hanger head 1300 is formed from metals, the bar hanger head 1300 may be fabricated from a sheet metal through a series of bending, cutting, and drilling processes to form the desired shape of the bar hanger head 1300. In some implementations where the bar hanger head 1300 is formed from plastic, the bar hanger head 1300 may be fabricated using various processes including, but not limited to, extrusion and injection molding. In some instances, multiple parts formed from sheet metal may be joined together using various attachment methods including, but not limited to, brazing, welding, adhesives, and any other known attachment methods known to one of ordinary skill in the art.

A Second Exemplary Bar Hanger Assembly

FIGS. 6A-6H show another exemplary bar hanger assembly 1000b. As shown, the bar hanger assembly 1000b may include similar components as the bar hanger assembly 1000a. For example, the bar hanger assembly 1000b may include a bar hanger holder 1100 to mechanically couple the bar hanger assembly 1000b to a housing and to mechanically guide the bar hangers 1200A and 1200B. The bar hangers 1200A and 1200B may be telescopically slidable with respect to one another and the bar hanger holder 1100. The bar hangers 1200A and 1200B may each include a bar hanger head 1300A and 1300B, respectively, to couple the bar hanger assembly 1000b to support structures in the environment. It should be appreciated the various features, structures, and materials described with respect to the bar hanger assembly 1000a depicted in FIGS. 2A-2C may also be applied to the bar hanger assembly 1000b shown in FIGS. 6A-6H.

FIGS. 7A-7F show several views of the bar hanger 1200 in the bar hanger assembly 1000b. As shown, the bar hanger 1200 may be substantially similar to the bar hanger 1200 shown in FIGS. 4A-4D. For instance, the bar hanger 1200 may have an S-shaped cross-section comprising a top segment 1220, a first segment 1222, a middle segment, 1224, a second segment 1226, and a bottom segment 1228. As shown, the offset angles $\alpha_1$, $\alpha_2$, $\alpha_3$, and $\alpha_4$ between the segments may be between about 45 degrees and about 90 degrees to provide engagement between the bar hangers 1200A and 1200B and for ease of manufacturability. The bar hanger 1200 may also be configured to impose a compressive force and a frictional force with another bar hanger 1200 to maintain contact and to prevent unwanted sliding motion, respectively. The bar hanger 1200 may also include openings 1240 for coupling to the bar hanger head 1300, a mechanical stop comprising the tab 1250 and opening 1252, and notches 1260.

FIGS. 8A-8G show several views of the bar hanger holder 1100 in the bar hanger assembly 1000b. As shown, the bar hanger holder 1100 shown in FIGS. 8A-8G may include several of the same features as the bar hanger holder 1100 of FIGS. 3A-3F. The bar hanger holder 1100 may have a cross-section defined a top segment 1120, a first segment 1122, and a first middle segment 1124 to contact, at least in part, the bar hanger 1200B. The bar hanger holder 1100 may also include a bottom segment 1126, a second segment 1128, and a second middle segment 1130 to contact, at least in part, the bar hanger 1200A. The respective segments of the bar hanger holder 1100 define a channel 1140 to support and guide the bar hangers 1200A and 1200B.

The bar hanger holder 1100 may include additional features to facilitate manufacture and installation of the housing. For example, the bar hanger holder 1100 may include openings 1150 disposed on the top segments 1120. A flat blade screwdriver may be inserted into the openings 1150 to bend the top segments 1120 downwards in order to lock the position of the bar hangers 1200 and/or to reinforce the coupling between the bar hanger holder 1100 and the bar hangers 1200. Said in another way, the degree of physical contact and the magnitude of the compressive force generated by said contact between the bar hanger holder 1100 and the bar hanger 1200 may be modified by adjusting the position and/or angle $\alpha_1$ of the top segment 1120 via the openings 1150.

The bar hanger holder 1100 may also include an opening 1170 as the locking mechanism to constrain the bar hangers 1200 to the bar hanger holder 1100 (e.g., after the bar hanger assembly 1000b is installed). The opening 1170 may be disposed on the second segment 1128. The opening 1170 may be used to receive a fastener (not shown) that contacts the bar hanger 1200, thus preventing the bar hangers 1200 from moving with respect to the bar hanger holder 1100.

The bar hanger holder 1100 may also include a stud 1160 as the mounting element 1110 disposed on a flange on the first segment 1122. The stud 1160 may be inserted through an opening on the housing to couple the bar hanger assembly 1000b to said housing. In some implementations, the stud 1160 may be threaded such that a corresponding nut may be used to securely couple the bar hanger holder 1100 to the housing. In some implementations, the opening in the housing may be a slot, thus, the stud 1160 may be used to facilitate adjustment of the bar hanger assembly 1000b along the slot of the housing.

The bar hanger holder 1100 may also include flanges 1180 disposed on the first segment 1122. The flanges 1180 may be used to prevent the bar hanger holder 1100 and, by extension, the bar hanger assembly 1000b from rotating about the stud 1160 during assembly and installation. For example, the two flanges 1180 may be positioned to abut respective sides of the housing. Thus, when securing the bar hanger holder 1100 to the housing, any torque that may be imparted on the bar hanger holder 1100 (e.g., by tightening a nut on the stud 1160), is counteracted by the flanges 1180, which constrain the orientation of the bar hanger holder 1100 with respect to the housing.

FIGS. 9A-9G show several views of the bar hanger head 1300B in the bar hanger assembly 1000b. As shown, the bar hanger head 1300B shown in FIGS. 9A-9G may be substantially similar to the bar hanger head 1300B depicted in FIG. 5. Additionally, the bar hanger head 1300B may include an opening 1370 disposed on the primary mounting flange 1340 for a cable used to secure the housing (e.g., for a luminaire) to a building structure. The cable may be used to meet appropriate building codes related to buildings located in environments subject to earthquake/seismic activity. The bar hanger head 1300B may also include additional openings 1372 on the primary mounting flange 1340 for various types of fasteners to couple the bar hanger head 1300B to a wood or metal stud. FIGS. 10A-10G show several views of the bar hanger head 1300A in the bar hanger assembly 1000b. As shown, the bar hanger head 1300A may be mirror symmetric with the bar hanger head 1300B. Thus, the bar hanger head 1300A may include the same features used to couple the bar hanger assembly 1000b to the various support structures described above.

A Third Exemplary Bar Hanger Assembly

Figure 11B:
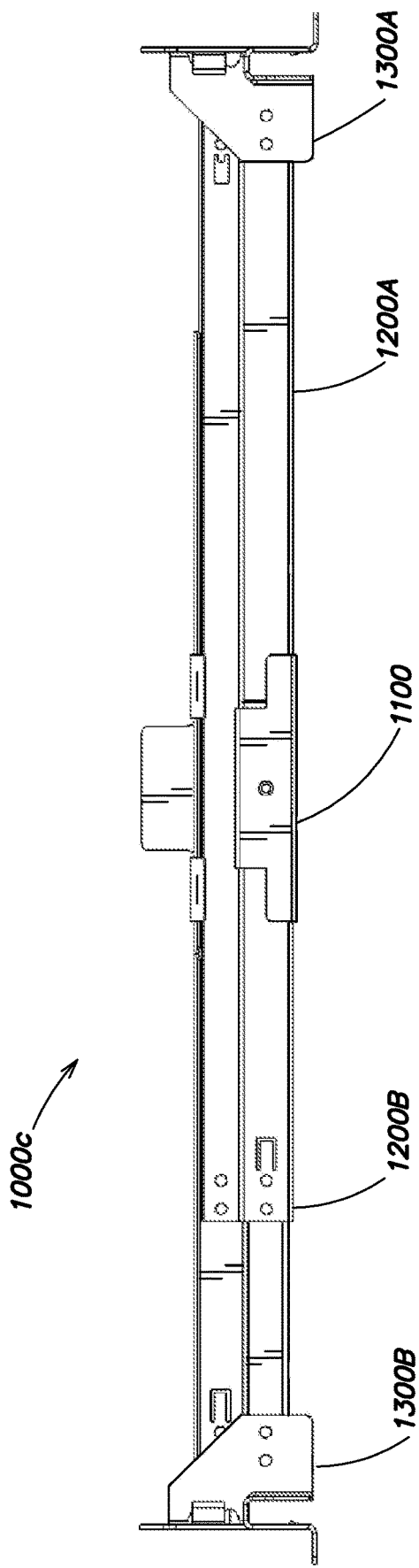
FIG. 11B is a front-side view of the bar hanger assembly shown in FIG. 11A.
Figure 11D:
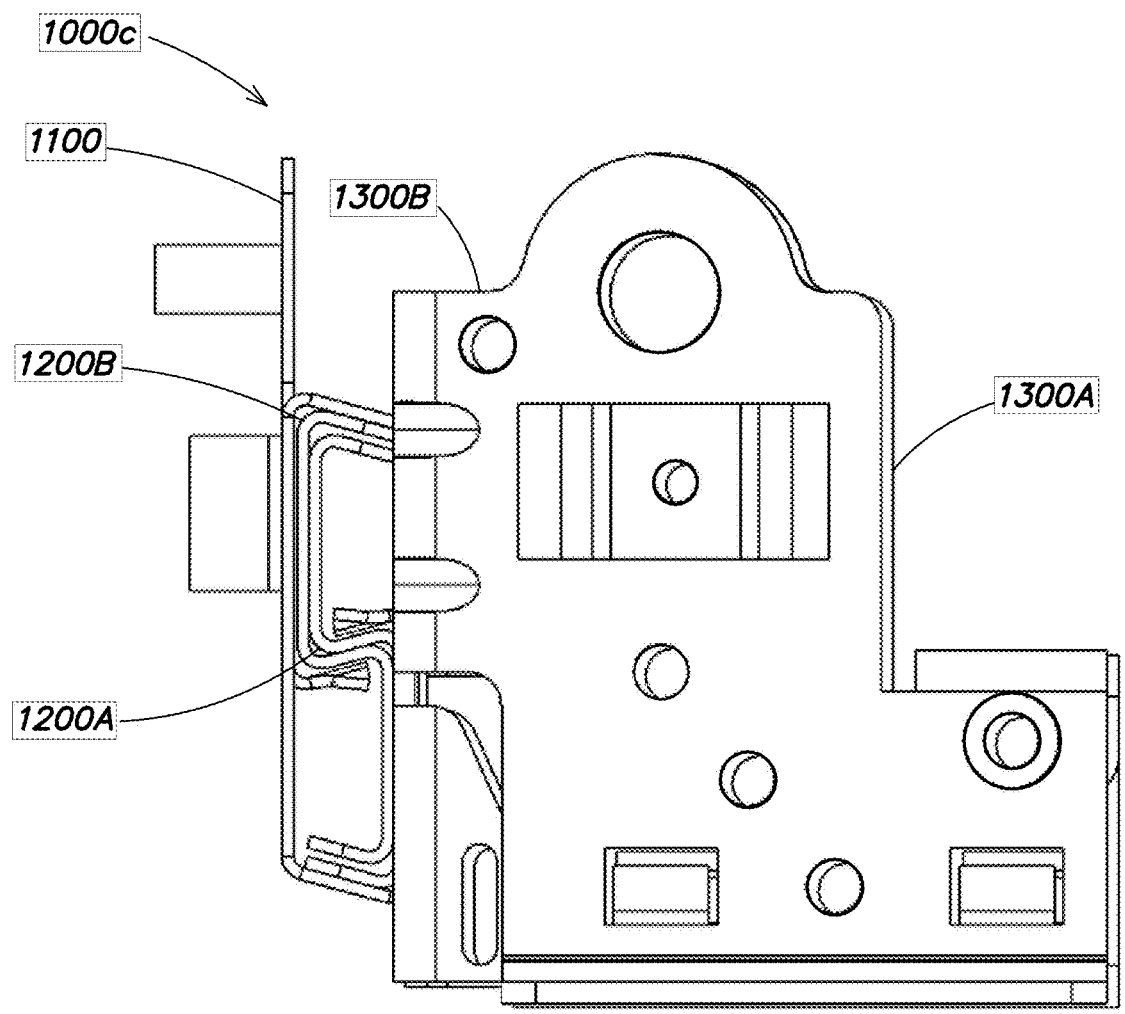
FIG. 11D is a right-side view of the bar hanger assembly shown in FIG. 11A.
Figure 11E:
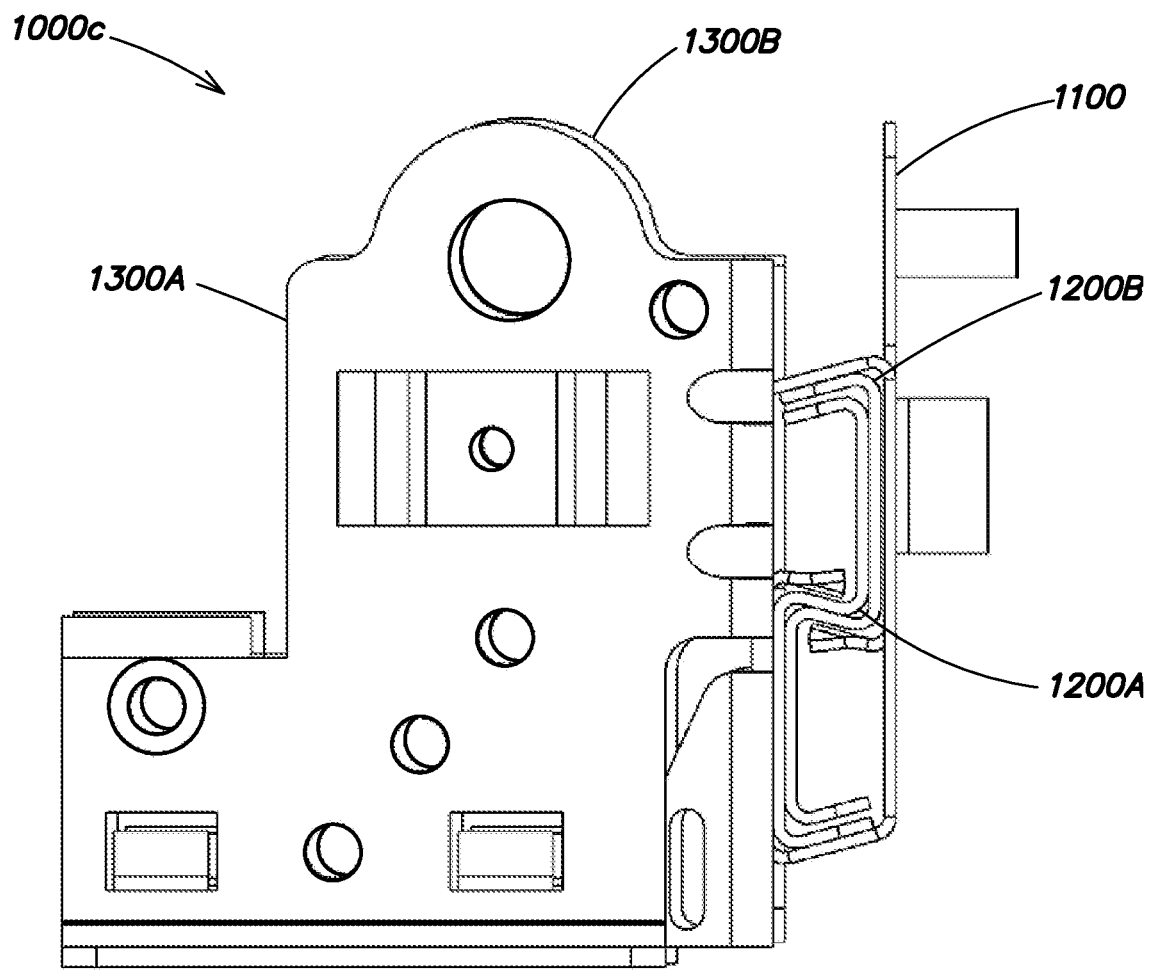
FIG. 11E is a left-side view of the bar hanger assembly shown in FIG. 11A.
Figure 11F:
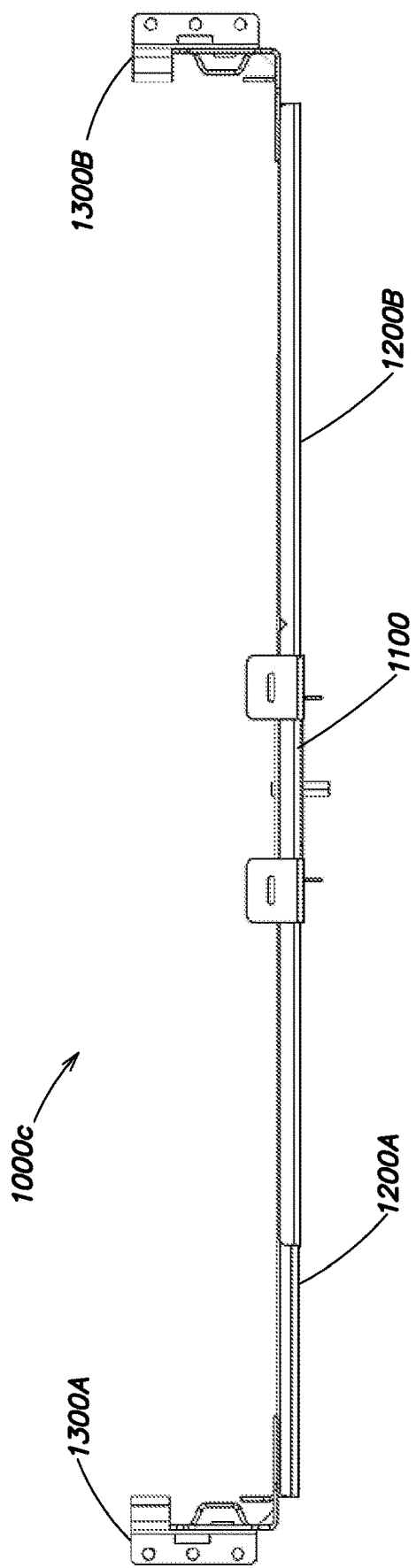
FIG. 11F is a top-side view of the bar hanger assembly shown in FIG. 11A.
Figure 11G:
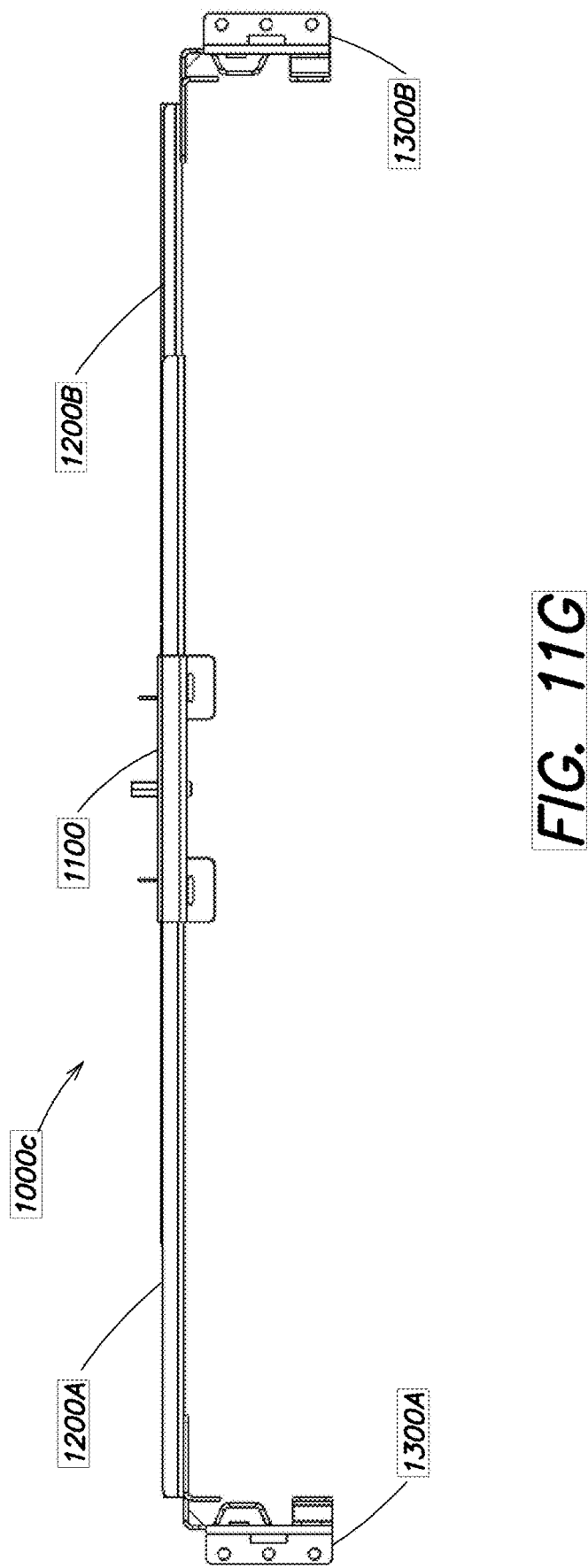
FIG. 11G is a bottom-side view of the bar hanger assembly shown in FIG. 11A.
Figure 11H:
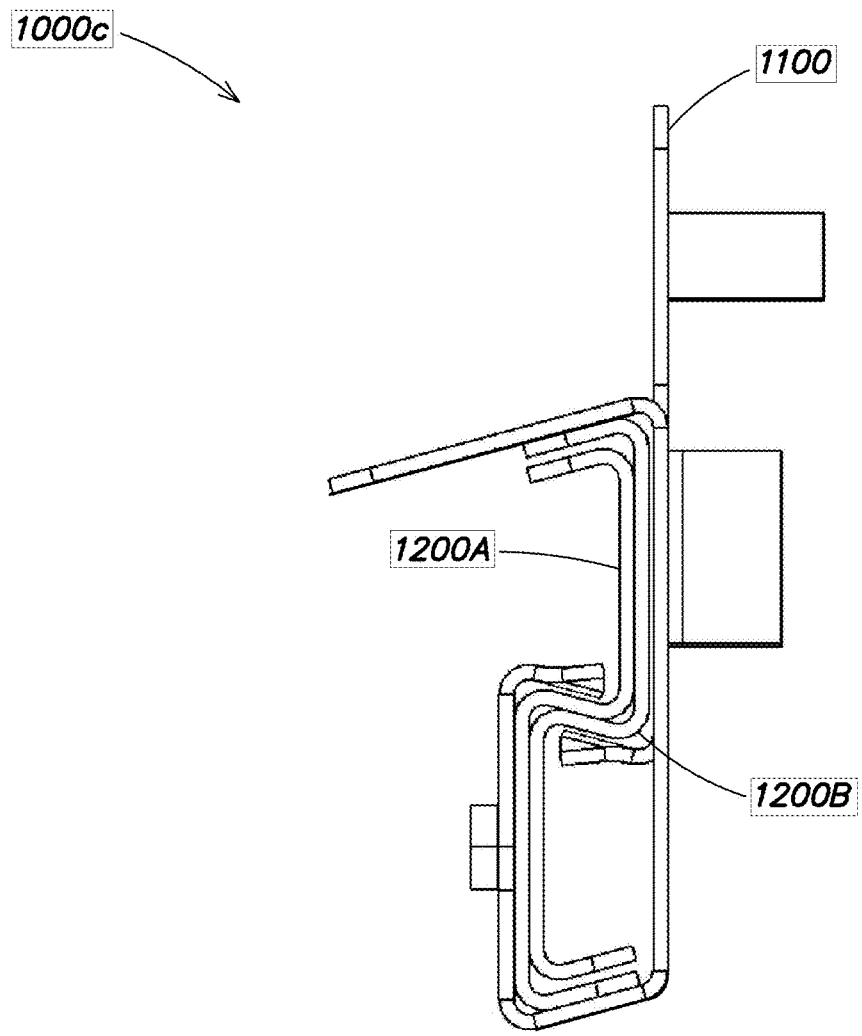
FIG. 11H is a left-side view of the bar hanger assembly shown in FIG. 11A without bar hanger heads.
Figure 11I:
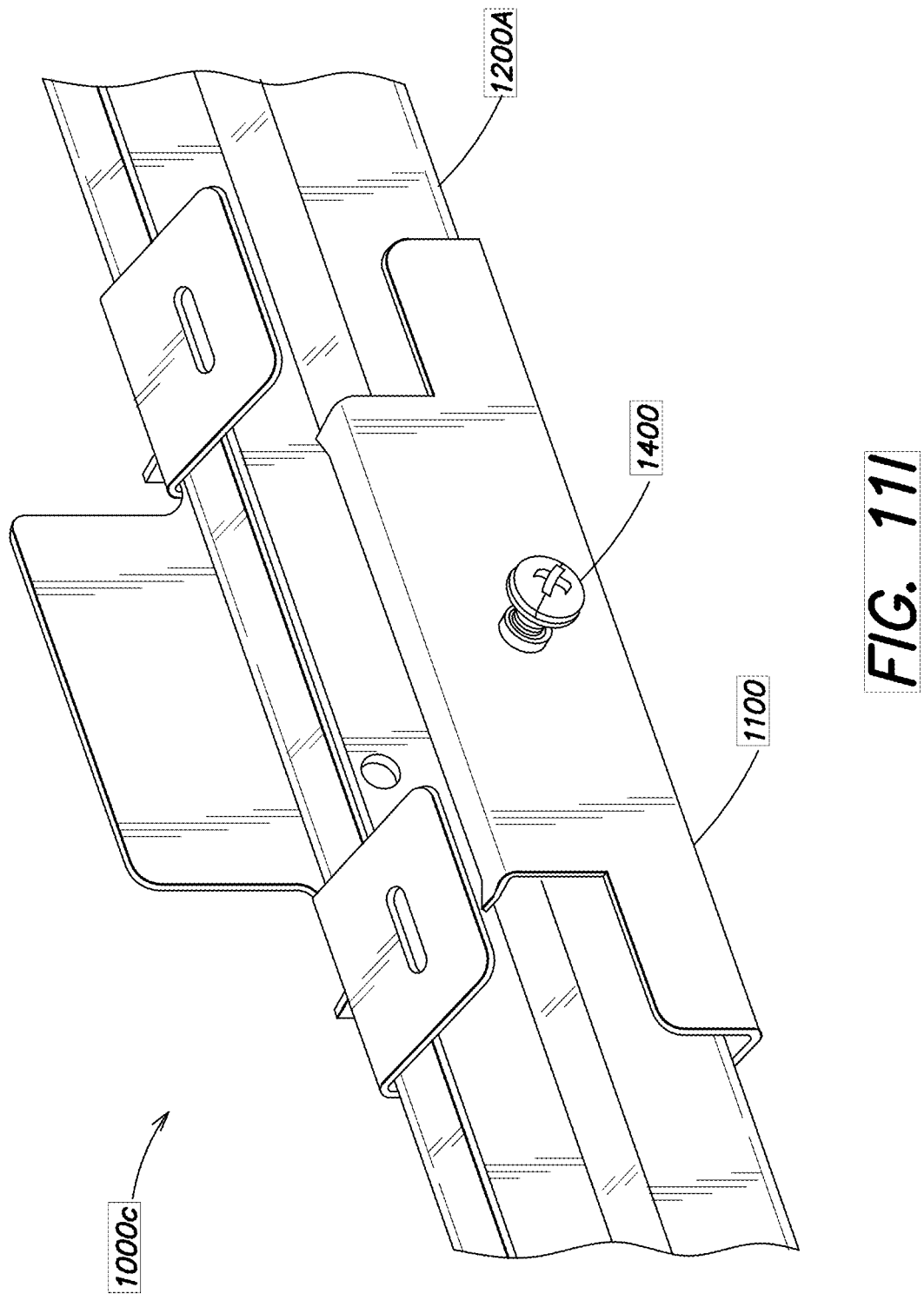
FIG. 11I is a top, front perspective view of the bar hanger assembly shown in FIG. 11A with a fastener.
Figure 12B:
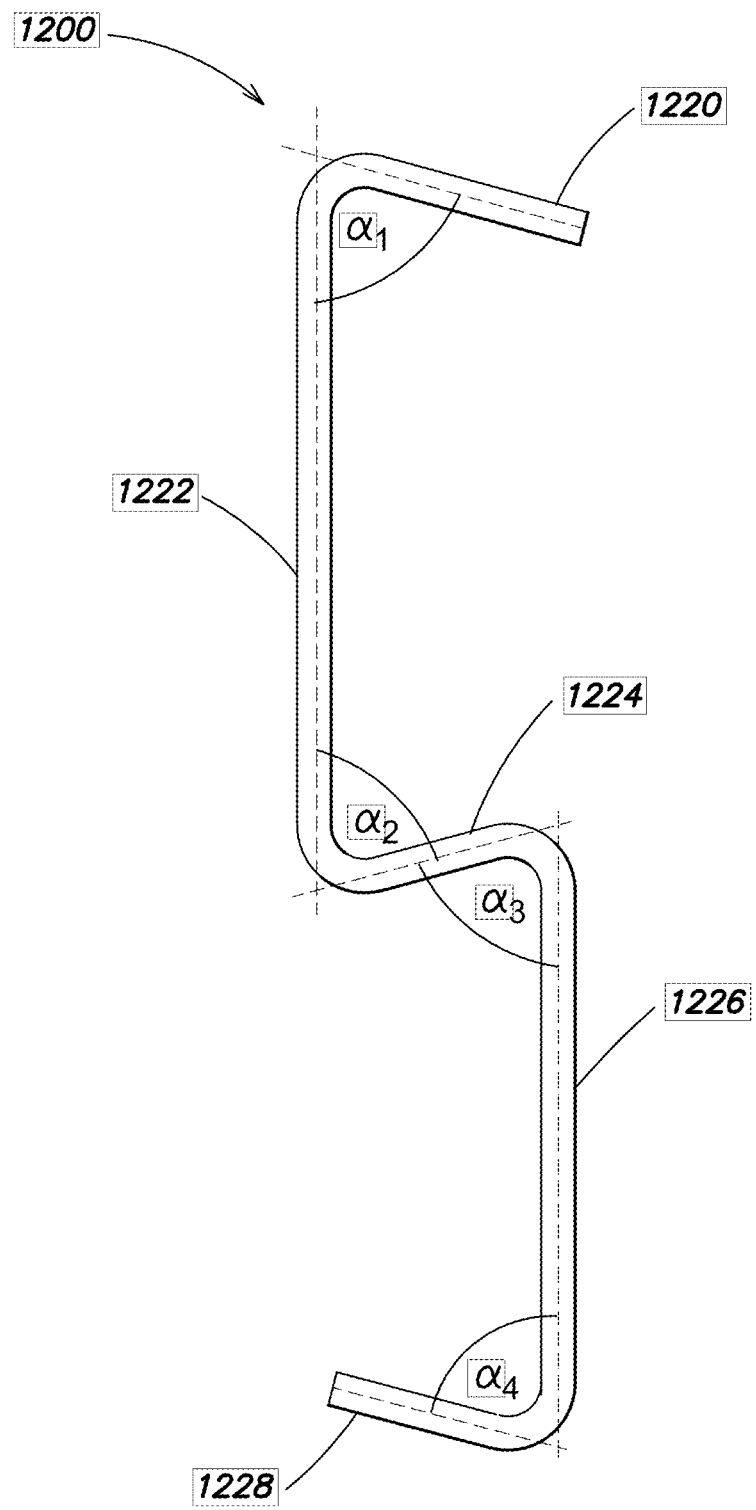
FIG. 12B is a right-side view of the bar hanger shown in FIG. 12A, the left-side view being a mirror image.
Figure 12C:
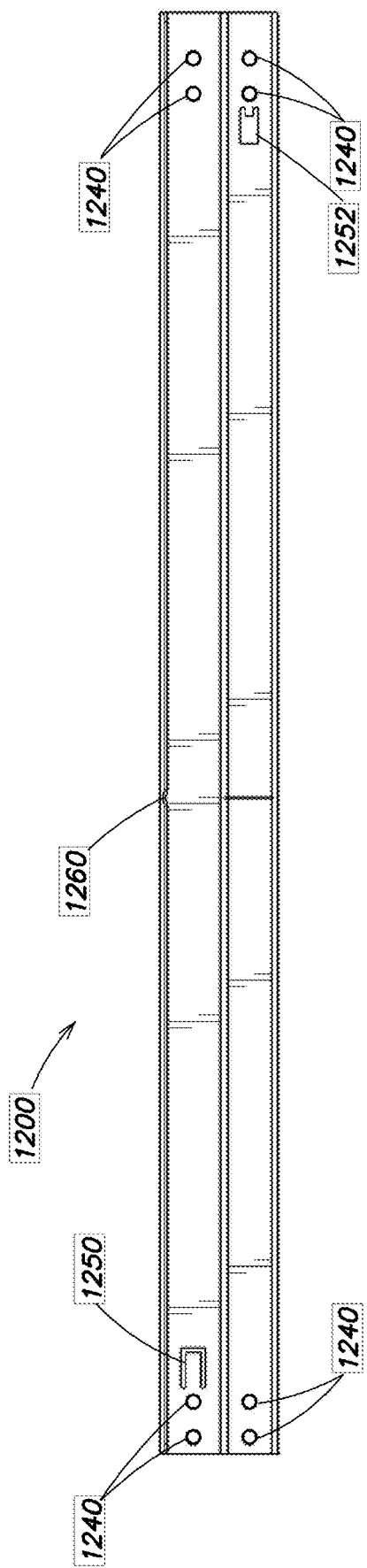
FIG. 12C is a front-side view of the bar hanger shown in FIG. 12A.
Figure 12D:
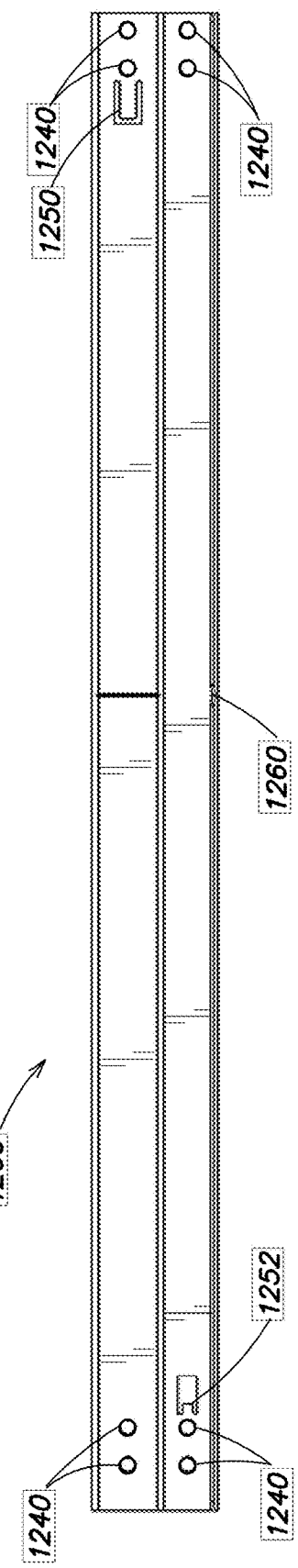
FIG. 12D is a rear-side view of the bar hanger shown in FIG. 12A.
Figure 13A:
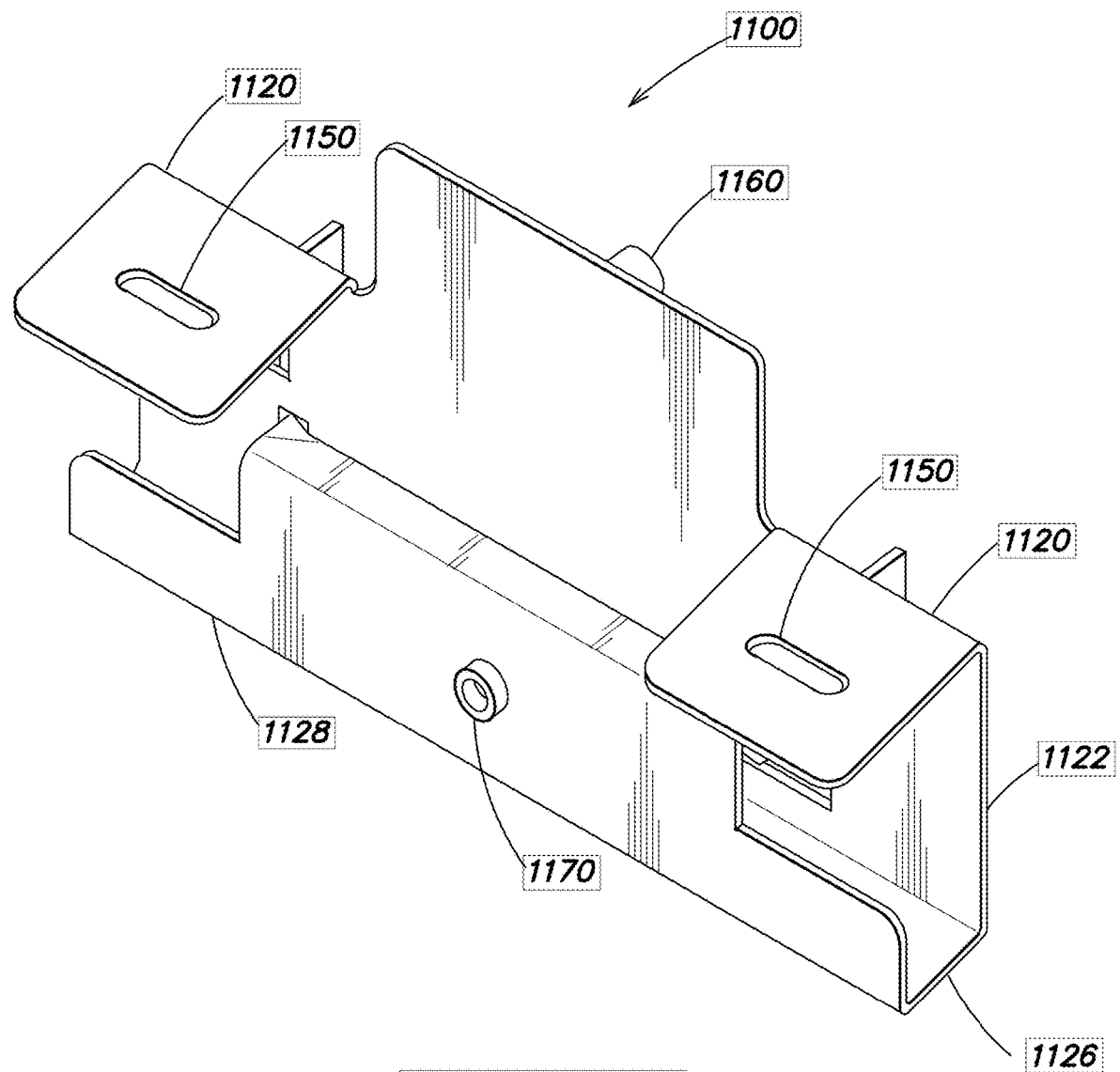
FIG. 13A is a top, front perspective view of a bar hanger holder for the bar hanger assembly with mating telescoping bars shown in FIG. 11A.
Figure 13B:
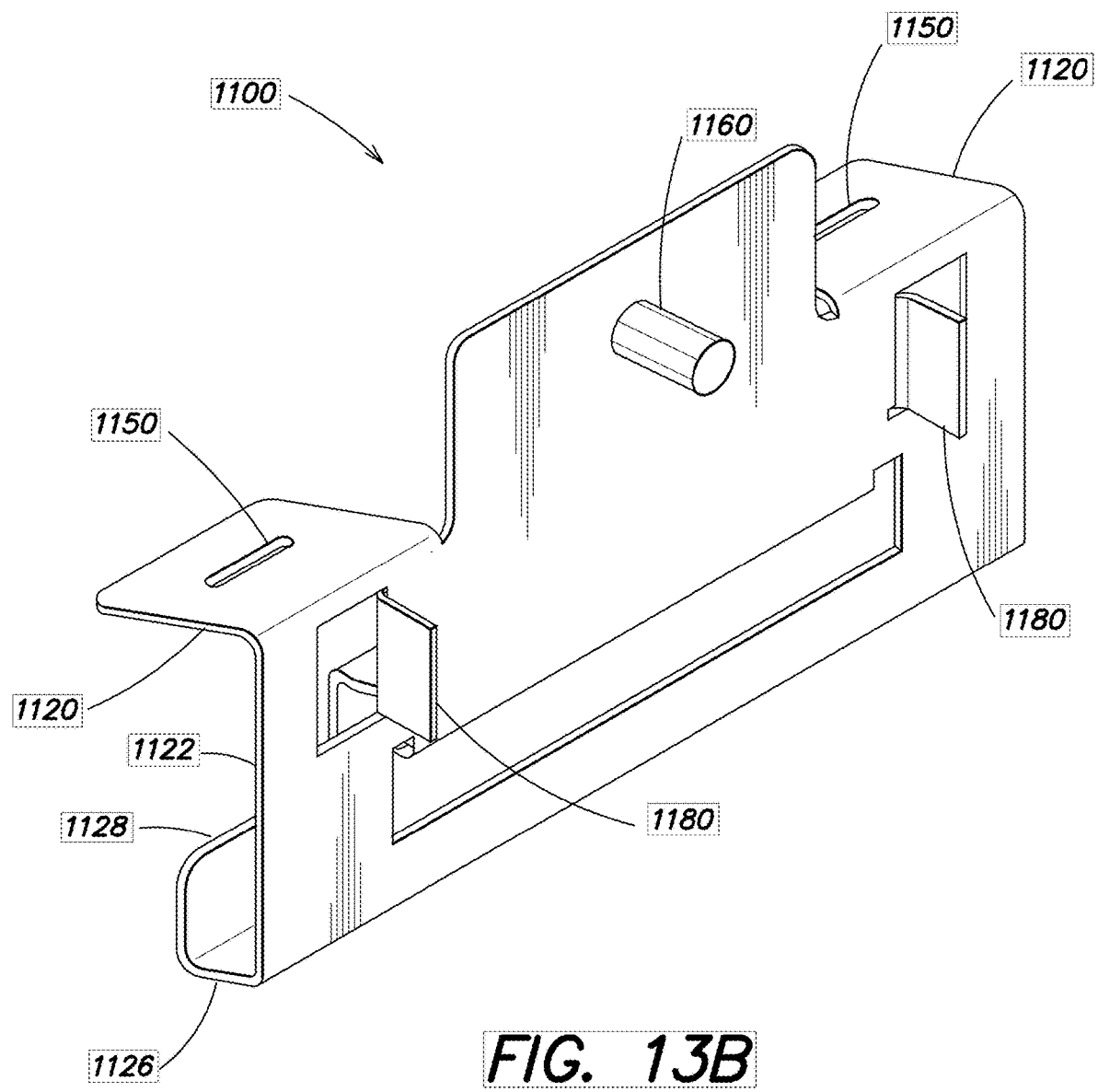
FIG. 13B is a top, rear perspective view of the bar hanger holder shown in FIG. 13A.
Figure 13C:
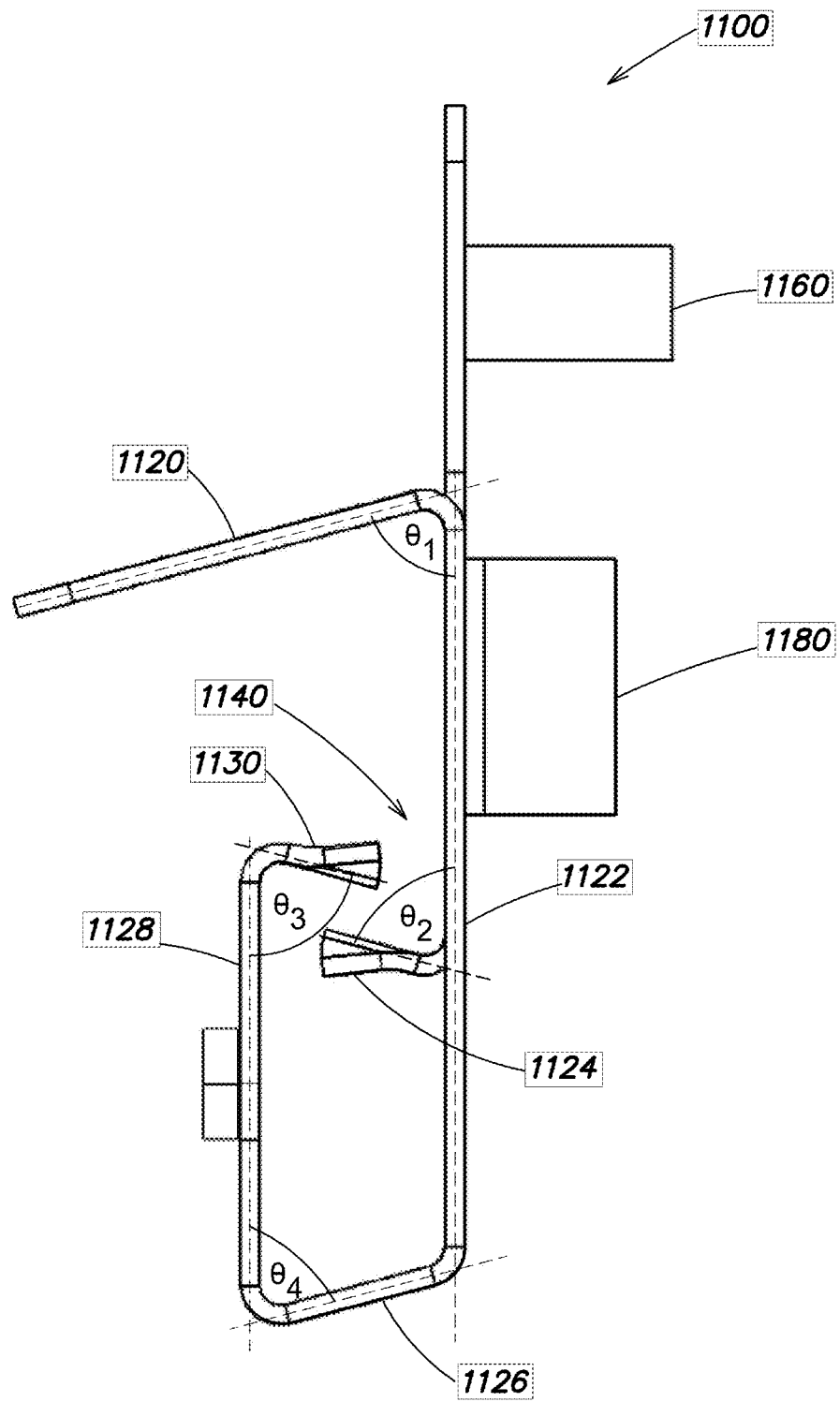
FIG. 13C is a left-side view of the bar hanger holder shown in FIG. 13A, the right-side view being a mirror image.
Figure 13D:
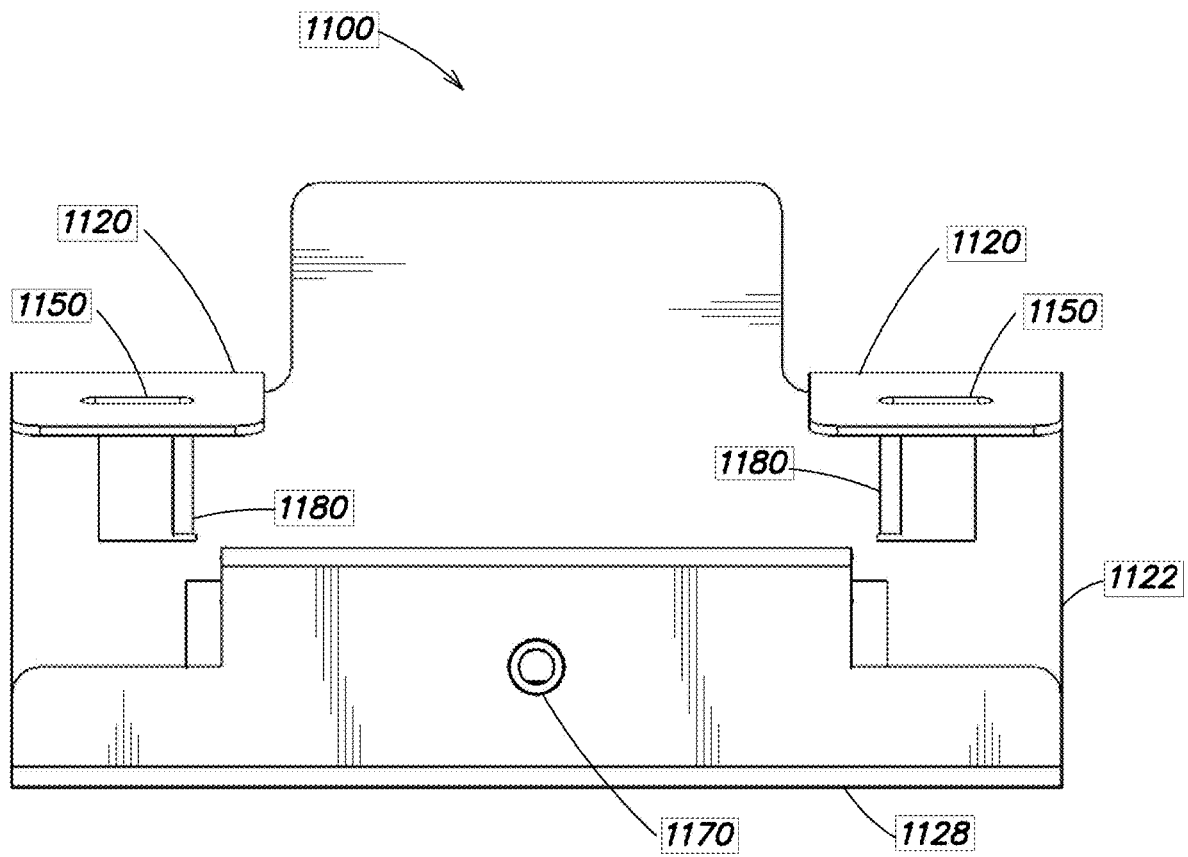
FIG. 13D is a front-side view of the bar hanger holder shown in FIG. 13A.
Figure 13E:
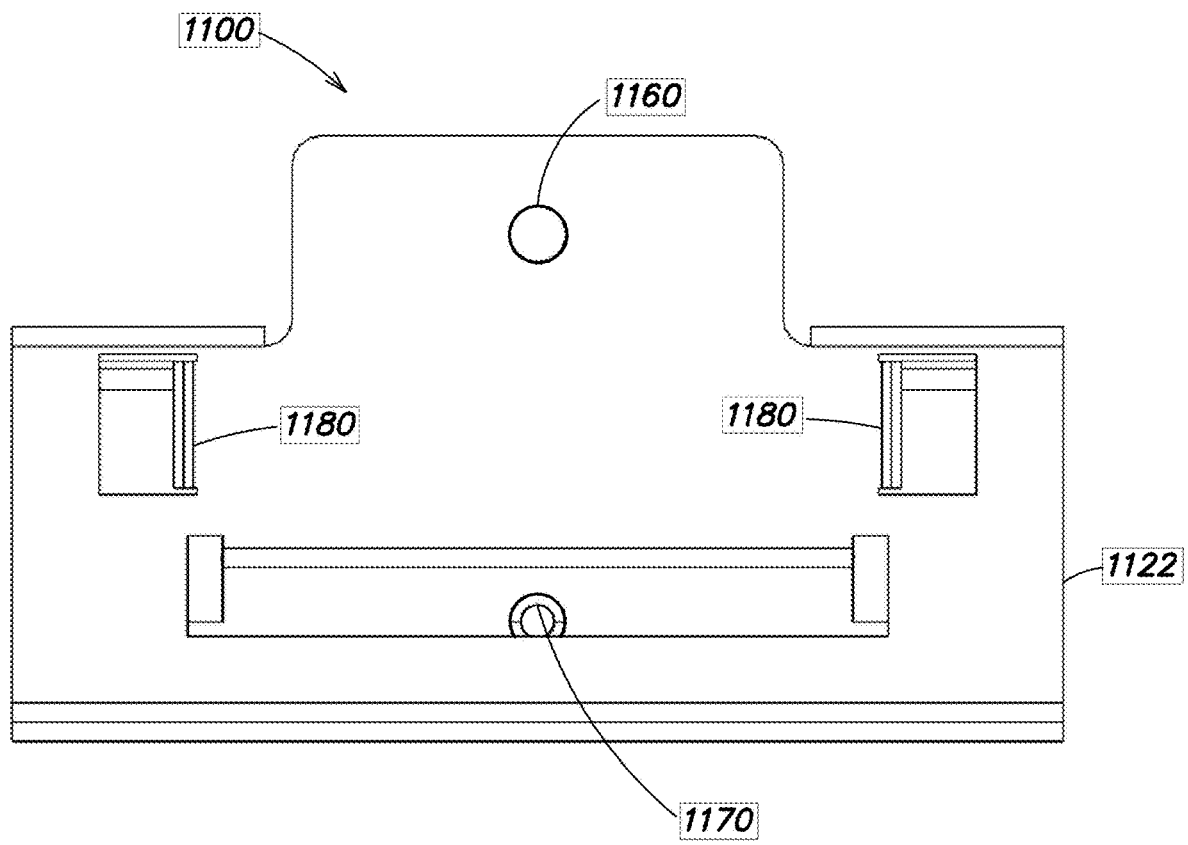
FIG. 13E is a rear-side view of the bar hanger holder shown in FIG. 13A.
Figure 13F:
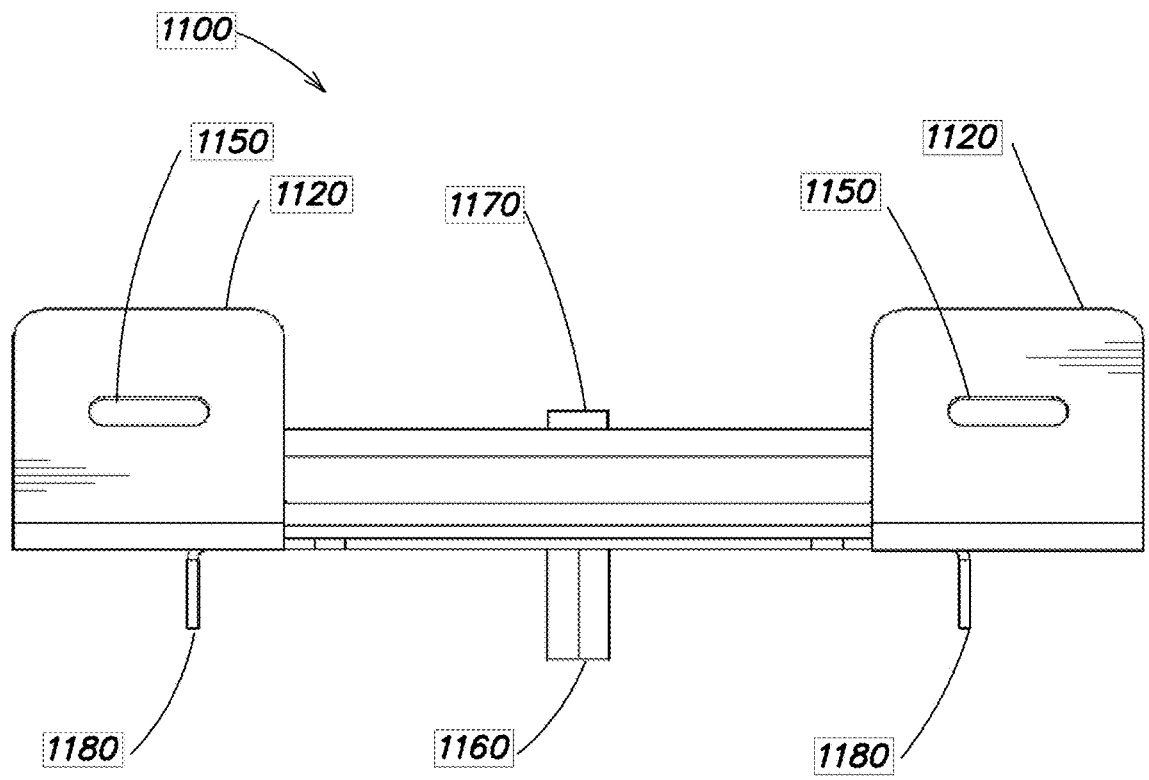
FIG. 13F is a top-side view of the bar hanger holder shown in FIG. 13A.
Figure 13G:
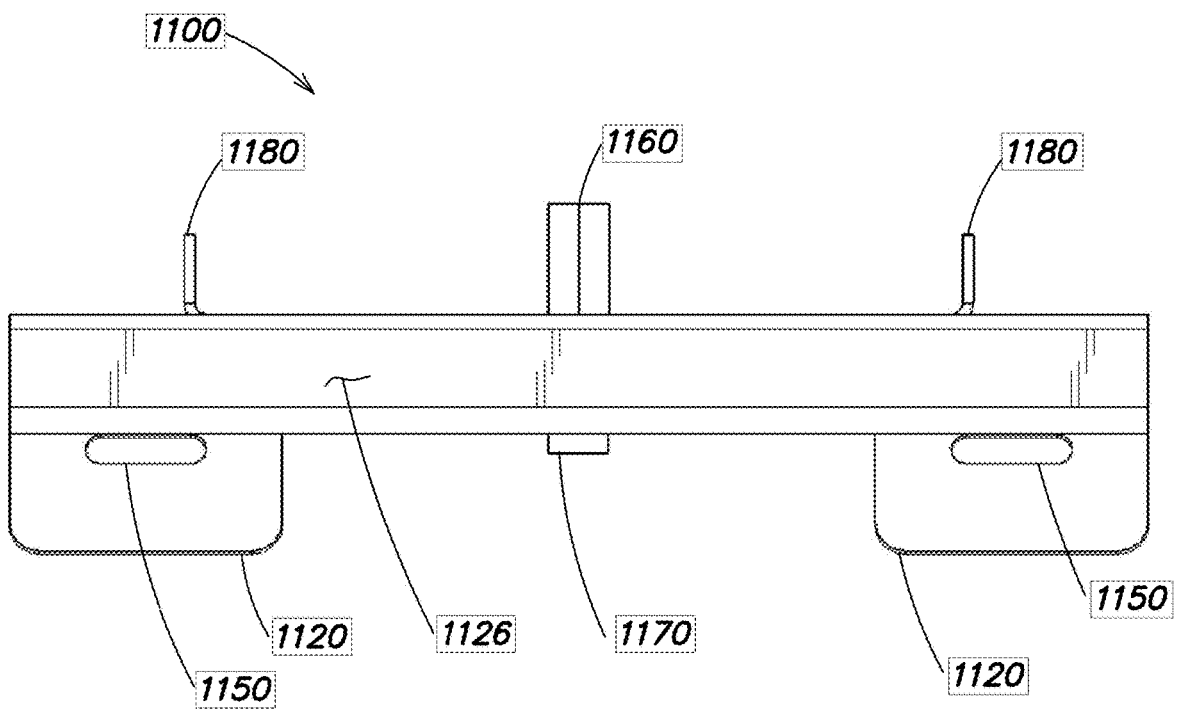
FIG. 13G is a bottom-side view of the bar hanger holder shown in FIG. 13A.
Figure 14A:
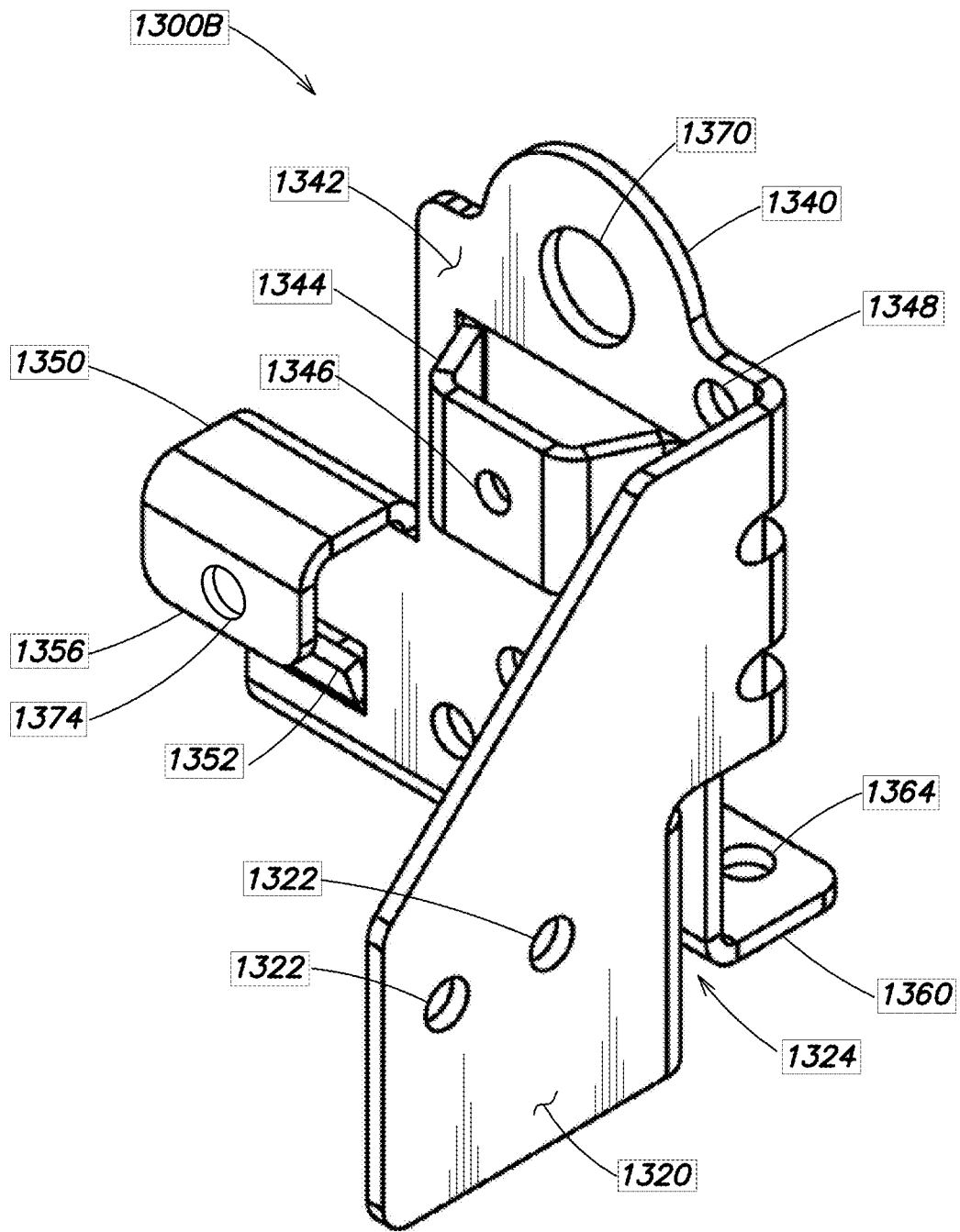
FIG. 14A is a top, rear perspective view of a first bar hanger head for the bar hanger assembly with mating telescoping bars shown in FIG. 11A.
Figure 14B:
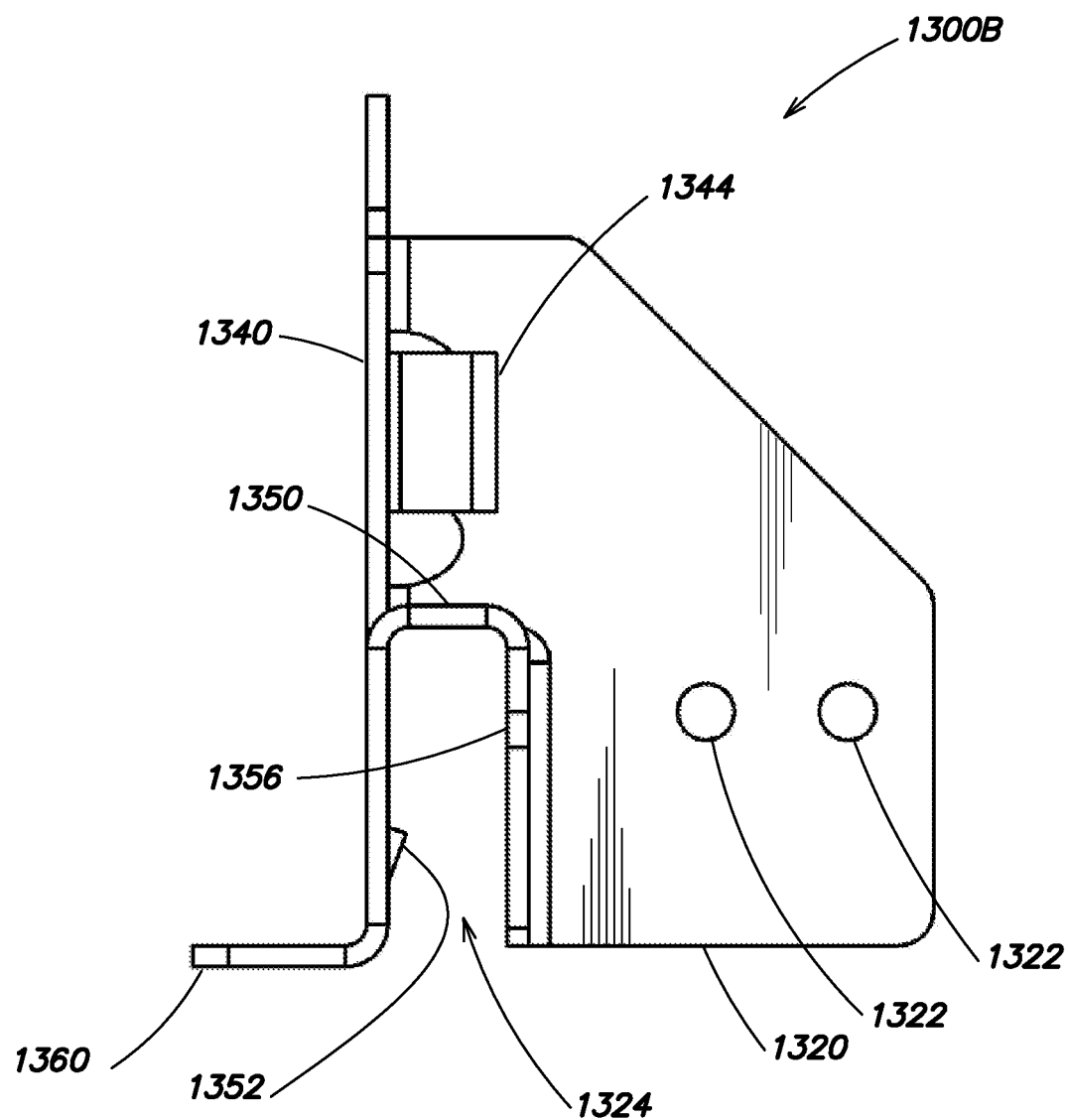
FIG. 14B is a front-side view of the first bar hanger head shown in FIG. 14A.
Figure 14C:
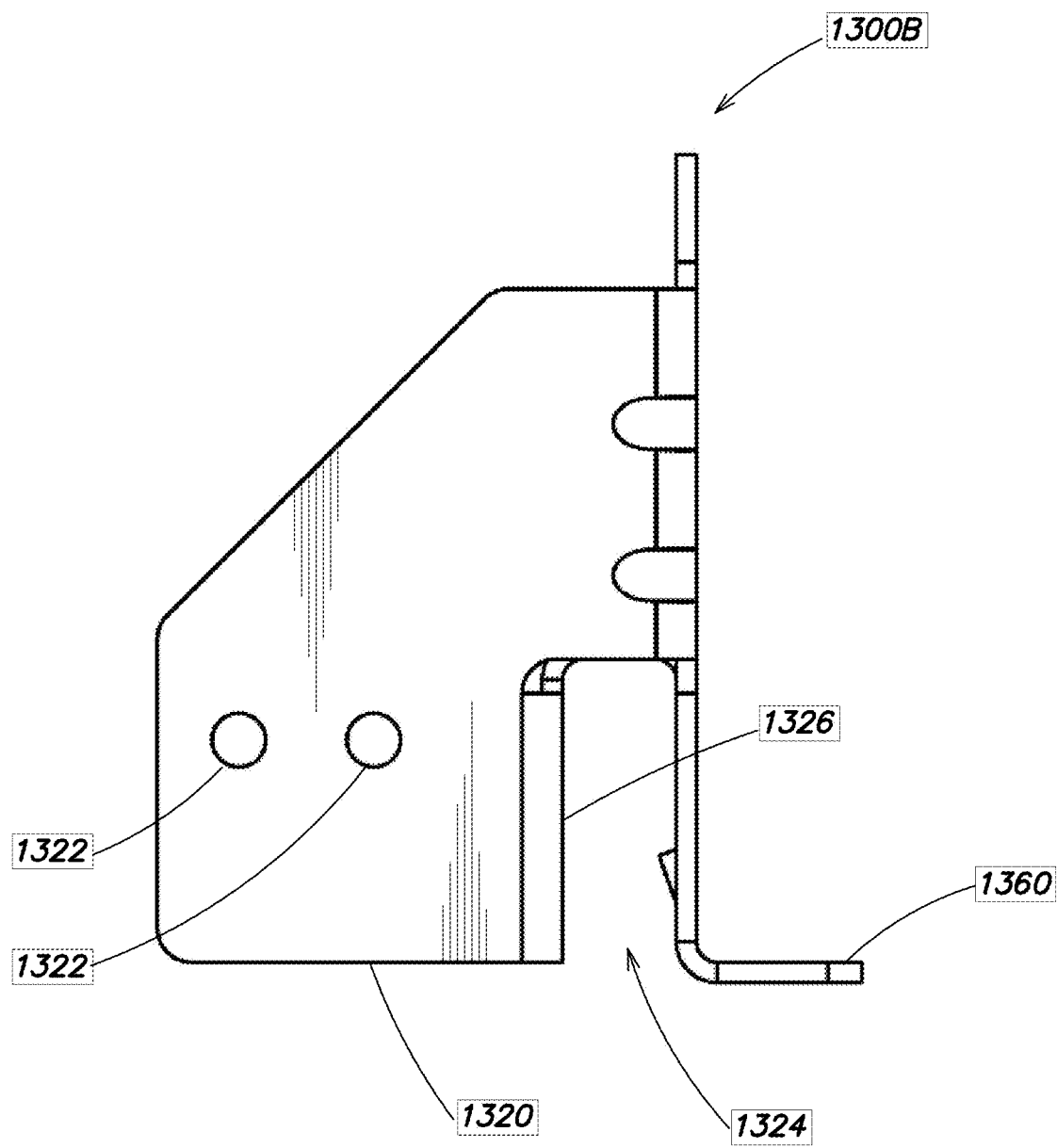
FIG. 14C is a rear-side view of the first bar hanger head shown in FIG. 14A.
Figure 14D:
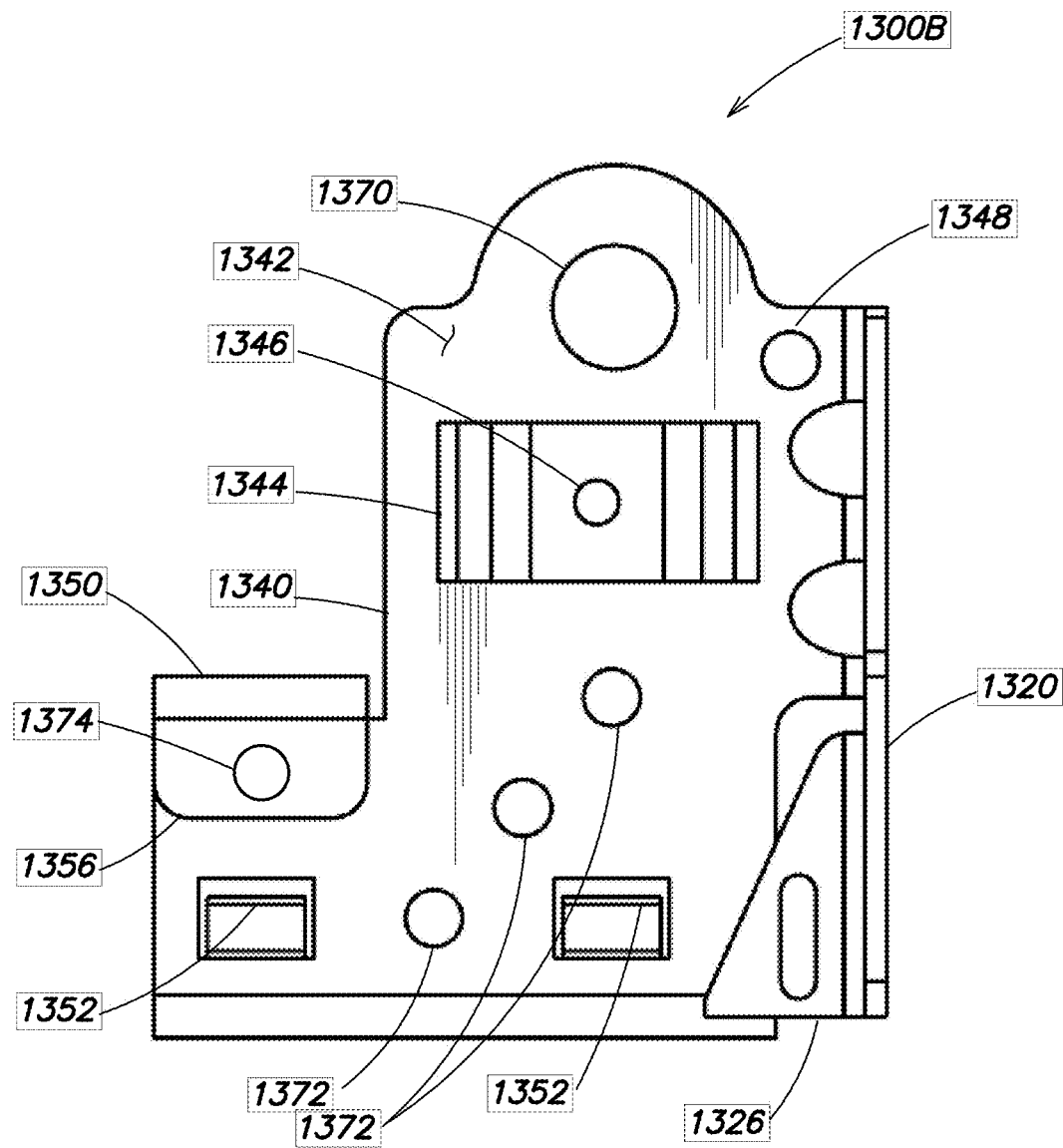
FIG. 14D is a left-side view of the first bar hanger head shown in FIG. 14A.
Figure 14E:
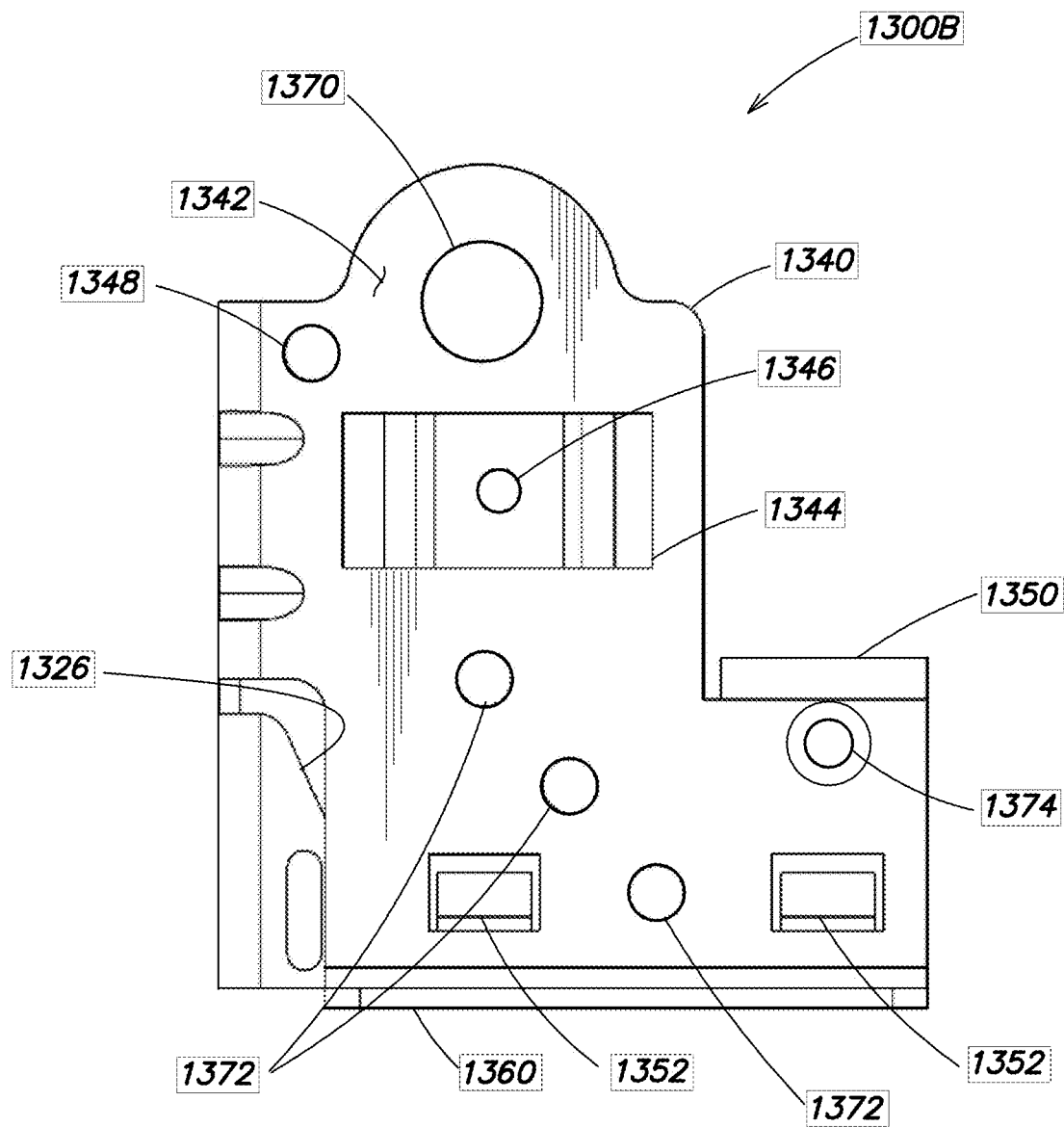
FIG. 14E is a right-side view of the first bar hanger head shown in FIG. 14A.
Figure 14F:
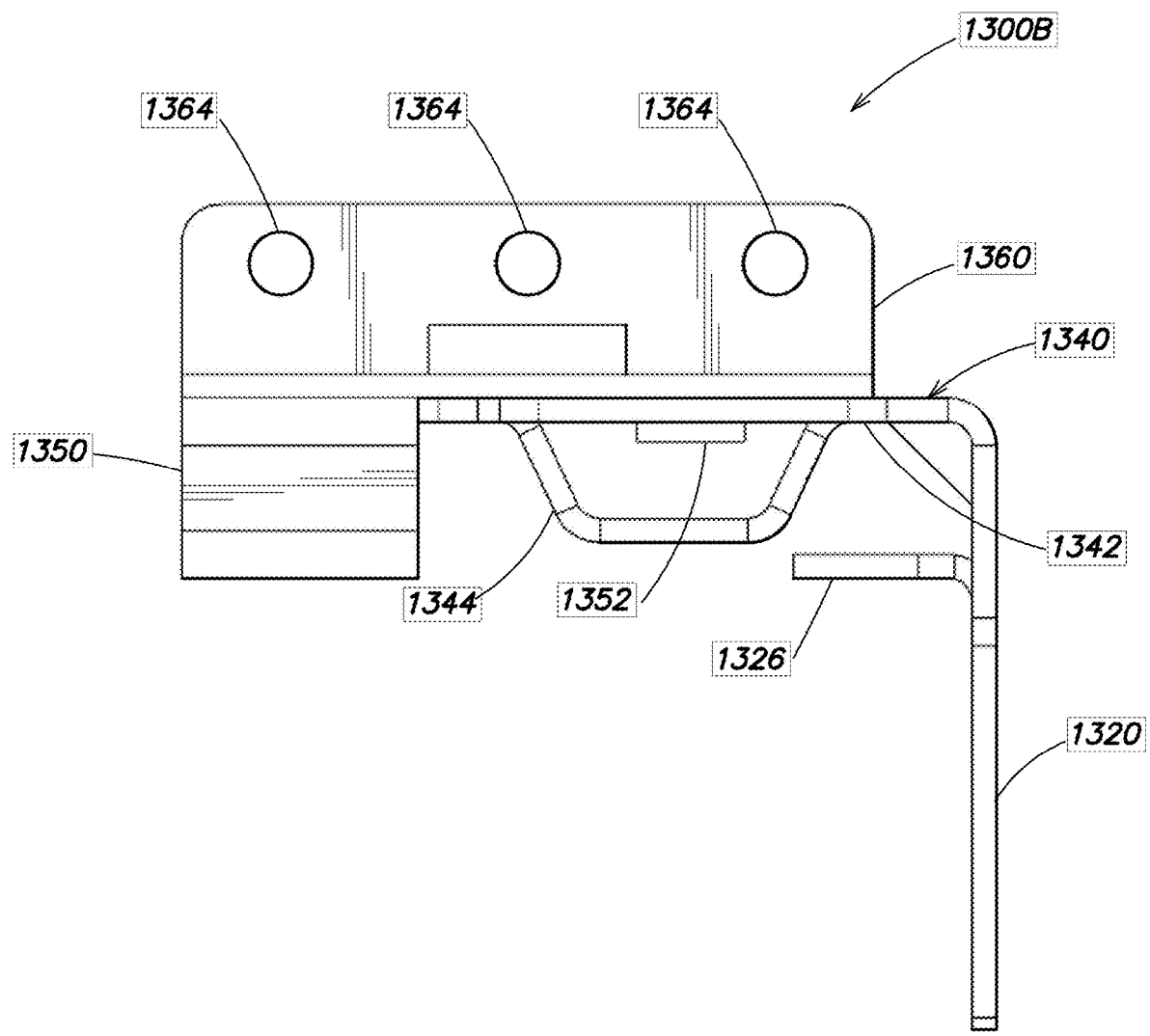
FIG. 14F is a top-side view of the first bar hanger head shown in FIG. 14A.
Figure 14G:
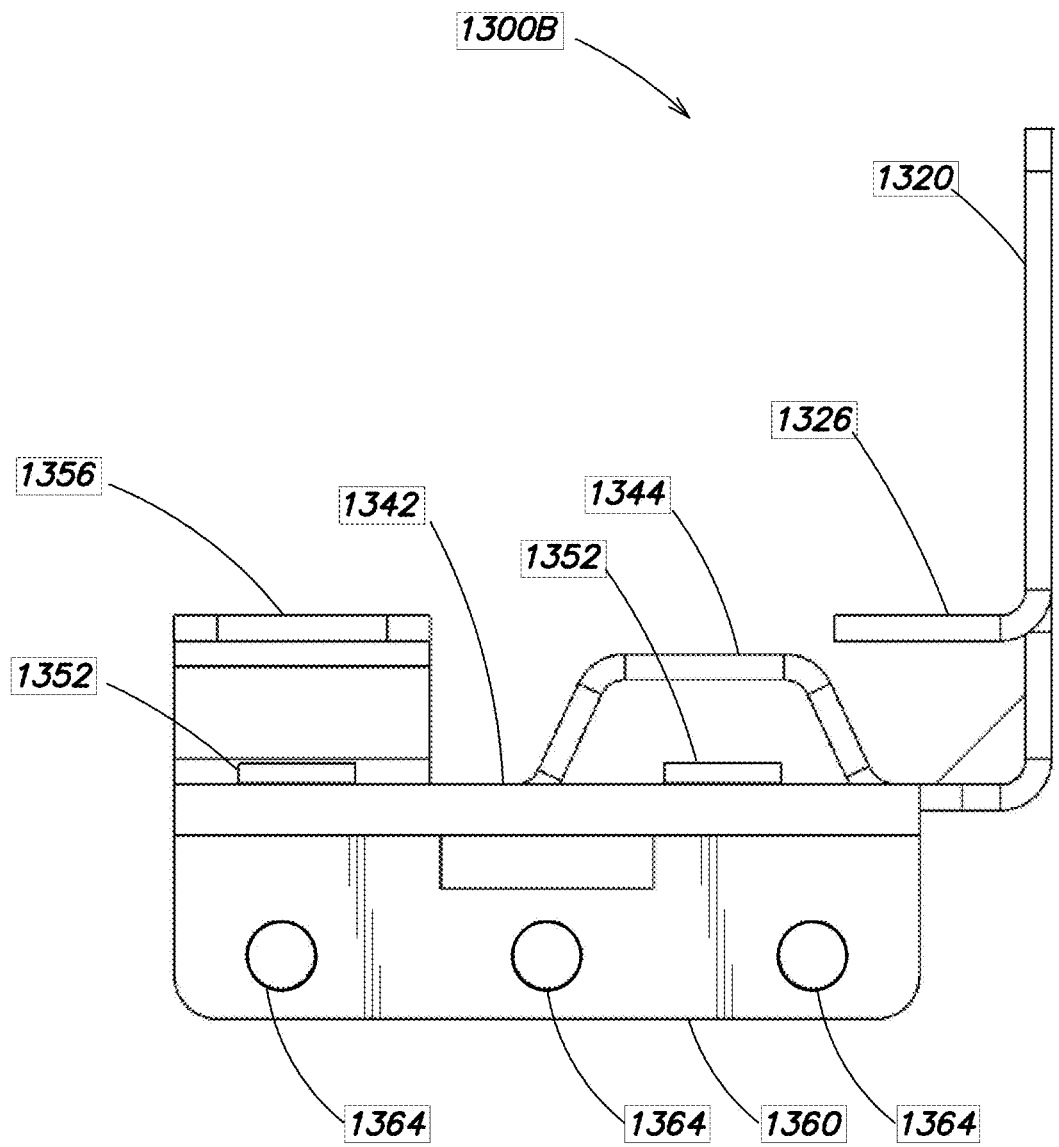
FIG. 14G is a bottom-side view of the first bar hanger head shown in FIG. 14A.
Figure 15A:
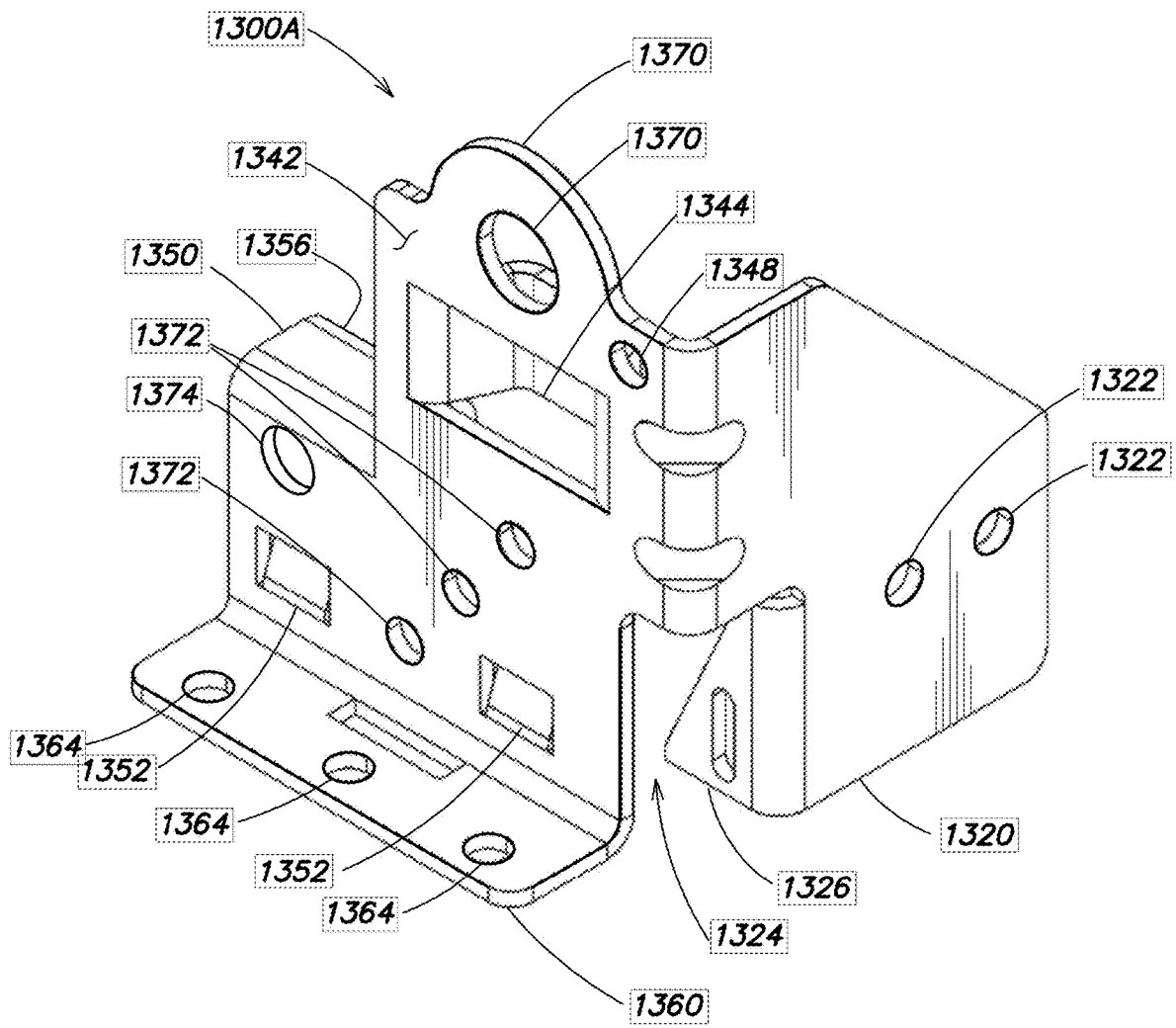
FIG. 15A is a top, rear perspective view of a second bar hanger head for the bar hanger assembly with mating telescoping bars shown in FIG. 11A.
Figure 15B:
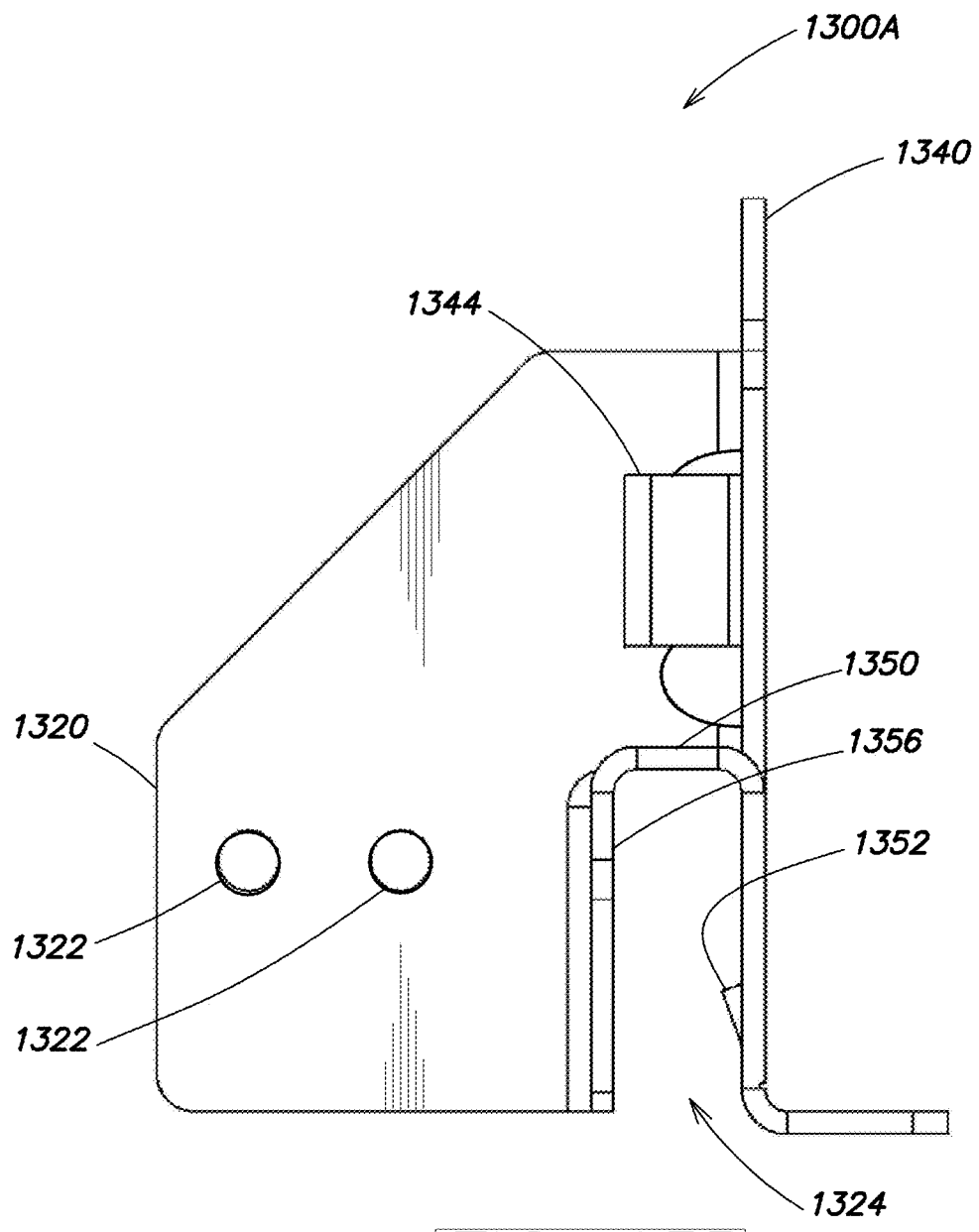
FIG. 15B is a front-side view of the second bar hanger head shown in FIG. 15A.
Figure 15C:
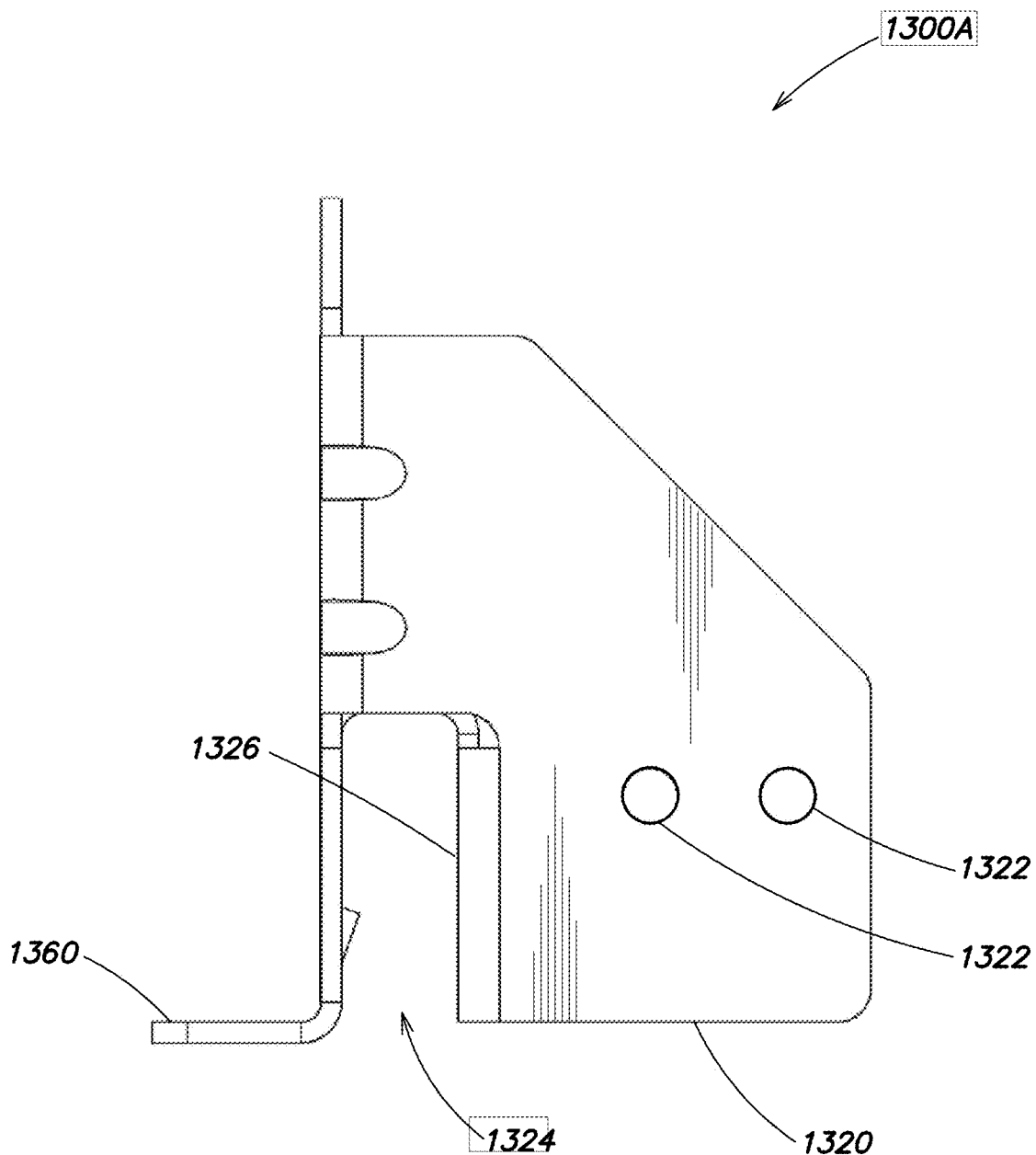
FIG. 15C is a rear-side view of the second bar hanger head shown in FIG. 15A.
Figure 15D:
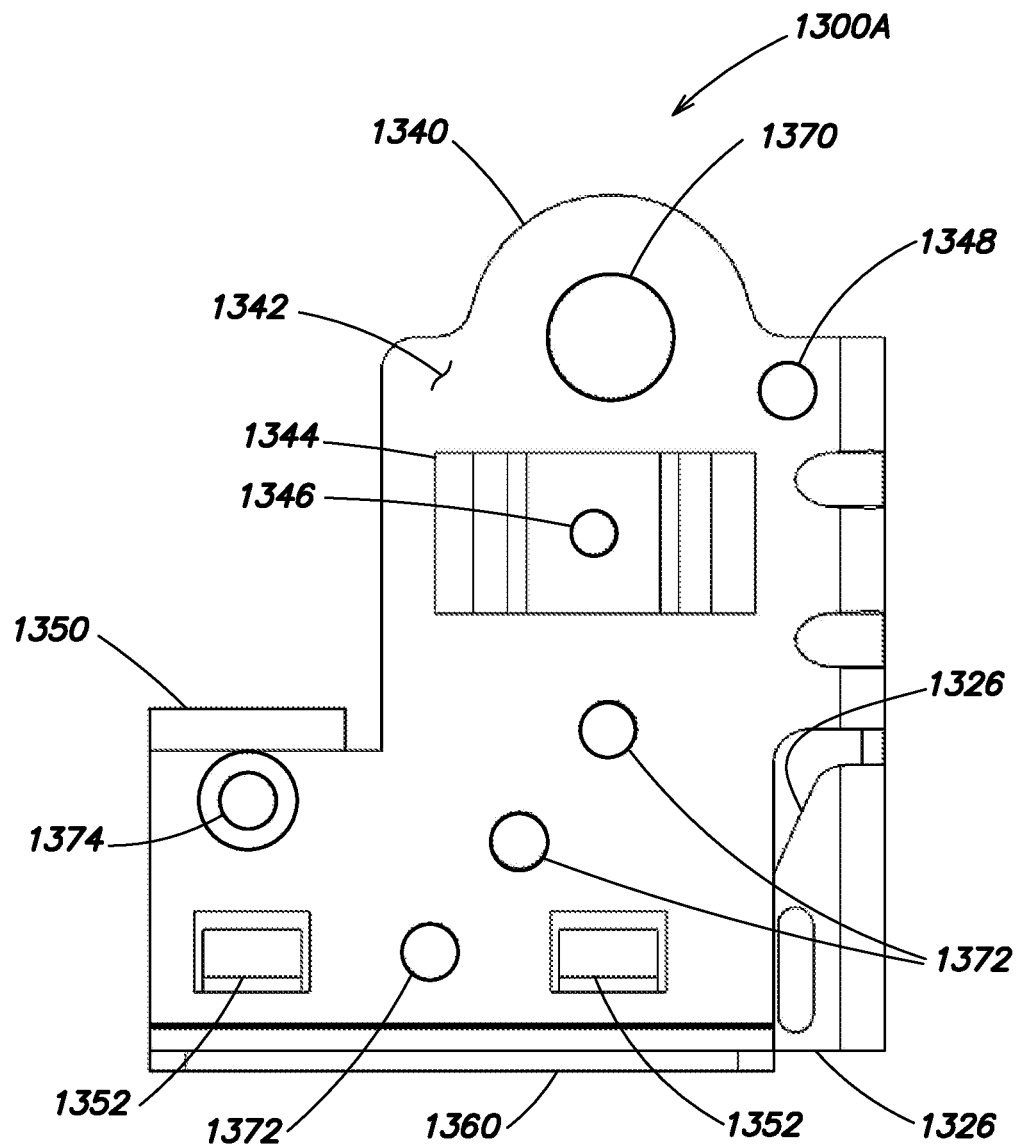
FIG. 15D is a left-side view of the second bar hanger head shown in FIG. 15A.
Figure 15E:
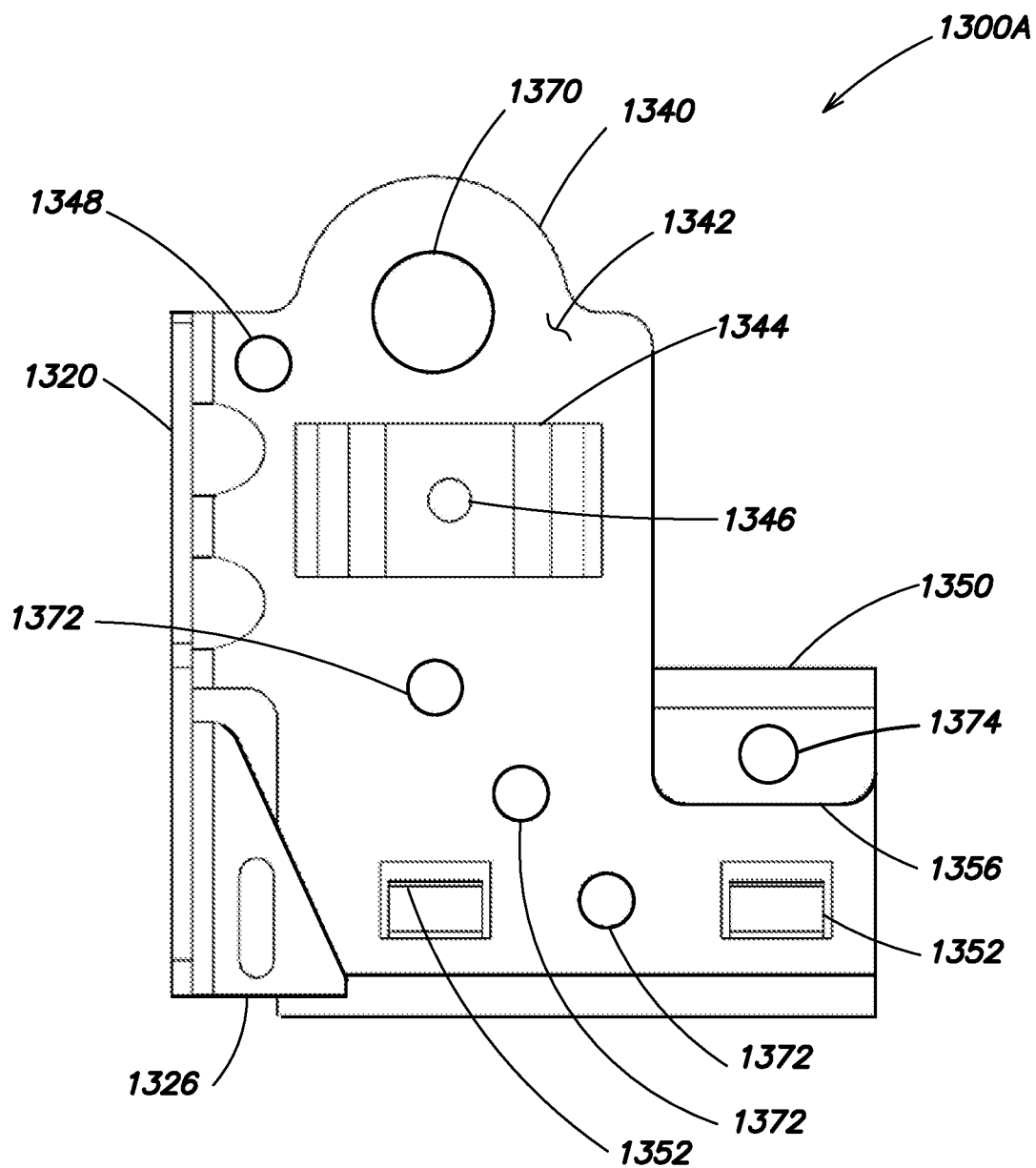
FIG. 15E is a right-side view of the second bar hanger head shown in FIG. 15A.
Figure 15F:
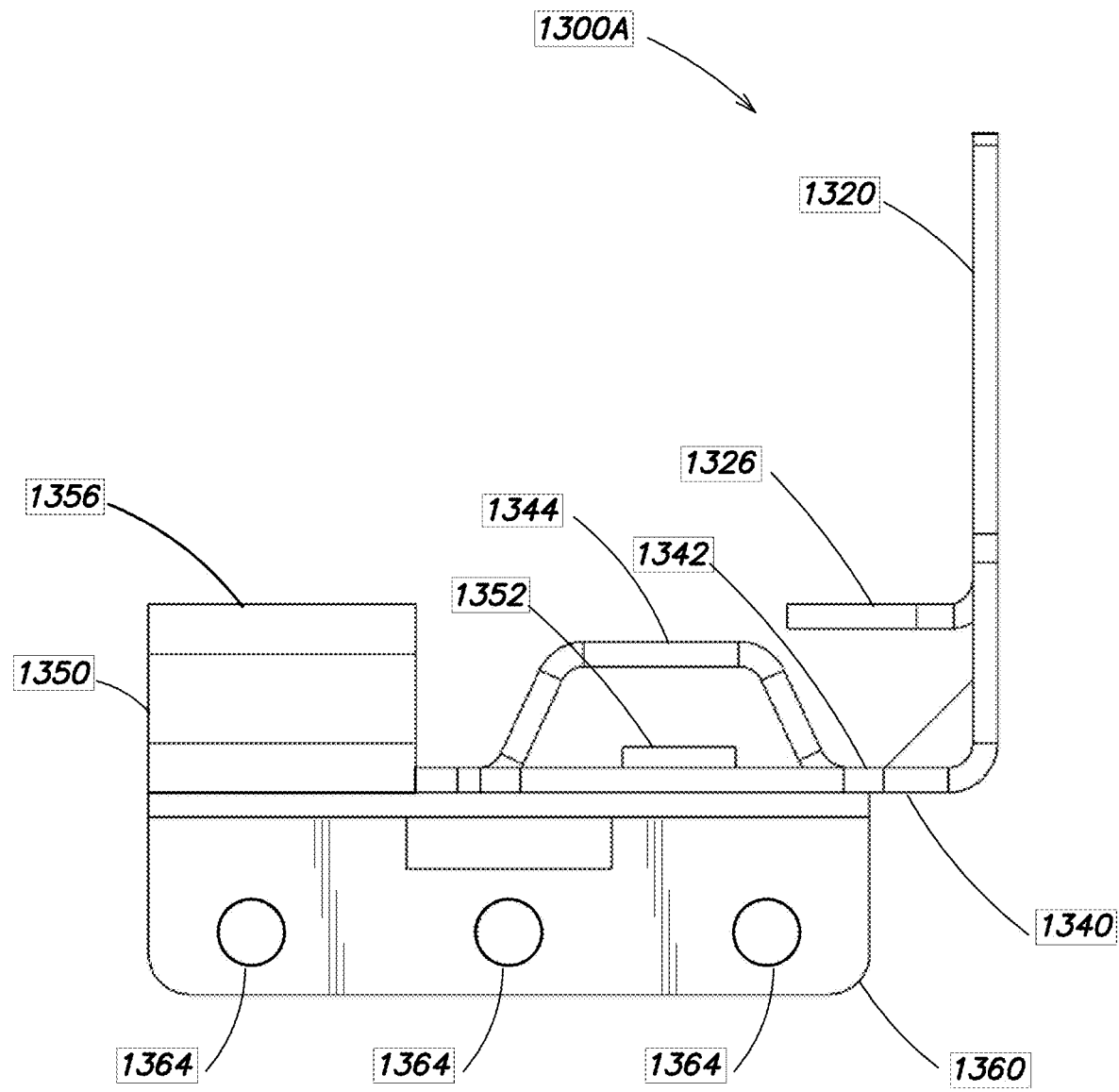
FIG. 15F is a top-side view of the second bar hanger head shown in FIG. 15A.
Figure 15G:
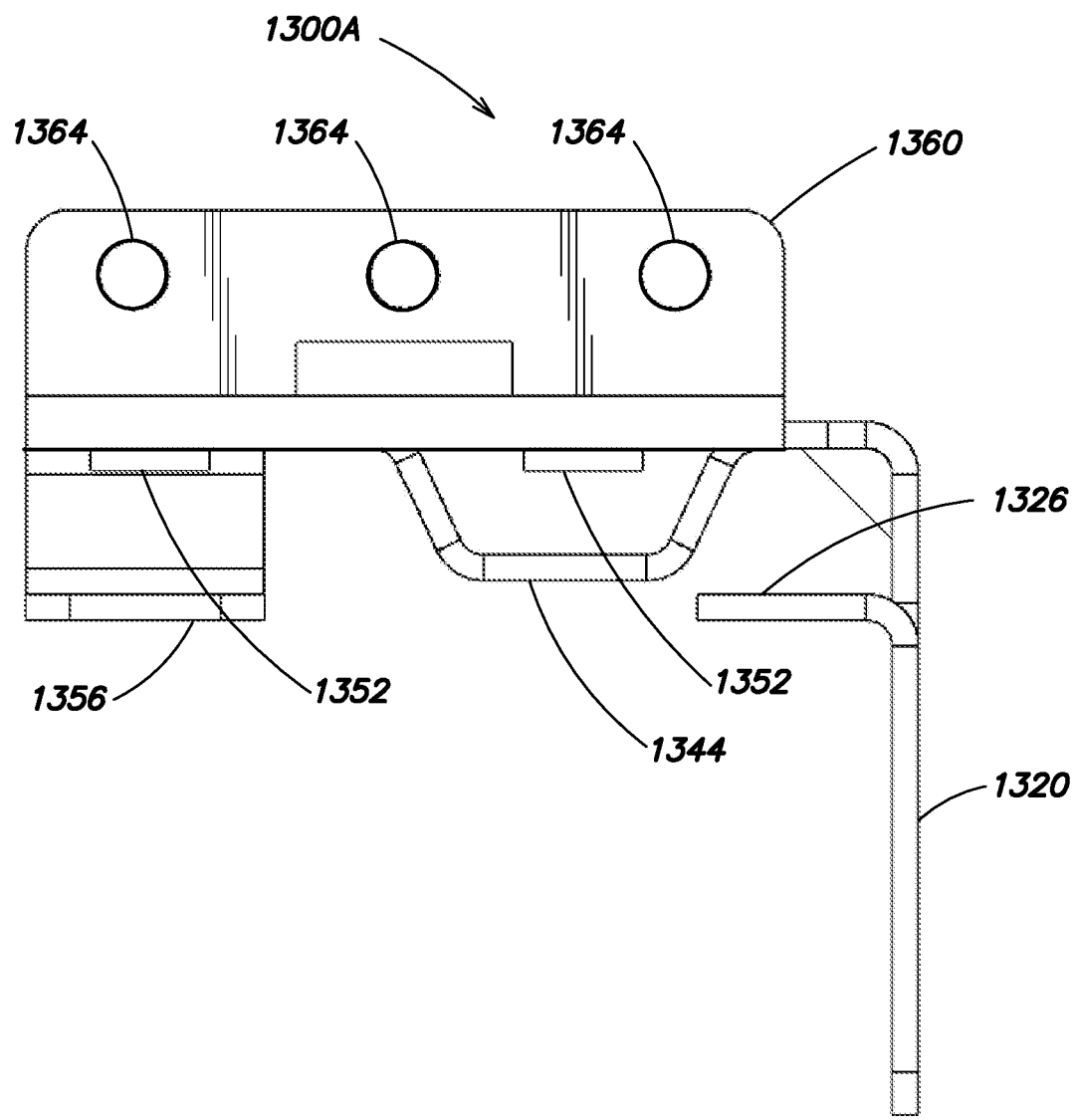
FIG. 15G is a bottom-side view of the second bar hanger head shown in FIG. 15A.

FIGS. 11A-11I show another exemplary bar hanger assembly 1000c. As shown, the bar hanger assembly 1000c may include similar components as the bar hanger assemblies 1000a and 1000b. For example, the bar hanger assembly 1000b may include a bar hanger holder 1100 to mechanically couple the bar hanger assembly 1000b to a housing and to mechanically guide the bar hangers 1200A and 1200B. The bar hangers 1200A and 1200B may be telescopically slidable with respect to one another and the bar hanger holder 1100. The bar hangers 1200A and 1200B may each include a bar hanger head 1300A and 1300B, respectively, to couple the bar hanger assembly 1000b to support structures in the environment. FIG. 11I shows a fastener 1400 may be used to lock the positions of the bar hanger holder 1100 and the bar hangers 1200A and 1200B. It should be appreciated the various features, structures, and materials described with respect to the bar hanger assembly 1000a depicted in FIGS. 2A-2C and/or bar hanger assembly 1000b depicted in FIGS. 6A-6H may also be applied to the bar hanger assembly 1000c shown in FIGS. 11A-11I.

FIGS. 12A-12F show several views of the bar hanger 1200 in the bar hanger assembly 1000c. As shown, the bar hanger 1200 may be substantially similar to the bar hanger 1200 shown in FIGS. 4A-4D and 7A-7F.

FIGS. 13A-13G show several views of the bar hanger holder 1100 in the bar hanger assembly 1000c. As shown, the bar hanger holder 1100 may be substantially similar to the bar hanger 1200 shown in 7A-7G. For instance, the bar hanger holder 1100 includes openings 1150 on the top segment 1120, an opening 1170 as the locking mechanism for the fastener 1400, a stud 1160 for coupling to a housing, and flanges 1180 to prevent rotation of the bar hanger assembly 1000c when coupling the bar hanger holder 1100 to the housing.

FIGS. 14A-14G show several views of the bar hanger head 1300B in the bar hanger assembly 1000c. As shown, the bar hanger head 1300B may be similar to the bar hanger heads 1300B shown in FIGS. 5 and 9A-10G. The bar hanger head 1300B may further include an opening 1374 that intersects the tab 1356 on the primary mounting flange 1340. The opening 1374 may be used for a self-drilling fastener to couple the bar hanger head 1300B to a T-bar. FIGS. 15A-15G show several views of the bar hanger head 1300A in the bar hanger assembly 1000c. Similar to the bar hanger heads previous shown, the bar hanger head 1300A may also be mirror symmetric with the bar hanger head 1300B. The bar hanger head 1300A may thus include the same features to couple the bar hanger assembly 1000c to the various support structures described above.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A bar hanger assembly, comprising:
    a first bar hanger having an S-shaped cross-section, the S-shaped cross-section comprising a plurality of straight segments, the plurality of straight segments comprising:
        a top segment;
        a first segment directly coupled to the top segment and rotated with respect to the top segment by a first offset angle;
        a middle segment directly coupled to the first segment and rotated with respect to the first segment by a second offset angle;
        a second segment directly coupled to the middle segment and rotated with respect to the middle segment by a third offset angle; and
        a bottom segment directly coupled to the second segment and rotated with respect to the second segment by a fourth offset angle,
    wherein each of the first, second, third, and fourth offset angles is an acute angle.

2. The bar hanger assembly of claim 1, wherein each of the first, second, third, and fourth offset angles is between 45 degrees and 90 degrees.

3. The bar hanger assembly of claim 2, wherein each of the first, second, third, and fourth offset angles is equal to 75 degrees.

4. The bar hanger assembly of claim 1, wherein the top segment is in parallel alignment with the bottom segment.

5. The bar hanger assembly of claim 1, wherein the second offset angle is equal to the third offset angle.

6. The bar hanger assembly of claim 1, wherein the top segment, the first segment, and the middle segment are aligned neither parallel nor orthogonal with respect to one another.

7. The bar hanger assembly of claim 1, further comprising:
    a second bar hanger that is identical with the first bar hanger and slidably coupled to the first bar hanger along a first axis such that the first segment of the second bar hanger is disposed proximate to the second segment of the first bar hanger,
    wherein:
    when a first portion of the first bar hanger corresponding to the first segment of the first bar hanger physically contacts a second portion of the second bar hanger corresponding to the second segment of the second bar hanger, a first force is generated between the first and second portions, the first force being oriented along a second axis that is orthogonal to the first axis; and
    when a third portion of the first bar hanger corresponding to the middle segment of the first bar hanger physically contacts a fourth portion of the second bar hanger corresponding to the middle segment of the second bar hanger, a second force is generated between the third and fourth portions, the second force being oriented along a third axis that is orthogonal to the first axis and not orthogonal to the second axis.

8. The bar hanger assembly of claim 7, wherein:
a frictional force is generated between the first bar hanger and the second bar hanger due to physical contact between the first bar hanger and the second bar hanger; and
when no external force is applied to the bar hanger assembly and the bar hanger assembly is tilted such that the first axis is not horizontal, the frictional force prevents the second bar hanger from sliding with respect to the first bar hanger.

9. The bar hanger assembly of claim 7, further comprising:
a bar hanger holder, slidably coupled to at least one of the first bar hanger or the second bar hanger, to couple the bar hanger assembly to a housing,
wherein the housing is one of a can housing or a junction box.

10. The bar hanger assembly of claim 9, wherein the bar hanger holder is not integrally formed with the housing.

11. The bar hanger assembly of claim 1, wherein:
the first bar hanger has a first end and a second end opposite the first end;
the first bar hanger further comprises:
  a first pair of openings disposed near the first end on a first portion of the first bar hanger corresponding to the first segment of the S-shaped cross-section; and
  a second pair of openings disposed near the second end on a second portion of the first bar hanger corresponding to the second segment of the S-shaped cross-section; and
when a bar hanger head is coupled to the first bar hanger, the bar hanger head is only coupled to one of the first pair of openings or the second pair of openings.

12. A bar hanger assembly, comprising:
a first bar hanger having an S-shaped cross-section, the S-shaped cross-section comprising a plurality of straight segments, the plurality of straight segments comprising:
  a top segment;
  a first segment directly coupled to the top segment;
  a middle segment directly coupled to the first segment;
  a second segment directly coupled to the middle segment; and
  a bottom segment directly coupled to the second segment,
wherein:
the top segment, the first segment, and the middle segment are aligned neither parallel nor orthogonal with respect to one another; and
the bottom segment, the second segment, and the middle segment are aligned neither parallel nor orthogonal with respect to one another.

13. The bar hanger assembly of claim 12, wherein:
the middle segment is rotated with respect to the first segment by a first offset angle;
the second segment is rotated with respect to the middle segment by a second offset angle; and
each of the first and second offset angles is between 45 degrees and 90 degrees.

14. The bar hanger assembly of claim 13, wherein each of the first and second offset angles is equal to 75 degrees.

15. The bar hanger assembly of claim 12, wherein the top segment is in parallel alignment with the bottom segment.

16. The bar hanger assembly of claim 12, wherein the first segment is in parallel alignment with the second segment.

17. The bar hanger assembly of claim 12, further comprising:
a second bar hanger that is identical with the first bar hanger and slidably coupled to the first bar hanger along a first axis such that the first segment of the second bar hanger is disposed proximate to the second segment of the first bar hanger,
wherein:
when a first portion of the first bar hanger corresponding to the first segment of the first bar hanger physically contacts a second portion of the second bar hanger corresponding to the second segment of the second bar hanger, a first force is generated between the first and second portions, the first force being oriented along a second axis that is orthogonal to the first axis; and
when a third portion of the first bar hanger corresponding to the middle segment of the first bar hanger physically contacts a fourth portion of the second bar hanger corresponding to the middle segment of the second bar hanger, a second force is generated between the third and fourth portions, the second force being oriented along a third axis that is orthogonal to the first axis and not orthogonal to the second axis.

18. The bar hanger assembly of claim 17, wherein:
a frictional force is generated between the first bar hanger and the second bar hanger due to physical contact between the first bar hanger and the second bar hanger; and
when no external force is applied to the bar hanger assembly and the bar hanger assembly is tilted such that the first axis is not horizontal, the frictional force prevents the second bar hanger from sliding with respect to the first bar hanger.

19. The bar hanger assembly of claim 12, wherein:
the first bar hanger has a first end and a second end opposite the first end;
the first bar hanger further comprises:
  a first pair of openings disposed near the first end on a first portion of the first bar hanger corresponding to the first segment of the S-shaped cross-section; and
  a second pair of openings disposed near the second end on a second portion of the first bar hanger corresponding to the second segment of the S-shaped cross-section; and
when a bar hanger head is coupled to the first bar hanger, the bar hanger head is only coupled to one of the first pair of openings or the second pair of openings.

20. A bar hanger assembly, comprising:
a first bar hanger having an S-shaped cross-section, the S-shaped cross-section comprising a plurality of straight segments, the plurality of straight segments comprising:
  a top segment;
  a first segment directly coupled to the top segment;
  a middle segment directly coupled to the first segment;
  a second segment directly coupled to the middle segment; and
  a bottom segment directly coupled to the second segment; and
a second bar hanger that is identical with the first bar hanger and slidably coupled to the first bar hanger along a first axis such that the first segment of the second bar hanger is disposed proximate to the second segment of the first bar hanger, wherein:

when a first portion of the first bar hanger corresponding to the first segment of the first bar hanger physically contacts a second portion of the second bar hanger corresponding to the second segment of the second bar hanger, a first force is generated between the first and second portions, the first force being oriented along a second axis that is orthogonal to the first axis; and when a third portion of the first bar hanger corresponding to the middle segment of the first bar hanger physically contacts a fourth portion of the second bar hanger corresponding to the middle segment of the second bar hanger, a second force is generated between the third and fourth portions, the second force being oriented along a third axis that is orthogonal to the first axis and not orthogonal to the second axis.

21. The bar hanger assembly of claim 20, wherein when a fifth portion of the first bar hanger corresponding to the top segment of the first bar hanger physically contacts a sixth portion of the second bar hanger corresponding to the bottom segment of the second bar hanger, a third force is generated between the fifth and sixth portions, the third force being oriented along a fourth axis that is orthogonal to the first axis and not orthogonal to the second axis.

22. The bar hanger assembly of claim 20, wherein:

a frictional force is generated between the first bar hanger and the second bar hanger due to physical contact between the first bar hanger and the second bar hanger; and when no external force is applied to the bar hanger assembly and the bar hanger assembly is tilted such that the first axis is not horizontal, the frictional force prevents the second bar hanger from sliding with respect to the first bar hanger.

23. The bar hanger assembly of claim 20, wherein:

the middle segment of the first bar hanger is rotated with respect to the first segment of the first bar hanger by a first offset angle;

the second segment of the first bar hanger is rotated with respect the middle segment of the first bar hanger by a second offset angle; and each of the first and second offset angles is between 45 degrees and 90 degrees.

24. The bar hanger assembly of claim 23, wherein each of the first and second offset angles is equal to 75 degrees.

25. The bar hanger assembly of claim 20, wherein the top segment of the first bar hanger is in parallel alignment with the bottom segment of the first bar hanger.

26. The bar hanger assembly of claim 20, wherein the first segment of the first bar hanger is in parallel alignment with the second segment of the first bar hanger.

27. The bar hanger assembly of claim 20, wherein the top segment of the first bar hanger, the first segment of the first bar hanger, and the middle segment of the first bar hanger are not aligned parallel or orthogonal with respect to one another.

28. A bar hanger assembly, comprising:

a first bar hanger having an S-shaped cross-section, the S-shaped cross-section comprising a plurality of straight segments, the plurality of straight segments comprising:

a top segment;

a first segment directly coupled to the top segment via a first rounded corner and rotated with respect to the top segment by a first offset angle;

a middle segment directly coupled to the first segment via a second rounded corner and rotated with respect to the first segment by a second offset angle;

a second segment directly coupled to the middle segment via a third rounded corner and rotated with respect to the middle segment by a third offset angle, the second segment being shorter than the first segment and in parallel alignment with the first segment; and a bottom segment directly coupled to the second segment via a fourth rounded corner and rotated with respect to the second segment by a fourth offset angle, the bottom segment being shorter than the top segment and in parallel alignment with the top segment, wherein each of the first, second, third, and fourth offset angles is equal to about 75 degrees.

29. The bar hanger assembly of claim 28, wherein:

the first bar hanger has a first end and a second end opposite the first end;

the first bar hanger further comprises:

a tab disposed near the first end on a first portion of the first bar hanger corresponding to the first segment of the S-shaped cross-section;

an opening disposed near the second end on a second portion of the first bar hanger corresponding to the second segment of the S-shaped cross-section;

a first pair of openings disposed near the first end on a first portion of the first bar hanger corresponding to the first segment of the S-shaped cross-section; and a second pair of openings disposed near the second end on a second portion of the first bar hanger corresponding to the second segment of the S-shaped cross-section;

when the first bar hanger is slidably coupled to a second bar hanger, the second bar hanger is prevented from slidably disengaging from the first bar hanger by either the tab of the first bar hanger being inserted into an opening of the second bar hanger or the opening of the first bar hanger receiving a tab of the second bar hanger; and when a bar hanger head is coupled to the first bar hanger, the bar hanger head is only coupled to one of the first pair of openings or the second pair of openings.

30. The bar hanger assembly of claim 28, further comprising:

a second bar hanger that is identical with the first bar hanger and slidably coupled to the first bar hanger along a first axis such that the first segment of the second bar hanger is disposed proximate to the second segment of the first bar hanger, wherein:

when a first portion of the first bar hanger corresponding to the first segment of the first bar hanger physically contacts a second portion of the second bar hanger corresponding to the second segment of the second bar hanger, a first force is generated between the first and second portions, the first force being oriented along a second axis that is orthogonal to the first axis; and when a third portion of the first bar hanger corresponding to the middle segment of the first bar hanger physically contacts a fourth portion of the second bar hanger corresponding to the middle segment of the second bar hanger, a second force is generated between the third and fourth portions, the second force being oriented along a third axis that is orthogonal to the first axis and not orthogonal to the second axis.

\* \* \* \* \*